(12) United States Patent  (10) Patent No.: US 6,750,830 B1
Teshima et al.  (45) Date of Patent: Jun. 15, 2004

(54) IMAGE COMMUNICATION SYSTEM

(75) Inventors: Atsushi Teshima, Asaka (JP); Norihisa Haneda, Asaka (JP)

(73) Assignee: Fuji Photo Film Co., Ltd., Minami-Ashigara (JP)

(*) Notice: Subject to any disclaimer, the term of this patent is extended or adjusted under 35 U.S.C. 154(b) by 31 days.

(21) Appl. No.: 09/616,673

(22) Filed: Jul. 14, 2000

(30) Foreign Application Priority Data

Jul. 15, 1999 (JP) .......................................... 11-201591

(51) Int. Cl.[7] .................................................. G09G 5/00
(52) U.S. Cl. ......................................... 345/1.2; 345/1.3
(58) Field of Search ................................ 345/145, 158, 345/1.3, 156, 183, 864; 358/1.15, 1.14, 434, 437, 442; 710/17, 19; 700/83

(56) References Cited

U.S. PATENT DOCUMENTS

| | | | | |
|---|---|---|---|---|
| 5,293,484 A | * | 3/1994 | Dabbs, III et al. ........... | 395/164 |
| 5,689,642 A | * | 11/1997 | Harkins et al. .......... | 395/200.04 |
| 5,726,768 A | * | 3/1998 | Ishikawa et al. ............. | 358/442 |
| 6,049,316 A | * | 4/2000 | Nolan et al. ................. | 345/698 |
| 6,199,099 B1 | * | 3/2001 | Gershman et al. ........... | 709/203 |
| 6,253,326 B1 | * | 6/2001 | Lincke et al. ................ | 713/201 |
| 6,262,805 B1 | * | 7/2001 | Ishikawa et al. ............ | 358/1.15 |
| 6,400,996 B1 | * | 6/2002 | Hoffberg et al. .............. | 700/83 |

* cited by examiner

*Primary Examiner*—Amare Mengistu
*Assistant Examiner*—Prabodh Dharia
(74) *Attorney, Agent, or Firm*—McGinn & Gibb, PLLC

(57) ABSTRACT

In a user device which permits access to a server, an image suitable for the user device is displayed. Various user devices such as a portable telephone set, a personal digital assistant, a notebook personal computer, and a personal computer permit access to the server. The server stores data representing an image suitable for each of the devices. The data representing the image suitable for the user device which has accessed the server is read out of the server. Data representing the image read out is transmitted to the user device from the server. In the user device, the data is received, and an image suitable for the user device is displayed.

31 Claims, 53 Drawing Sheets

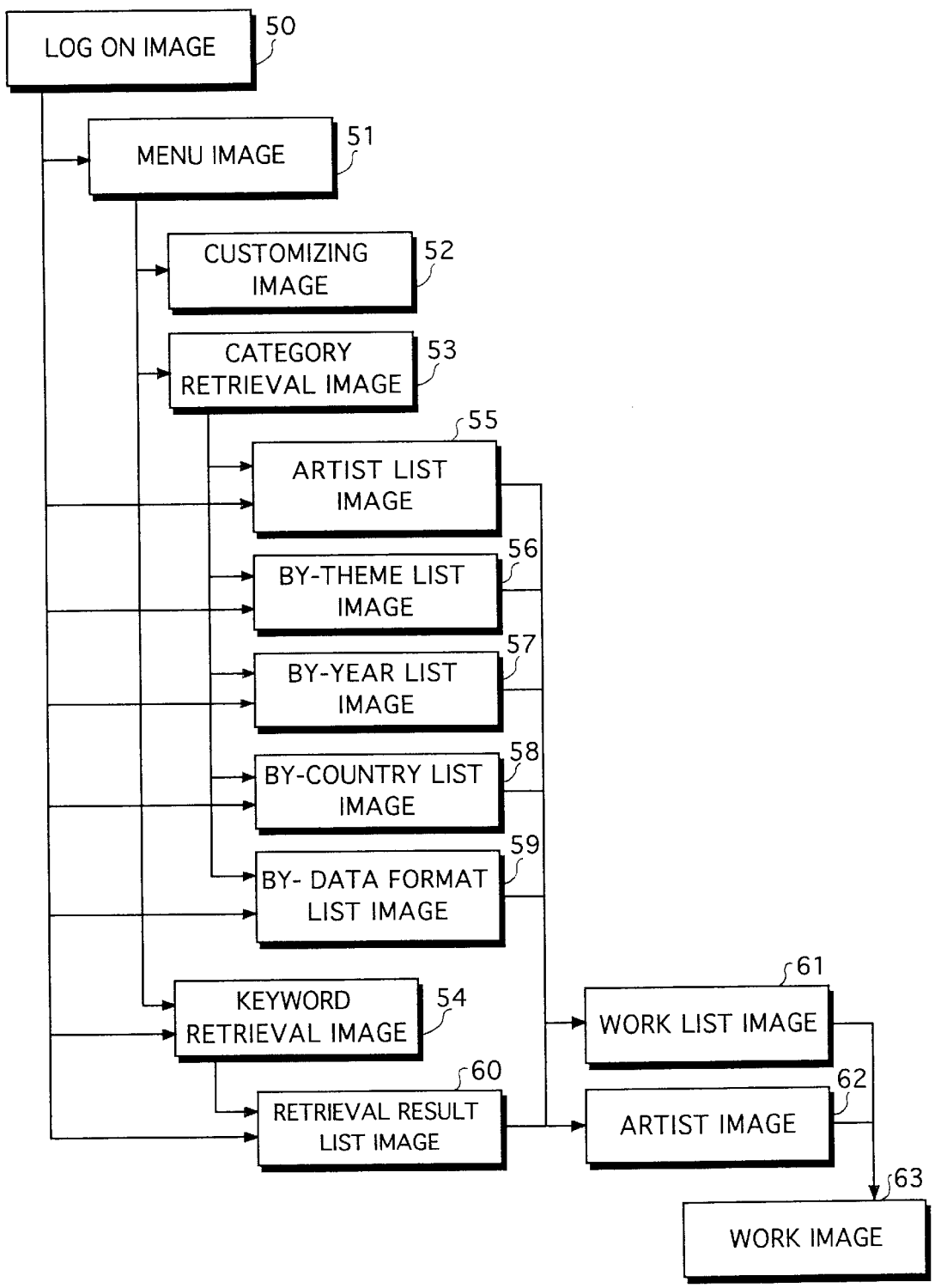
Fig. 6   TRANSITION OF IMAGES

Fig. 7

| USER NAME | PASSWORD | START IMAGE | RETRIEVAL CONDITIONS |
|---|---|---|---|
| A | *** | CATEGORY RETRIEVAL IMAGE | FILE FORMAT = ARTIST and DATE OF BIRTH ≧ 1950/1/1 |
| B | *** | CATEGORY RETRIEVAL IMAGE | FILE FORMAT = ARTIST and DATE OF BIRTH ≧ 1950/1/1 |
| C | *** | CATEGORY RETRIEVAL IMAGE | FILE FORMAT = ARTIST and WORK CATEGORY = ANIMAL |
| D | *** | CATEGORY RETRIEVAL IMAGE | FILE FORMAT = ARTIST and WORK CATEGORY = ANIMAL |

| MENU IMAGE | ... | CATEGORY RETRIEVAL IMAGE | WORK LIST IMAGE | ARTIST IMAGE | WORK IMAGE |
|---|---|---|---|---|---|
| NO | ... | H121 | NO | J121 | NO |
| NO | ... | H122 | NO | J121 | NO |
| NO | ... | H123 | NO | J121 | NO |
| NO | ... | H124 | NO | J121 | NO |

ARTIST IMAGE MANAGEMENT FILE
*Fig. 8A*
| NAME OF ARTIST | NORI-HANEDA |
|---|---|
| NATIONALITY | AMERICA |
| DATE OF BIRTH | 1959/3/6 |
| DATE OF DEATH | - |
| DESCRIPTIVE TEXT FILE | Txt3021 |
| FILE FORMAT | ARTIST |
| NUMBER OF IMAGE FILES | 3 |
| IMAGE FILE NAME 1 | noriL.jpg |
| IMAGE FILE NAME 2 | noriM.jpg |
| IMAGE FILE NAME 3 | noriS.jpg |
ARTIST IMAGE FILE (LARGE)
*Fig. 8B*
noriL.jpg    2400 × 1800
ARTIST IMAGE FILE (MEDIUM)
*Fig. 8C*
noriM.jpg    160 × 120
ARTIST IMAGE FILE (SMALL)
*Fig. 8D*
noriS.jpg
80 × 50

Fig. 9A
WORK IMAGE MANAGEMENT FILE
| NAME OF ARTIST | NORI-HANEDA |
|---|---|
| TITLE | Red Rose |
| YEAR OF ISSUE | 1974 |
| WORK CATEGORY | FLOWER |
| DESCRIPTIVE TEXT FILE | Txt18416 |
| FILE FORMAT | WORK |
| NUMBER OF IMAGE FILES | 32 |
| IMAGE FILE NAME 1 | nori001L.jpg |
| IMAGE FILE NAME 2 | nori001S.jpg |
Fig. 9B
WORK IMAGE FILE (LARGE)
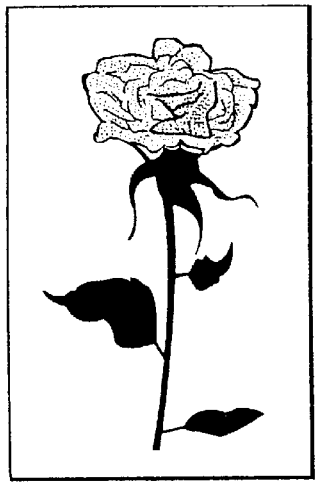
nori001L. jpg   1800 × 2560
Fig. 9C
WORK IMAGE FILE (SMALL)
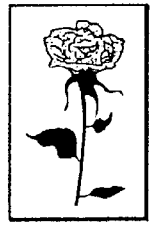
nori001S. jpg
90 × 128

Fig. 10A

TEXT MANAGEMENT FILE

| FILE FORMAT | TITLE |
|---|---|
| NUMBER OF TEXT FILES | 1 |
| TEXT FILE NAME | title3.txt |

Fig. 10B

TEXT FILE

N title3.txt

```
<file Txt15 function31(3)>
<for i = 1 to ##Count>
    <file manage(##FileID(i),ARTIST NAME)function4(16)function1
    L (WORK LIST, FILE · FORMAT = WORK and
    L' ARTIST NAME = manage(##FileID(i), ARTIST NAME)' )>
<next>
```

```
<file Txt15 function31(3)>
<for i = 1 to ##Count>
    <file manage(##FileID(i), ARTIST NAME)function4(16)function1
    L (ARTIST, FILE · FORMAT = WORK and
    L' ARTIST NAME = manage (##FileID(i), ARTIST NAME)' )>
<next>
```

```
<file Txt16 function31(3)>
<for i = 1 to ##Count>
   <begin column(I mod 2 + 1)>
      <FILE ##FileID(i)function11(150,150)>
      <file manage(##FileID(i),TITLE)function1
      L(WORK LIST, FILE · FORMAT = WORK and
      L ARTIST= manage(##FileID(i), ARTIST NAME)' )>
      <file manage(##FileID(i), ARTIST NAME)function
      L(WORK LIST, FILE · FORMAT = WORK and
      L ARTIST = manage(##FileID(i), ARTIST NAME)' )>
   <end column(i mode 2 + 1)
<next>
```

```
<file Txt16 function31(3)>
<for i = 1 to ##Count>
   <begin column(I mod 2 + 1)>
      <FILE ##FileID(i)function11(150,150)>
      <file manage(##FileID(i), TITLE)function1
      L(ARTIST, FILE · FORMAT = WORK and
      L ARTIST = manage(##FileID(i), ARTIST NAME)' )>
      <file manage(##FileID(i), ARTIST NAME)function
      L (ARTIST, FILE · FORMAT = WORK and
      L ARTIST = manage(##FileID(i), ARTIST NAME)' )>
   <end column(i mode 2 + 1)
<next>
```

Fig. 16

1121
(PORTABLE TELEPHONE )

```
<file manage(##FileID(1), ARTIST NAME)>
  "WORK LIST"
<for #i = 1 to ##Count>
  #i" ." <file manage(##FileID(#i), TITLE)function1(WORK,
    L' FILE FORMAT= WORK and TITLE = manage(##FileID(#i),
    LTITLE)' >
<next>
  "SELECT NUMBER"
```

Fig. 17

1122
(PERSONAL DIGITAL ASSISTANT)   (PORTABLE INFORMATION TERMINAL)

```
<file manage(##FileID(#i), ARTIST NAME)> "WORK LIST"
<for #i = 1 to ##Count>
  <begin column(#i mod 3 + 1)>
    <file ##FileID(#i) function10(2) function11(64,64) function(
      LWORK ,   ' FILE FORMAT= WORK and TITLE= manage(##FileID(#i)
      LTITLE)>
    #i" ." <file manage(##FileID(i), TITLE)>
  <end column(#i mod 3 + 1)>
<next>
  "SELECT IMAGE"
```

(NOTEBOOK COMPUTER)

<file manage(##FileID(1), ARTIST NAME) function32(2) function3( 'Times' ) function4(18)>
  < "WORK LIST" function32(2) function3( 'GOTHIC' ) function4(18)>
<for #i = 1 to ##Count>
  <begin column 1>
    <file ##FileID(#i) function11(100,100) function1*WORK, 'FILE
    L FORMAT= WORK and TITLE = manage(##FileID(#i), TITLE)>
  <end column 1>
  <begin column 2>
    #i" ." <file manage(##FileID(i), TITLE)function3( 'COMIC' )>
    <file manage(##FileID(i), DESCRIPTIVE TEXT)function5(1)
    L function6(100)>
  <end column 2>
  <end column(#i mod 3 + 1)>
<next>
<begin center>
   "SELECT IMAGE"
<end center>

(PERSONAL COMPUTER)

```
<begin column 1>
  <begin center>
    <file Img24>
    <file Img25 function1(MENU)>
    <file Img25 function1(KEYWORD RETRIEVAL)>
    <file Img25 function1(CATEGORY RETRIEVAL RESULT, 'FILE FORMAT=ARTIST' )>
  <end center>
<end column 1>
<begin column 2>
  <file manage(##FileID(#i),ARTIST NAME) function32(2) function3( 'Times' ) function4(24)>
    <"WORK LISR" function32(2) function3( 'GOTHIC' ) function4(24)>
  <for #i = 1 to ##Count>
    <begin column(#i mod 2 + 1) function31(1)>
      <begin column 1>
        <file ##FileID(#i) function11(160,160) function1(WORK,
          ∟ 'FILE FORMAT= WORK and TITLE = manage(##FileID(#i)
          ∟ ,TITLE)>
        <region #1>
      <end column 1>
      <begin column 2>
        #i "." <file manage(##FileID(i),TITLE) function3( 'COMIC' )>
        <file manage(##FileID(i)DESCRIPTIVE TEXT) function5(1)
          ∟function6(240) using region #1>
      <end column 2>
    <end column(#i mod 2 + 1)>
  <next>
  <begin center>
    " SELECT IMAGE"
  <end center>
<end column 2>
```

Fig. 24 — KEYWORD RETRIEVAL IMAGE PROCESSING

WORK LIST PROCESSING

*Fig. 33*  CUSTOMIZE MENU PROCESSING

Fig. 45

CATEGORY RETRIEVAL IMAGE

SELECT CATEGORY

1. BY ARTIST
2. BY THEME
3. BY YEAR
4. BY COUNTRY
5. BY DATA FORMAT

WORK LIST IMAGE
(PORTABLE TELEPHONE SET)

```
NORI-HANEDA
WORK LIST
1. RED ROSE
2. RABBIT IN AUGUST
3. BOY AND SEA
   SELECT NUMBER
```

NO IMAGE

WORK LIST IMAGE
PORTABLE INFORMATION TERMINAL (PDA)

SMALL IMAGE, BLACK AND WHITE

WORK LIST IMAGE
PC(SMALL SCREEN)

MEDIEM-SIZED IMAGE , FULL COLOR
SHORT DESCRIPTIVE TEXT

Fig. 52

IMAGE EDIT IMAGE

DO YOU ADD ITEM OR EDIT SCRIPT?

WHEN YOU ADD ITEM, ENTER ITEM TO BE ADDED

Fig. 53

SCRIPT EDIT IMAGE

WE PERFORM BATCH EDITING BY SCRIPT

ENTER SCRIPT

IMAGE COMMUNICATION SYSTEM

BACKGROUND OF THE INVENTION

1. Field of the Invention

The present invention relates to an image communication system comprising an image transmitting device and an image receiving device which can establish data communication with each other, the image transmitting device constituting the image communication system and an image transmitting method, and a recording medium storing a program for controlling a computer in the image transmitting device.

2. Related Art

With the development of an electronic technique, not only a personal computer but also various devices such as a portable telephone set or a personal digital assistant have allowed data communication. A small-sized display device is also attached to the portable telephone set or the personal digital assistant. It is possible to receive image data transmitted through a network and display an image represented by the received image data on the display device.

However, the display device provided in the portable telephone set, the personal digital assistant, or the like is small. Accordingly, it may, in some cases, be difficult to display the same image as the image displayed on the display device connected to the personal computer.

SUMMARY OF THE INVENTION

An object of the present invention is to make it possible for an image receiving device to receive image data representing an image suitable for an image to be displayed.

The present invention is directed to an image communication system comprising an image transmitting device (apparatus) and an image receiving device (apparatus) which can establish data communication with each other.

The image receiving device (apparatus) comprises device information transmission means (device) for transmitting to the image transmitting device (apparatus) information relating to the image receiving device (apparatus).

The image transmitting device (apparatus) comprises device information receiving means (device) for receiving information relating to the image receiving device (apparatus) which has been transmitted from the device information transmission means (device) in the image receiving device (apparatus), and image data transmission means (device) for transmitting to the image receiving device (apparatus) image data representing an image having a display format suitable for the image receiving device (apparatus) on the basis of the information relating to the image receiving device (apparatus) which has been received by the device information receiving means (device).

The present invention also provides an image transmitting device (apparatus) constituting the image communication system.

The present invention also provides a method suitable for the image transmitting device (apparatus). That is, in an image transmitting device (apparatus) which can establish data communication with an image receiving device (apparatus), the method comprises the steps of receiving information relating to the image receiving device (apparatus) which has been transmitted from the image receiving device (apparatus); and transmitting to the image receiving device (apparatus) image data representing an image having a display format suitable for the image receiving device (apparatus) on the basis of the received information relating to the image receiving device (apparatus).

Furthermore, the present invention also provides a recording medium storing a program for carrying out the above-mentioned method in the image transmitting device (apparatus).

According to the present invention, information relating to the image receiving device (apparatus) (for example, the type of the image receiving device, information relating to display on a display device connected to the image receiving device, i.e., the size of a display screen, the number of colors which can be displayed, software for image display which is installed in the image receiving device, etc.) is transmitted from the image receiving device to the image transmitting device.

In the image transmitting device (apparatus), the information relating to the image receiving device is received. Consequently, image data representing an image having a display format suitable for the image receiving device (an image of a size suitable for the image receiving device, an image in colors whose number is suitable for the image receiving device, the layout of an image in a case where the image is an edit image which is composed of a plurality of images, display items in a case where a plurality of items including an image item are displayed, etc.) is transmitted to the image receiving device on the basis of the received information.

In the image receiving device (apparatus), image data having a format suitable for display is received. The received image data is fed to a display device, so that an image suitable for the display device connected to the image receiving device is displayed.

The image transmitting device (apparatus) may further comprise storage means (device) for storing image data having a plurality of different display formats. In this case, image data representing the image having the display format suitable for the image receiving device out of the storage means will be transmitted to the image receiving device on the basis of the information relating to the image receiving device which has been received by the device information receiving means.

Edit image data representing an edit image which is composed of a plurality of display items such as an image and a sentence (may be data representing the edit image itself, data representing such an image and a sentence that the edit image can be produced in the image receiving device, or data representing a layout for composing the edit image) may be transmitted to the image receiving device.

The image receiving device (apparatus) may further comprise setting means (device) for setting at least one of the layout and the display items of the edit image, and set information transmission means (device) for transmitting to the image transmitting device information set by the setting means.

In this case, the image transmitting device (apparatus) further comprises set information receiving means (device) for receiving the set information which has been transmitted from the set information transmission means in the image receiving device, and determination means (device) for determining at least one of the layout and the display items of the edit image represented by the edit image data on the basis of the set information which has been received by the set information receiving means.

It is possible to display the edit image having a desired layout and display items on the image receiving device.

The setting means in the image receiving device may be at least one of means for performing the setting so as to collectively edit the whole of the edit image and means for performing the setting so as to edit a part of the edit image. Further, the image communication system may further comprise plural image data storage means (devices) storing a plurality of image data representing images composing the edit image in different data amounts (the image data may be thinned to obtain a plurality of image data, or a part of the image may be cut out to obtain a plurality of image data), and production means (device) for producing the edit image using the image represented by any one of the image data stored in the plural image data storage means.

When the image data representing images corresponding to a plurality of frames are transmitted to the image receiving device from the image transmitting device, the image receiving device further comprises edit image designation means for designating the edit image having the layout and the display items at least one of which should be set by the setting means. Further, the setting means sets at least one of the layout and the display item of the edit image designated by the edit image designation means.

It is possible to designate a desired image, and to set at least one of the layout and the display items of the designated image.

The image receiving device (apparatus) can be further provided with selection means (device) for selecting the image first displayed when the image receiving device and the image transmitting device are formally connected to each other, and selected image transmission means (device) for transmitting to the image transmitting device selected image data representing the image selected by the selection means.

The image transmitting device (apparatus) further comprises selected image receiving means (device) for receiving the selected image data which has been transmitted from the selected image transmission means in the image receiving device. In this case, the image data transmission means will transmit image data representing the image represented by the selected image data which has been received by the selected image receiving means to the image receiving device when the image receiving device and the image transmitting device are formally connected to each other.

By selecting a desired image, the selected desired image can be received in the image receiving device when the image transmitting device and the image receiving device are formally connected to each other (connected to each other after it is confirmed that there is an authorization of connection by a password, an ID, or the like).

The image receiving device (apparatus) may further comprise update command transmission means (device) for transmitting an image update command to the image transmitting device.

In this case, the image transmitting device (apparatus) further comprises update command receiving means (device) for receiving the image update command which has been transmitted from the update command transmission means. The image data transmission means will transmit to the image receiving device image data representing the subsequent image which is linked to an image represented by image data which corresponds to the update command received by the update command receiving means and information relating to the image receiving device and has been transmitted to the image receiving means by the image data transmission means.

The image receiving device (apparatus) may further comprise link image setting means (device) for setting the image to be linked, and link information transmission means (device) for transmitting link information set by the link image setting means to the image transmitting device.

At this time, the image transmitting device (apparatus) further comprises link information receiving means (device) for receiving the link information which has been transmitted from the link information transmission means in the image receiving device. Image data representing the subsequent image to be linked is transmitted to the image receiving device on the basis of the link information which has been received by the link information receiving means.

A user can establish a link with a desired image. Images at link destinations differ depending on users.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 6 illustrates a transition between images;

FIG. 7 illustrates user information;

FIG. 8A illustrates an artist image management file, and FIGS. 8B to 8D respectively illustrate artist image files;

FIG. 9A illustrates a work image management file, and FIGS. 9B and 9C respectively illustrate work image files;

FIG. 10A illustrates a text management file, and FIG. 10B illustrates a text file;

FIGS. 12 to 19 illustrate examples of a script:

FIG. 45 illustrates a category retrieval image;

FIG. 52 illustrates an image edit image;

FIG. 53 illustrates a script edit image;

DESCRIPTION OF THE PREFERRED EMBODIMENTS

(1) Outline of Image Communication System

Figure 1:
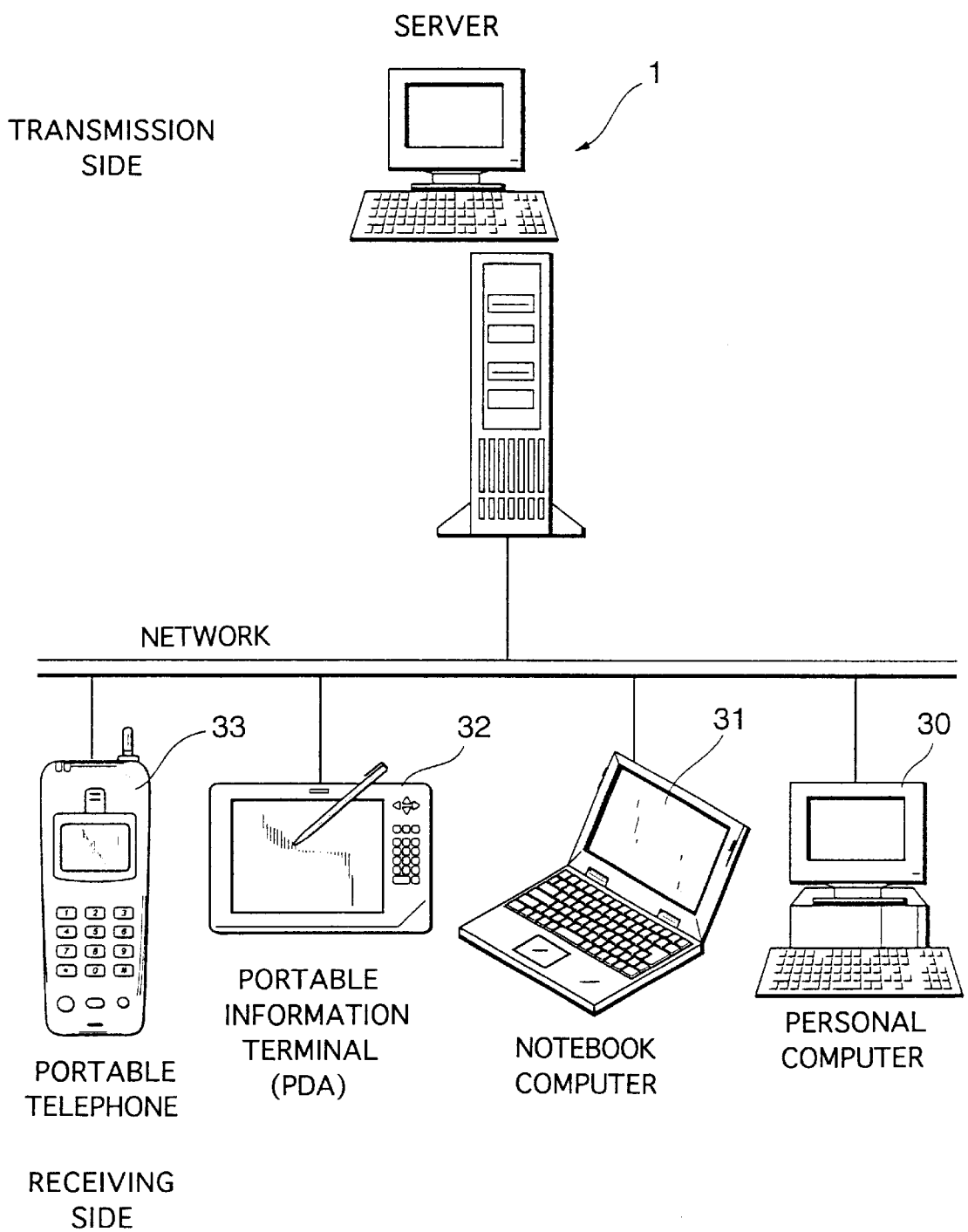
FIG. 1 illustrates the outline of an image communication system.

FIG. 1 illustrates the outline of an image communication system according to the present embodiment.

The image communication system comprises a server 1, a personal computer (PC) 30, a notebook computer 31, a personal digital assistant (PDA) (portable information terminal) 32, and a portable telephone set (portable phone) 33 which can communicate with one another through a network. In the present embodiment, the server 1 is a device on the transmission side, and the personal computer 30, the notebook computer 31, the personal digital assistant 32, and the portable telephone set 33 are user devices on the receiving side. The server 1 which is the device on the transmission side and one of the personal computer 30, the notebook computer 31, the personal digital assistant 32, and the portable telephone set 33 which are the devices on the receiving side may permit data communication with each other.

Data communication is established between the server 1 on the transmission side and the user device on the receiving side and an image is displayed on a display device of the user device on the receiving side. The layout or the like of an image which is displayed on the user device on the receiving side can be changed relatively freely, that is, the image can be customized by a user on the receiving side. The details will be described later.

Figure 2:
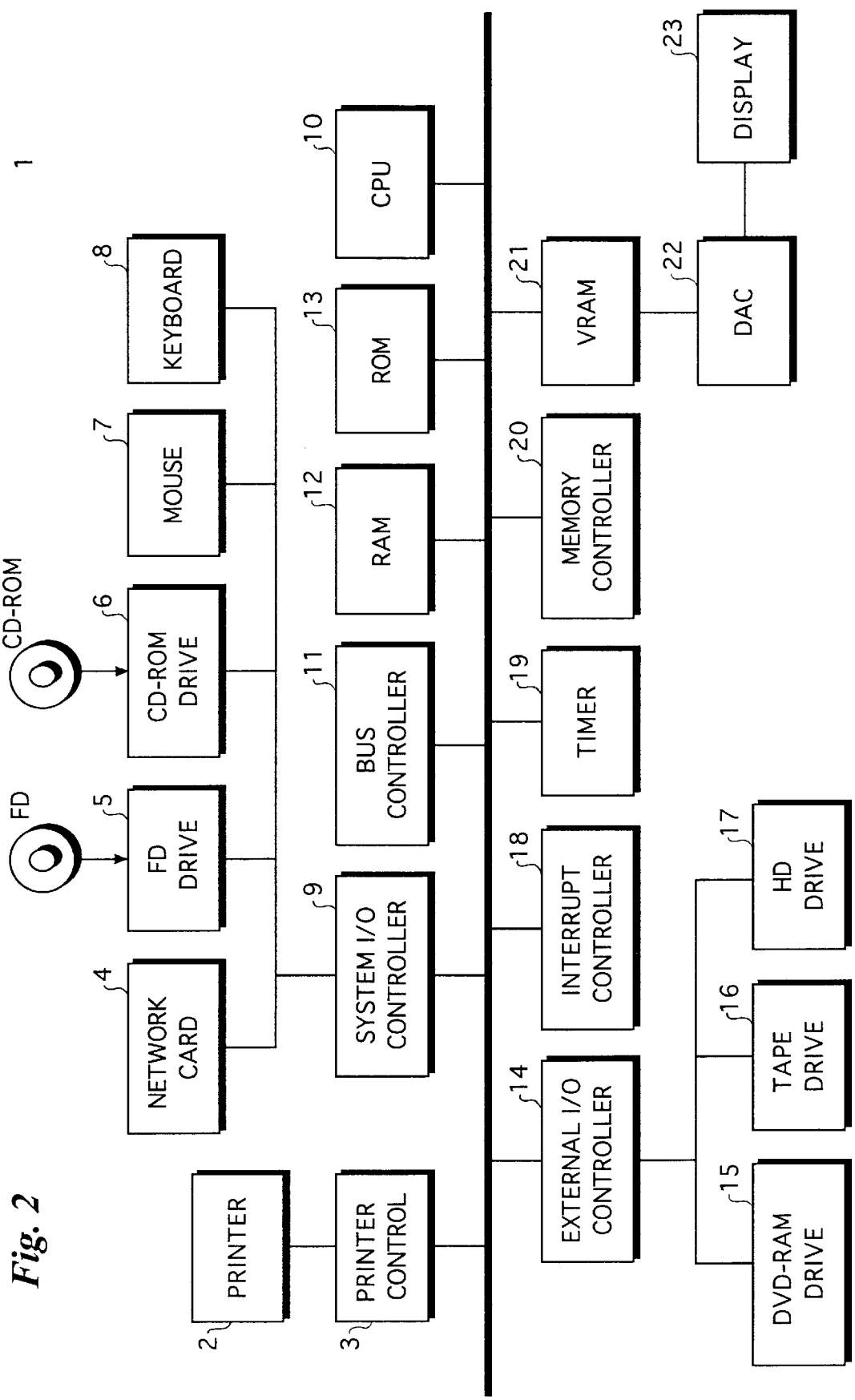
FIG. 2 is a block diagram showing the electrical configuration of a server.

FIG. 2 is a block diagram showing the electrical configuration of the server 1.

The overall operation of the server 1 is supervised by a CPU 10.

A printer 2 is connected to the server 1. The printer 2 is controlled by a printer control circuit 3.

A network card 4 for establishing data communication with the other data communication devices such as the personal computer 30, the notebook computer 31, the personal digital assistant 32 and the portable telephone set 33, an FD drive 5 for recording data on an FD (Floppy Disk) and reading the data recorded on the FD, a CD-ROM drive 6 for reading data recorded on a CD-ROM (Compact Disk-Read Only Memory), a mouse 7, and a keyboard 8 are connected to the server 1. Data obtained from the network card 4 and so forth are accepted in the server 1 through a system I/O controller 9.

A program for executing processing, described later, is stored in the CD-ROM. The program stored in the CD-ROM is read by the CD-ROM drive 6, and is installed in the server 1. It goes without saying that the program may be downloaded from another server or the like.

Furthermore, the server 1 comprises a bus controller 11, a RAM 12 for temporarily storing data, and a ROM 13 storing programs and other necessary data.

Furthermore, there are provided a DVD-RAM drive 15 for recording data on a DVD (Digital Versatile Disk)-RAM (Random Access Memory) or reading data recorded on the DVD-RAM, a tape drive 16 for recording data on a magnetic tape or reading data recorded on the magnetic tape, and a HD (Hard Disk) drive 17 for recording data on a hard disk or reading data recorded on the hard disk. The DVD-RAM drive 15, the tape drive 16, and the HD drive 17 are controlled by an external I/O controller 14.

Furthermore, the server 1 comprises an interrupt controller 18, a timer 19, a memory controller 20, and a VRAM (Video RAM) 21 for temporarily storing image data in order to display an image on the display device 23. The image data stored in the VRAM 21 is fed to a digital analog converter (DAC) 22, so that the image is displayed on a display screen of the display device 23.

Figure 3:
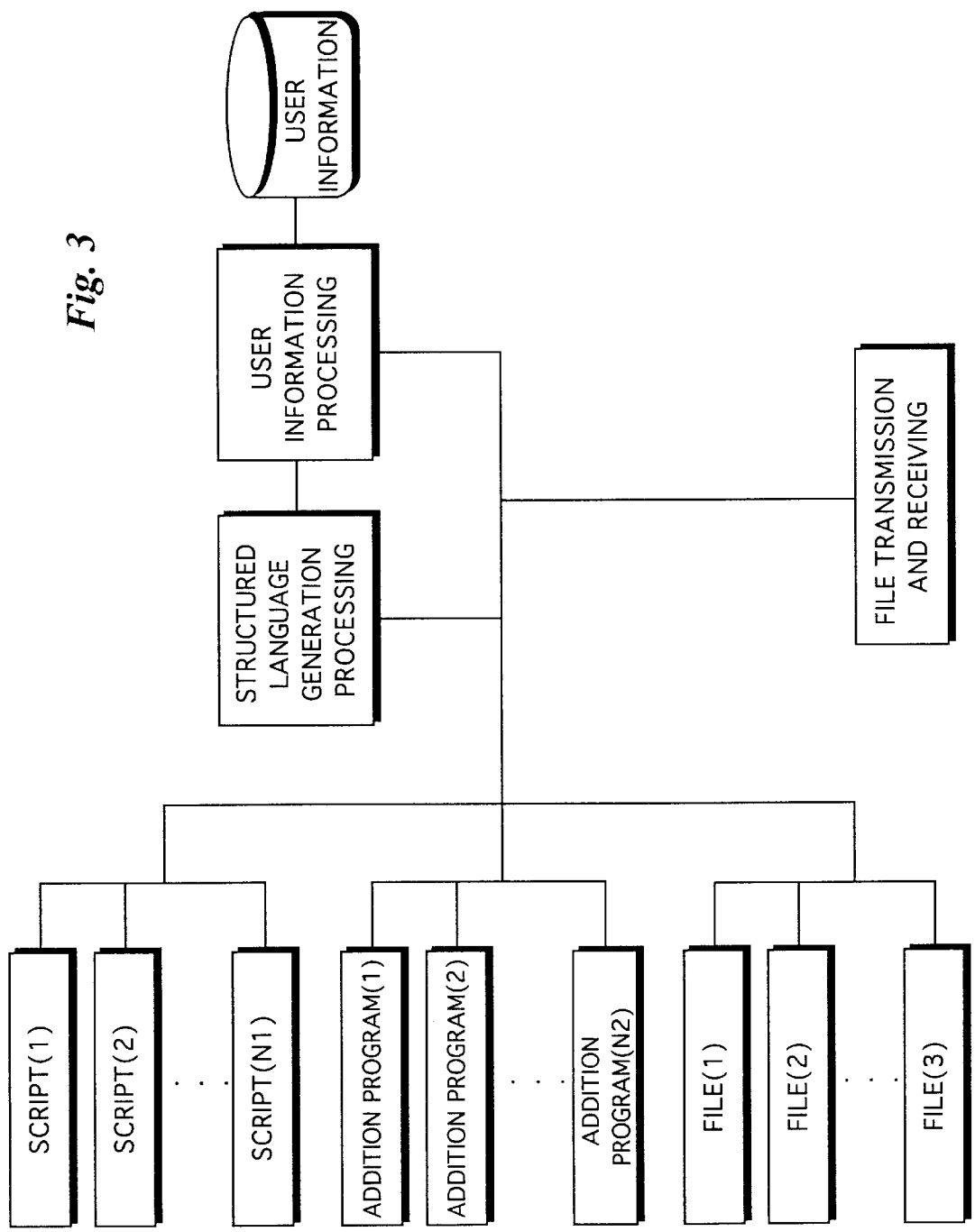
FIG. 3 illustrates software, etc. stored in the server.

FIG. 3 illustrates programs, files, etc. which are stored in a hard disk for the server 1.

The hard disk for the server 1 stores data representing user information, described later, a user information processing program for reading the user information and adding user information, a structured language generation processing program for generating an edit image, a program for transmitting and receiving a file, data representing a script, an addition processing program (although the server 1 has a basic performance for affixing an image in accordance with the script, processing can be further extended (added). A program for the addition (extended) processing is an addition processing program.), and various files such as an image file, a text file and a management file.

Figure 4:
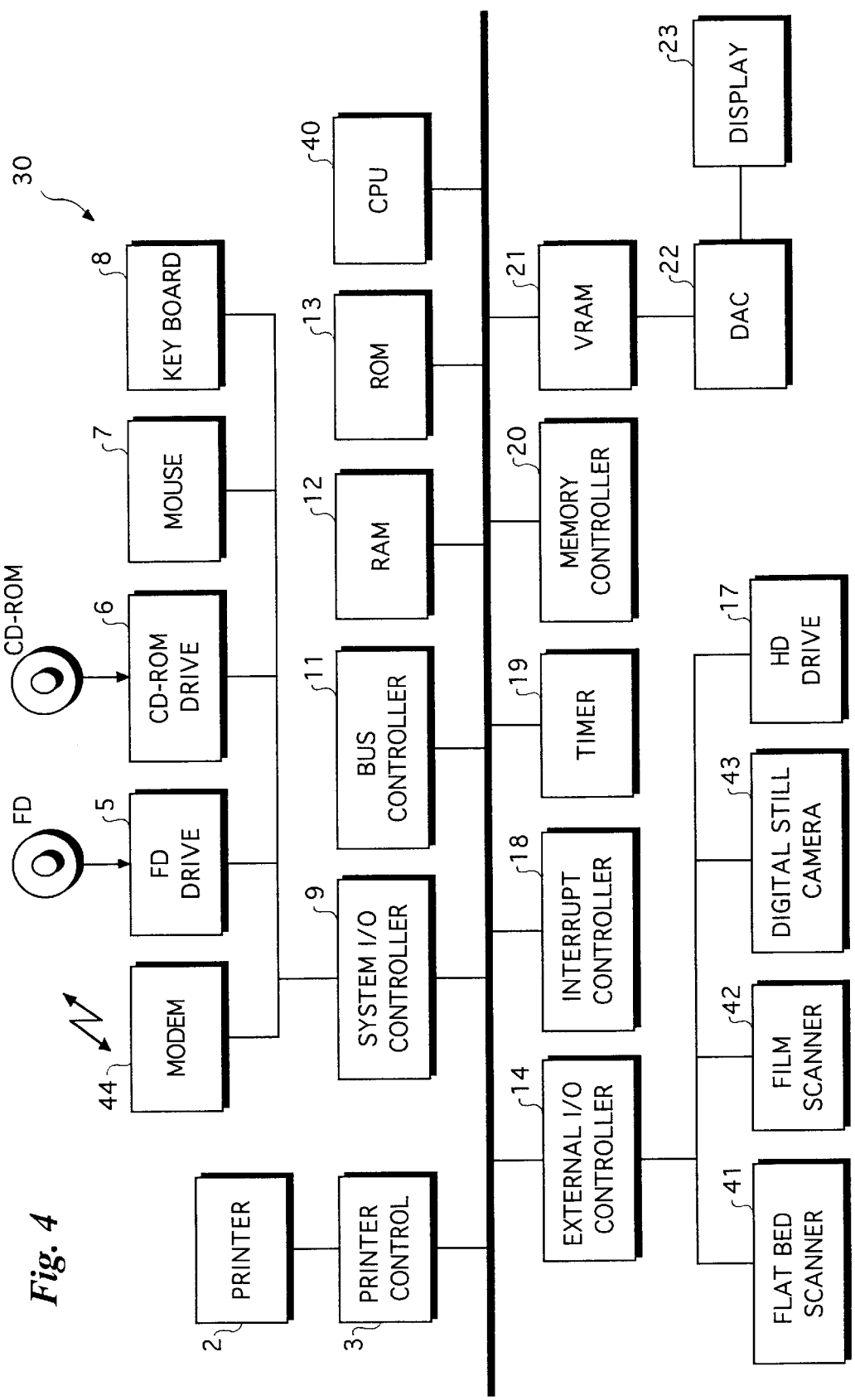
FIG. 4 is a block diagram showing the electrical configuration of a personal computer.

FIG. 4 is a block diagram showing the electrical configuration of a personal computer 30. The personal computer 30 has approximately the same configuration as that of the server 1. The same circuits as the circuits constituting the server 1 out of circuits constituting the personal computer 30 are assigned the same reference numerals and hence, the description thereof is not repeated.

The overall operation of the personal computer 30 is supervised by a CPU 40.

A modem 44 is connected to the personal computer 30. The personal computer 30 can be connected to a network by the modem 44.

Furthermore, a flat bed scanner 41, a film scanner 42, and a digital still camera 43 are connected to the personal computer 30. The flat bed scanner 41, the film scanner 42, and the digital still camera 43 are controlled by an external I/O controller 14.

Figure 5:
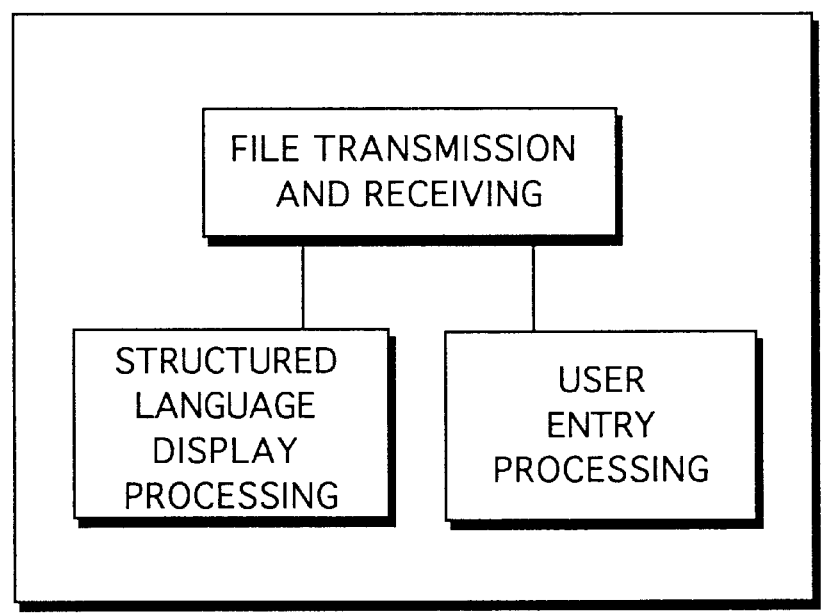
FIG. 5 illustrates software, etc. stored in the personal computer.

FIG. 5 illustrates programs stored in a hard disk for the personal computer 30.

The programs include a file transmission and receiving program, a structured language display processing program, and a user entry processing program. It goes without saying that other necessary files are stored in the hard disk.

It goes without saying that user devices other than the personal computer 30, that is, the notebook computer 31, the personal digital assistant 32, and the portable telephone set 33 are provided with circuits for data transmission and receiving such that data communication can be established through the network, similarly to the personal computer 30.

FIG. 6 illustrates a transition of images which are displayed on the user device connected to the server 1, that is, a transition of pages in the server 1 which causes the transition of images displayed on the user device.

In the present embodiment, images (pages) are linked to one another and are retrieved, thereby finally displaying a work image of an artist desired by the user on the user display device. FIG. 6 shows that images (pages) which are connected to one another are linked to one another.

In the present embodiment, there are images (pages), described below.

Log on image 50 (see FIG. 42)
It is an image for confirming, when the user accesses the server 1, authorization for the access.

Menu image 51 (see FIG. 43)
It is an image for selecting an image which should be subsequently displayed on the user display device.

Customizing image 52
It is an image for customizing an image by the user.

Category retrieval image 53 (see FIG. 45)
It is an image for performing a category retrieval.

Keyword retrieval image 54 (see FIG. 44)
It is an image for executing a keyword retrieval.

Artist list image 55
It is an image for listing artists whose work images can be seen.

By-theme list image 56
It is an image for listing work images which can be seen by theme (for each theme).

By-year list image 57
It is an image for listing work images which can be seen by year.

By-country list image 58
It is an image for listing work images which can be seen by artist's country.

By-data format list image 59
It is an image for listing work images which can be seen by data format.

Retrieval result list image 60
It is an image for listing results obtained by retrieval.

Work list image 61 (see FIGS. 46 to 49)
It is an image for listing artist's works.

Artist image 62
It is an image for displaying information relating to an artist.

Work image 63
It is an artist's work image which a user desires to obtain.

In the image communication system according to the present embodiment, when the user device accesses the server 1, a log on image is displayed on the user device in order to confirm whether the user has authorization for the access. When it is confirmed that the user has authorization for the access, the subsequent image (this is referred to as a start image) which is linked to the log on image is displayed on the user display device.

Which of images is taken as the start image is set by the user. If the start image is not set by the user, a menu image is displayed as a predetermined start image on the user display device.

Furthermore, which of images exists at a link destination of the image displayed on the user display device can be also set by the user. For example, when the retrieval result list image 60 is displayed on the user display device, the image at the link destination is the work list image 61 or the artist image 62. However, which of the images exists at a link destination of the retrieval result list image can be determined by the user.

FIG. 7 illustrates an example of user information.

The user information is information relating to the device on the receiving side which is connected to the server 1. The user information is stored in the hard disk for the server 1, as described above. The user information includes data respectively representing a user name, a password, a script for a start image, retrieval conditions, a script for a menu image, a script for a category retrieval image, a script for a work list image, a script for an artist image, and a script for a work image.

The user is previously informed of a user name and a password by mail, for example. A start image or the like is customized by the user. The layout or the like of an image such as a start image is defined by a script.

In the user information shown in FIG. 7, start images by users A to D are set in the category retrieval result image. Therefore, retrieval conditions for obtaining the respective retrieval results are stored in the user information.

FIGS. 8A, 8B, 8C and 8D illustrate a group of artist image files which is stored in the hard disk for the server 1. One ID is assigned to the group of artist image files.

FIG. 8A illustrates a management file of the group of artist image files.

The management file is used when the user accesses the server 1 to retrieve an image which is desired to be read or to be seen (to be reviewed). The management file includes the name of an artist of the image which is desired to be reviewed, the nationality of the artist, the date of birth of the artist, the date of death of the artist, a descriptive text file ID, a file format, the number of image files, and image file names.

FIGS. 8B to 8D respectively illustrate images represented by the image file names stored in the artist image management file shown in FIG. 8A. The image is specified by the image file name stored in the management file.

FIG. 8B illustrates the image having the first image file name in the management file shown in FIG. 8A. The amount of image data representing the image is the largest, and the resolution of the image is high.

FIG. 8C illustrates the image having the second image file name in the management file shown in FIG. 8A. The amount of image data representing the image is medium, and the resolution of the image is medium.

FIG. 8D illustrates the image having the third image file name in the management file shown in FIG. 8A. The amount of image data representing the image is the smallest, and the resolution of the image is low.

The artist image 62 (refer to FIG. 11) can be produced from the artist image management file, the artist image file, and a text file described later.

FIGS. 9A, 9B and 9C illustrate a group of work image files. The group of work image files also has one ID.

FIG. 9A illustrates a work image management file.

The management file is also used when the user accesses the server 1 to retrieve an image which is desired to be reviewed. The work image management file stores the name of an artist, the tile of the image, the year of issue of the image, a work category of the image, a descriptive text file ID, a file format, the number of image files, and image file names.

FIGS. 9B and 9C respectively illustrate images represented by the image file names stored in the work image management file shown in FIG. 9A. The image is specified by the image file name stored in the work image management file.

FIG. 9B illustrates the image having the first image file name in the work image management file shown in FIG. 9A. The amount of image data representing the image is large, and the resolution of the image is high.

FIG. 9C illustrates the image having the second image file name in the work image management file shown in FIG. 9A. The amount of image data representing the image is small, and the resolution of the image is low.

The artist image can be produced from the work image management file, the work image file, and a text file described later.

FIGS. 10A and 10B illustrate a group of text files. The group of text files has one ID.

FIG. 10A illustrates a text management file.

The text management file is also used when the user accesses the server 1 to retrieve an image which is desired to be reviewed. The text management file includes a file format, the number of text files, and a text file name.

FIG. 10B is a text represented by the text file having the text file name stored in the text management file shown in FIG. 10A.

When the artist image management file shown in FIG. 8A is found by retrieval, the descriptive text file ID stored in the artist image management file is read. A text file having the read descriptive text file ID is found (the file representing the text shown in FIG. 10B, for example). An artist image shown in FIG. 11, described later, for example, is produced from the found text file and the image management file.

Figure 11:
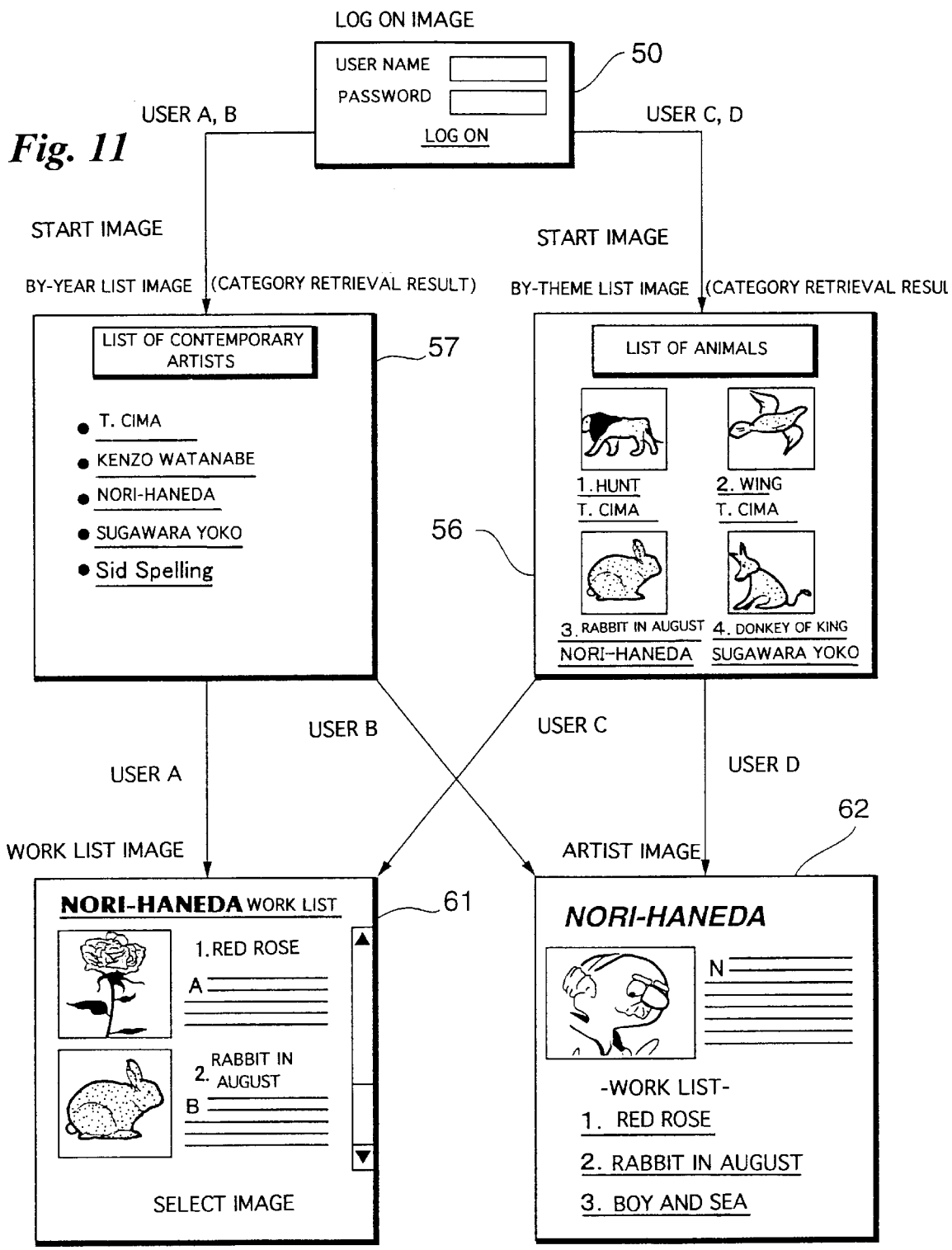
FIG. 11 illustrates a transition between images.
Figure 20:
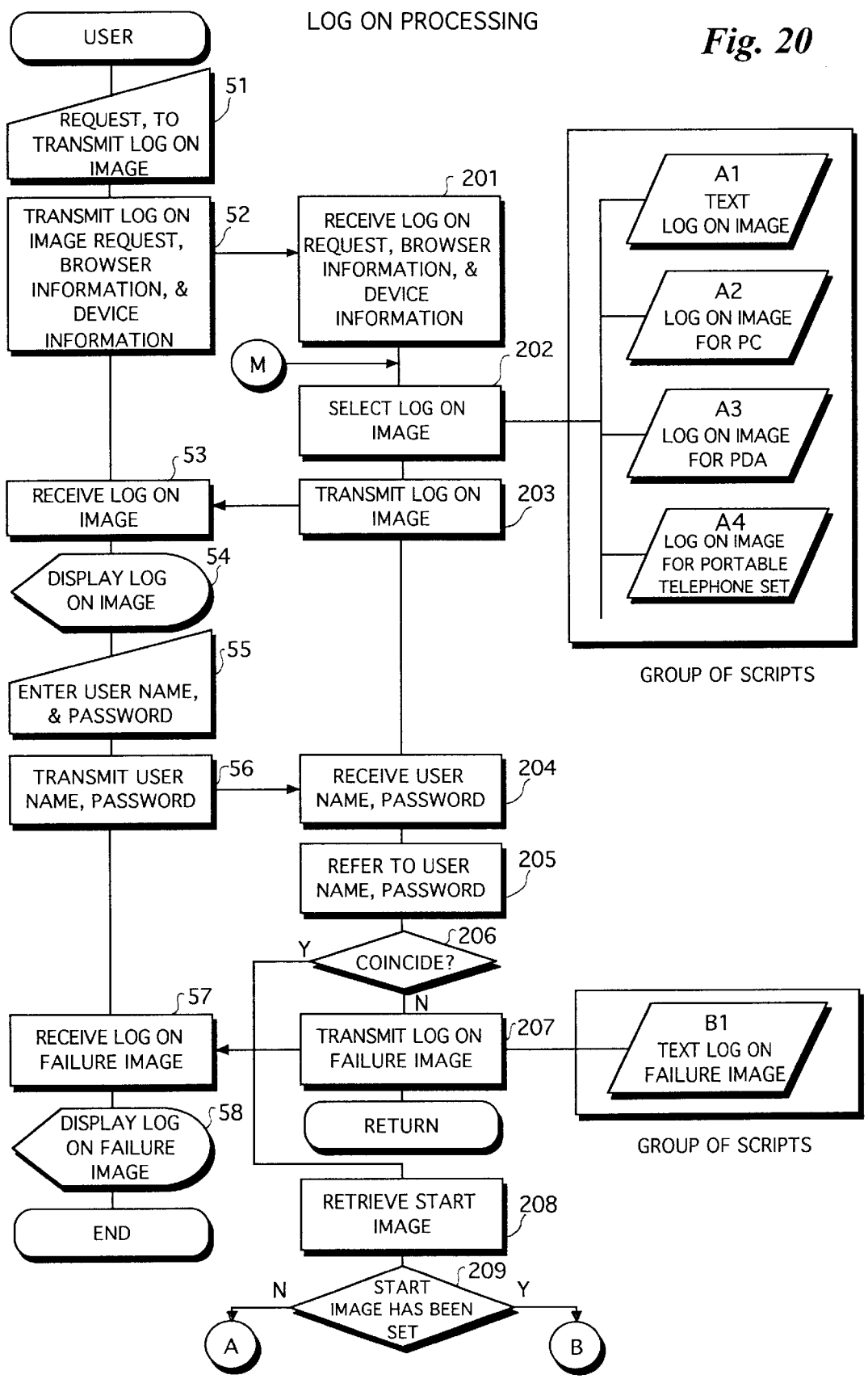
FIG. 20 is a flow chart showing log on processing.

FIG. 11 illustrates a transition of images which are displayed on the user display device.

In the image communication system according to the present embodiment, when the server 1 is first accessed, as described above, the log on image 50 is displayed on the user display device. It is confirmed whether or not the user who accesses the server 1 has authorization by the log on image 50. When it is confirmed that the user has authorization, the start image is displayed on the user display device.

A start image can differ depending on the user, as described above. For example, the start images by the users A and B are the by-year list image 57 (one of images obtained as a result of a category retrieval in accordance with the retrieval conditions in the above-mentioned user information). The start images by the users C and D are the by-theme list image 56 (one of images also obtained as a result of a category retrieval in accordance with the retrieval conditions in the user information).

Furthermore, in the image communication system according to the present embodiment, the link destination of an image can differ depending on the user, as described above. When the user A or B by which the by-year list image 57 is displayed as the start image clicks characters "NORI-HANEDA", for example, the work list image 61 is displayed on the user display device when the user A clicks the characters, while the artist image 62 is displayed on the user display device when the user B clicks the characters.

Similarly, when the characters "NORI-HANEDA" are clicked by the user C or D by which the by-theme list image 56 is displayed as the start image, the work list image 61 is displayed on the user display device when the user C clicks the characters, while the artist image 62 is displayed on the user display device when the user D clicks the characters.

FIGS. 12 to 19 respectively illustrate examples of scripts for displaying an image layout, a link destination, and so forth.

FIGS. 12 and 13 respectively illustrate scripts for displaying the by-year list image 57 shown in FIG. 11. FIG. 12 illustrates a script about the user A, and FIG. 13 illustrates a script about the user B. In the scripts, "function1" represents a link destination. In FIG. 12, function1 (a work list . . . ) is shown. Accordingly, a link from the by-year list image 57 to the work list image 61 is established. In FIG. 13, function1 (artist . . . ) is shown. Accordingly, a link from the by-year list image 57 to the artist image 62 is established.

FIGS. 14 and 15 respectively illustrate scripts for displaying the by-theme list image 56 shown in FIG. 11. FIG. 14 illustrates a script about the user C, and FIG. 15 illustrates a script about the user D. With respect to the user C, a link from the by-theme list image 56 to the work list image 61 is established. With respect to the user D, a link from the by-theme list image 56 to the artist image 62 is established.

FIG. 16 illustrates scripts for displaying the work list image on a display device in the portable telephone set 33, FIG. 17 illustrates a script for displaying the work list image on a display device in the personal digital assistant (portable information terminal) 32, FIG. 18 illustrates a script for displaying the work list image (the work list image shown in FIG. 11) on a display device in the notebook computer 31, and FIG. 19 illustrates a script for displaying the work list image on a display device in the personal computer 30.

In the scripts respectively illustrated in FIG. 12 to FIG. 19, mod indicates an operator for finding a remainder, Txt15 indicates a title text file ID "a list of contemporary artists", Txt16 indicates a title text file ID "a list of animal images", function1 indicates a link with a page of an argument 1, an argument 2 indicates retrieval conditions (a character string marked off by a comma in small parentheses of function is an argument. When there are a plurality of arguments, the first argument is an argument 1, and the subsequent argument is an argument 2), function3 indicates display using a font for the argument 1, function4 indicates display of a text using a point of an argument, function5 indicates display of characters, whose number corresponds to the number of characters composing the argument 1, from the head in a size two times the original size, function6 indicates display using characters whose number is within the number of characters composing the argument 1, function10 indicates display in colors whose number corresponds to the number of colors of the argument 1, function11 indicates display in a size corresponding to the size of the argument 1 by the size of the argument 2, function21 indicates that the color of the argument 1 is a foreground color and the color of the argument 2 is a background color, function31 indicates framing with a line width of an argument, and function32 indicates underlining with a line width of the argument 1.

Furthermore, a portion enclosed by < >is interpreted as a tag. A layout and a file arrangement are realized by the tag.

The layout includes multiple column and alignment.

The multiple column is realized by the following formats:

\<begin column 1\>

(content in the first column)

\<end column 1\>

\<begin column 2\>

(content in the second column)

\<end column 2\>

\<begin column N\>

(content in the N-th column)

\<end column N\>

When the column 1 is produced in the course of the multiple column, the multiple column is nested (has a hierarchical structure).
<begin column 1>
  <begin column 1>
    :
  <end column 1>
  <begin column 2>
    :
  <end column 2>
<end column 1>

The alignment includes left justification, centering, and right justification, and is realized by the following formats:
<begin left>
  :
(left justification)
  :
<end left>
<begin center>
  :
(centering)
  :
<end center>
<begin right>
  :
(right justification)
  :
<end right>

Furthermore, a display area is produced over a plurality of columns in the following manner.
<begin column 1>
  :
<region #1,120,80>
  :
<end column 1>
<begin column 2>
<. . . using region #1>
  :
<end column 2>

In the course of the column 1, a display area having region ID=#1 is ensured in a size of 120×80, and a display area which is coupled to the region is used at the beginning of the column 2.

In order to acquire the content of the management file in the script, a value shall be accepted in a variable in the following manner using a manage tag.
A= <manage (Img1, image title)>
An image title having file ID=Img1 is substituted in the variable #A.

Furthermore, when an attempt to arrange the management file in the script is made, the following shall be describable.
<file manage (Img1, image title)>
Not an image having file ID=Img1 but the title of the image (a text) is arranged in the script.

A character string, starting with "#", shall be a variable herein. Further, in order to reflect the result of retrieval on the script, the following retrieval variables are defined:
Count
  the number of cases which have hit retrieval
FileID( )
  the file ID arrangement of a file which has hit retrieval
SearchCondition
  retrieval conditions to be handed to a page at a link destination For example,
SearchCondition="File format=artist and date of birth≧1950/1/1"

In order to perform repetitive processing or the like, a control tag is defined.
If . . . then . . . else . . . endif tag
This is an interpretive tag with conditions. It is for interrupting a script in a predetermined range only when it coincides with the conditions.
for . . . to . . . next tag
This is a repeated interpretive tag.

The arrangement of a file is basically realized by designating a file tag and a file ID. Processing can be added, as required.

Processing is added by adding a function parameter to the file tag. An argument can be described in the function parameter. When a plurality of functions, they are interpreted rightward from the left.

For example,
<file Img1>
It means the arrangement of an (image) file having file ID=Img1.
<file Txt32 function 3(2)>
It means the arrangement of a (text) file having file ID=Txt32. In the case, processing designated by function 3 is performed. For example, a frame having a thickness 2 is added. An example is display in a color assigned a color number 2.
<file Btn12 function1 (I101)>
It means the arrangement of a (button) file having file ID=Btn12. When function 1 shall be setting of a link, a link with I101 ("work list image" defined by the user) is executed.
<file Img2 function4 (400,300) function7 (256)>
In the case of such processing that function 4(x,y) means a size of x × y and function 7(i) means i colors, an image closest to 400×300 is selected as an image file Img2. If there is no image in colors whose number is not more than 256, the image is transmitted to the display side after it is subjected to color reduction processing.

(2) Communication Processing

FIGS. 20 to 41 are flow charts showing the procedure for communication processing (retrieval of a desired work image) between the server 1 and the user device. FIGS. 42 to 57 respectively illustrate examples of images displayed on the display device connected to the user device. In FIGS. 42 to 57, an image represented by text data is illustrated, except in FIGS. 47 to 49 and 57. When the user device can display an image other than the text (an image representing a picture), however, an image including the picture or the like is displayed.

I. Log on Processing

Log on processing is first performed.

A request to transmit a log on image is entered by the user device (step 51). Consequently, the log on image request, browser information (which browser is installed, or whether or not no browser is installed) in the user device, and information relating to the user device (for example, the number of colors which can be displayed on the display device connected to the user device, the size of an image which can be displayed, etc.) are transmitted to the server 1 from the user device (step 52).

The log on image request, the browser information, the device information which have been transmitted from the user device are received by the user 1 (step 201). Image data representing a suitable log on image which can be displayed on the display device connected to the user device is selected from the hard disk for the server 1 on the basis of the browser information and the device information which have been transmitted from the user device (step 202). The hard disk for the server stores image data respectively representing a text log on image, a log on image for a PC (Personal Computer) (a log on image for a personal computer and a log on image for a notebook computer are stored, as required), a log on image for a PDA (Personal Digital Assistant), and a log on image for a portable telephone set. Suitable image data which conforms to the user device is selected in the server 1. Image data representing the selected log on image is transmitted to the user device from the server 1 (step 203).

The image data representing the log on image which has been transmitted from the server 1 is received in the user device (step 53). The received image data is fed to the display device, where the log on image is displayed (step 54, see FIG. 42).

Figure 42:
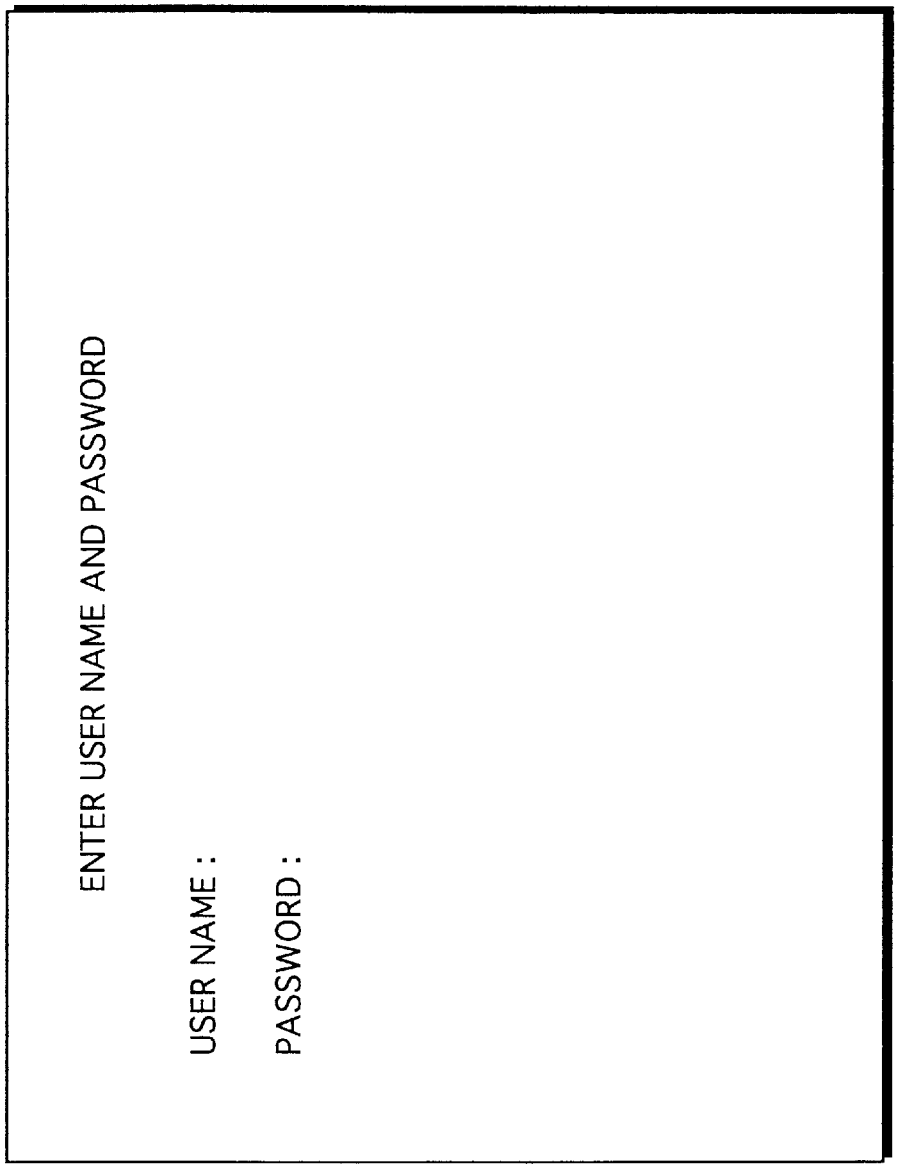
FIG. 42 illustrates a log on image.

FIG. 42 illustrates an example of a text log on image. When no browser is installed in the user device, the text log on image is displayed. In the text log on image, an instruction to enter a user name and a password is displayed. The user enters his or her own name and password in accordance with the instruction (step 55). The user name and the password which have been entered are transmitted to the server 1 from the user device (step 56).

If the log on image is for a portable telephone set, a slight ornament such as clip art is attached to the log on image. If the log on image is for a PDA, an ornament is further attached to the log on image for a portable telephone set. If the log on image is for a PC, an ornament is further attached to the log on image for a PDA. The log on image suitable for the device which has accessed the server (suitable for the browser) is displayed on the display device connected to the user device.

In the server 1, the user name and the password which have been transmitted from the user device are received (step 204). User information stored in the hard disk for the server 1 is referred to. It is checked whether or not the user name and the password which have been transmitted from the user device are stored in the user information, that is, it is checked whether or not there are a user name and a password in the user information which coincide with the user name and the password which have been transmitted or, it is checked whether or not the transmitted user name and the transmitted password have a predetermined relation (step 205).

If there are no user name and no password in the user information which coincide with the transmitted user name and the password (NO at step 206), image data representing a text log on failure image stored in the hard disk for the server 1 is read out. The image data read out is transmitted to the user device from the server 1 (step 207).

In the user device, image data representing the log on failure image is received (step 57). The image data is fed to the display device connected to the user device. Consequently, the log on failure image is displayed on the display device connected to the user device (step 58).

In the image communication system according to the present embodiment, the user can set a start image displayed subsequently to the log on image on the display device connected to the user device. When there are a user name and a password in the user information which coincide with the transmitted user name and the password (YES at step 206), therefore, user information (see FIG. 7) is referred to, and it is checked whether or not the start image of the user which has been logged on has been set by the user (step 209).

Figure 22:
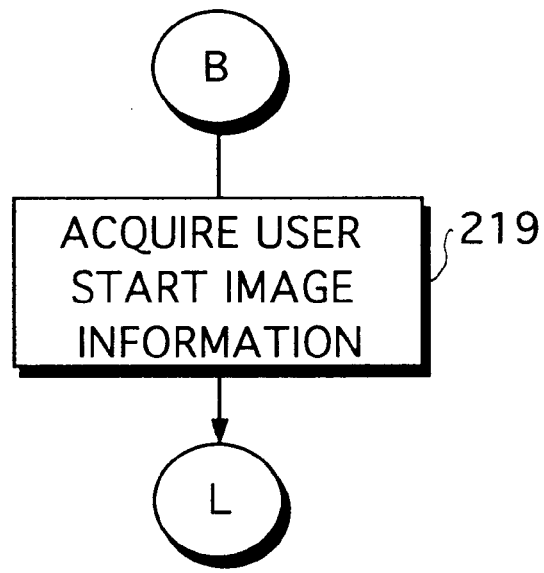
FIG. 22 is a flow chart showing user start image processing.

When the start image has been set (YES at step 209), the program proceeds to user start image processing shown in FIG. 22.

II. Start Image Processing

In the start image processing, the user information is referred to, so that start image information representing a start image of a user who accesses the server 1 (information stored in a start image item in the user information shown in FIG. 7) is read out (step 219). When the start image information representing the start image is read out, the program proceeds to link processing shown in FIG. 32. It is checked which of images is the start image on the basis of the start image information read out of the user information (steps 311 to 320). The set image is displayed subsequently to the log on image as the start image on the display device connected to the user device.

Figure 23:
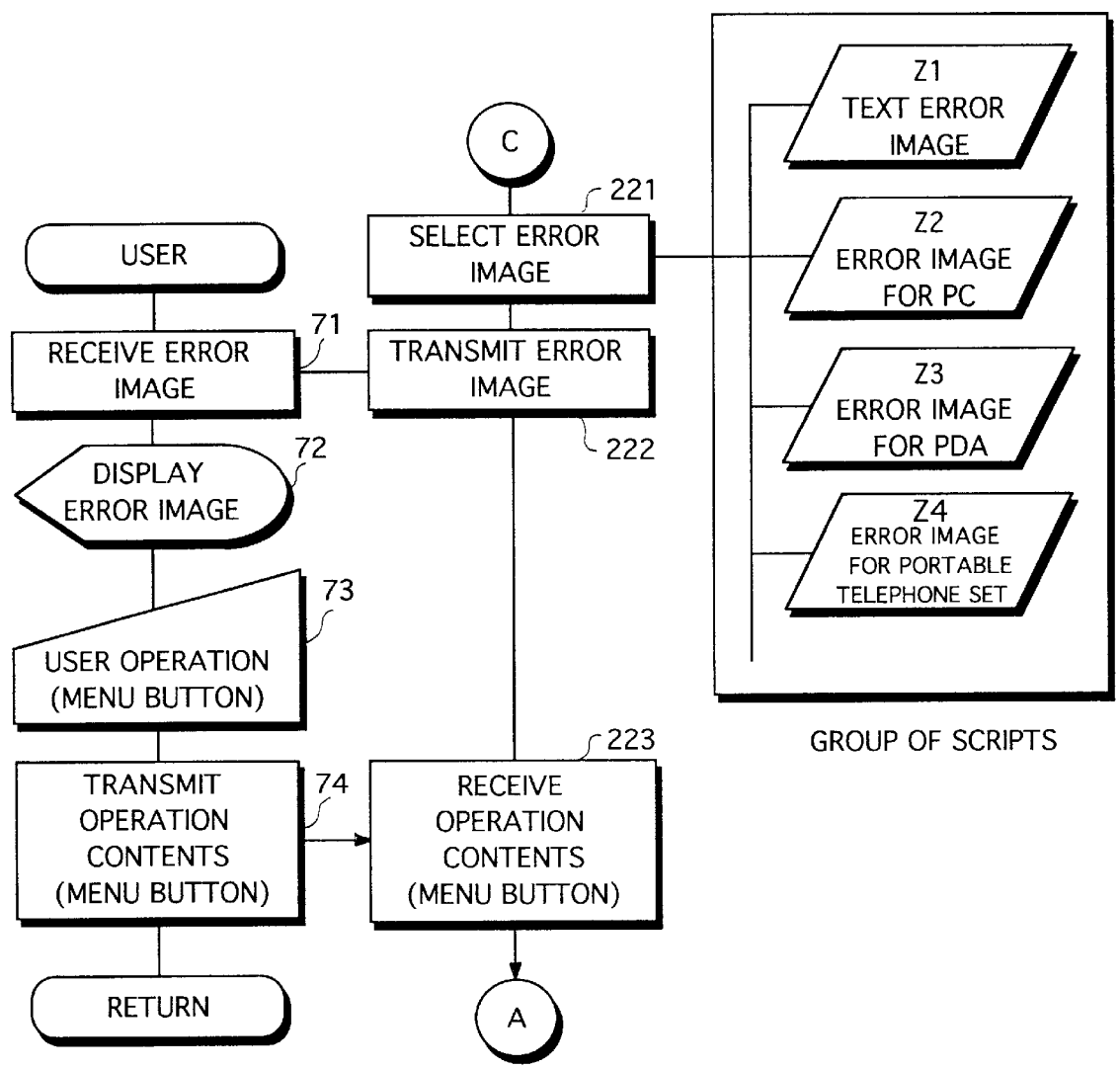
FIG. 23 is a flow chart showing error image processing.

If the start image coincides with none of the images, the program proceeds to error image processing shown in FIG. 23, assuming that an error occurred.

III. Error Image Processing

In the error image processing, an error image which is suitable for the user device and the browser is selected out of image data representing error images which are recorded on the hard disk for the server 1 (step 221). The error image is produced in the server 1, and data representing the error image is transmitted to the user device from the server 1 (step 222).

When the data representing the error image which has been transmitted from the server 1 is received in the user device (step 71), data representing the error image is fed to the display device connected to the user device. The error image is displayed on the user display device (step 72).

The error image includes a menu button. When the menu button is selected by the user (step 73), data indicating that the menu button has been selected is transmitted to the server 1 from the user device (step 74).

Figure 21:
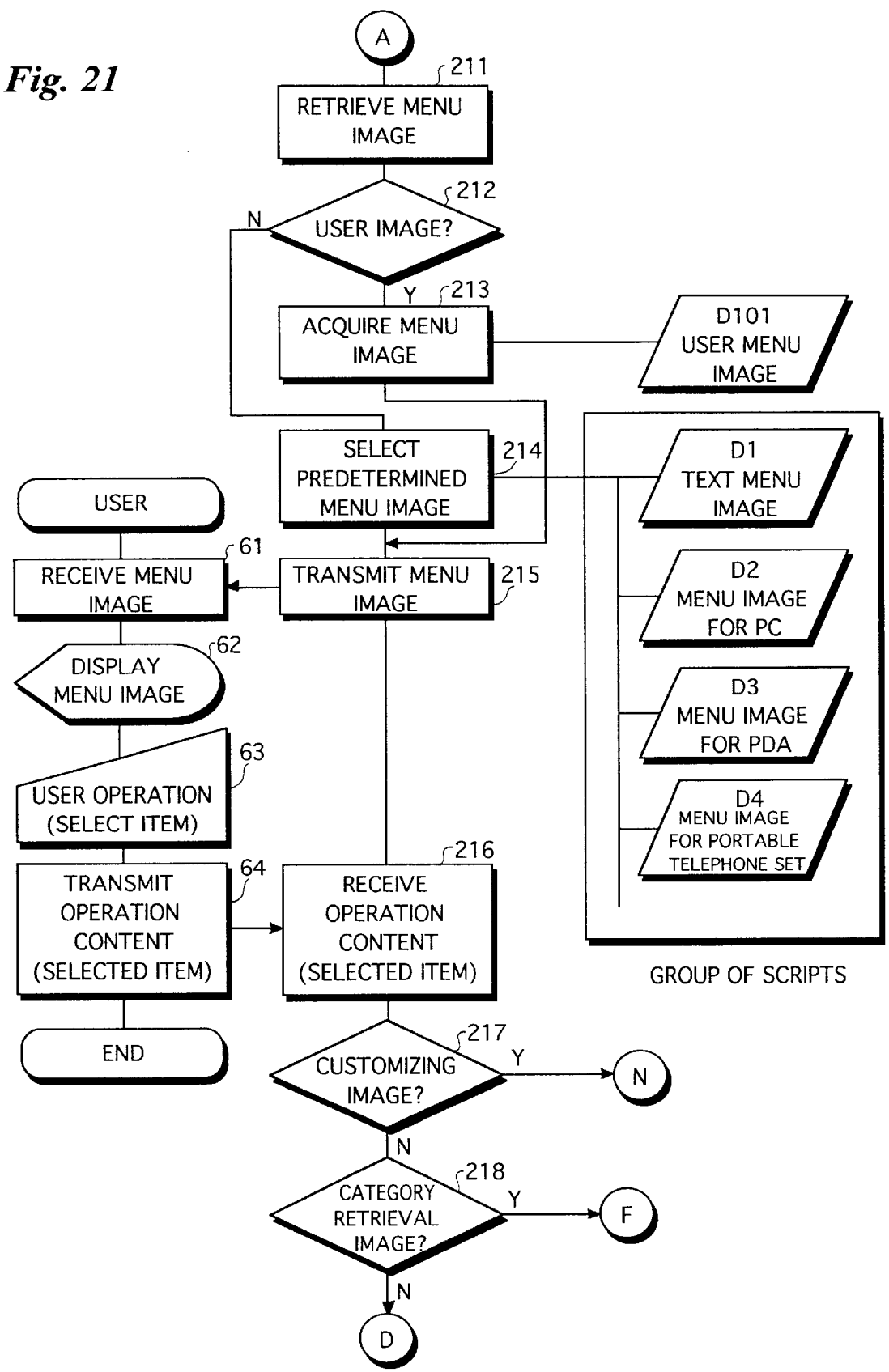
FIG. 21 is a flow chart showing menu image processing.

When the data indicating that the menu button has been pressed is received in the server 1 (step 223), the program proceeds to menu image processing shown in FIG. 21.

Unless the start image has been set by the user (NO at step 209 in FIG. 20), the program proceeds to the menu image processing shown in FIG. 21.

IV. Menu Image Processing

In the image communication system according to the present embodiment, an image to be displayed on the user display device can be customized by the user himself or herself, as described above. A menu image is retrieved (step 211), so that it is checked whether or not the menu image is customized by the user. When "No" is described on the user information shown in FIG. 7, it is indicated that the menu image is not customized by the user. When the menu image is not customized, a predetermined image is displayed.

When the menu image is not customized by the user (No at step 212), data suitable for the user device which accesses the server 1 and the browser out of data representing a predetermined menu image is read out of the hard disk for the server 1 (step 214). The data representing the menu image read out is transmitted to the user device from the server 1 (step 215).

When the menu image is customized by the user (YES at step 212), data representing the customized menu image (a user image) is read out of the hard disk for the server 1. Data representing the menu image read out is transmitted to the user device from the server 1 (step 215).

Even when the menu image is customized by the user, the server 1 may, in some cases, be accessed by a device which cannot display the customized menu image. In the case, data which can be displayed by the user device (for example, text data) out of the data representing the customized menu image is transmitted to the user device from the server 1.

Figure 43:
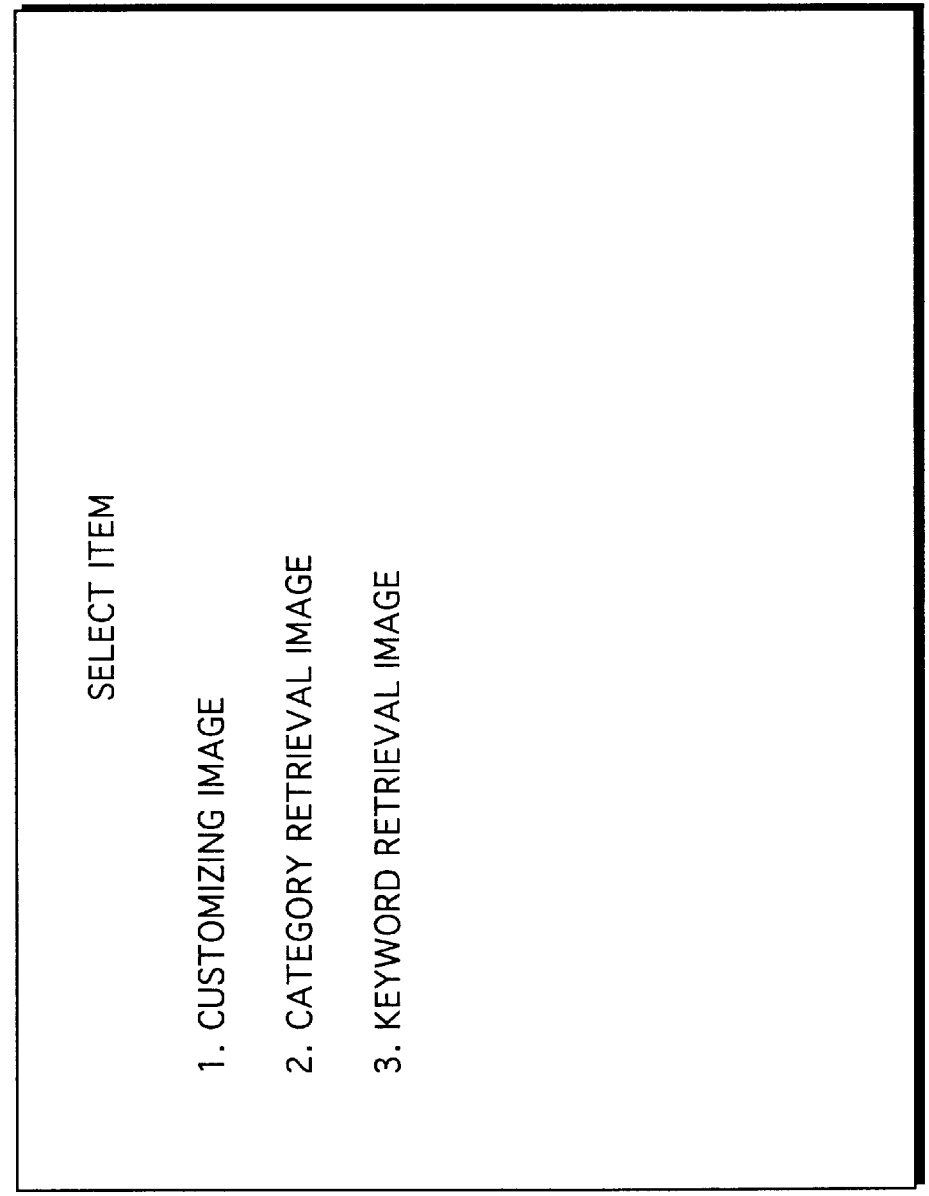
FIG. 43 illustrates a menu image.

When the data representing the menu image which has been transmitted from the server 1 is received in the user device (step 61), the data representing the menu image is fed to the user display device. On the user display device, the menu image is displayed, as shown in FIG. 43 (step 62).

In the menu image, items "1. Customizing Image", "2. Category Retrieval Image", "3. Keyword Retrieval Image" are displayed. The user selects the image (item) to be displayed on the display device out of the items (step 63). Data representing the selected item is transmitted to the server 1 from the user device (step 64).

When the data representing the item which has been transmitted from the user device is received in the server 1 (step 216), it is checked which of the images "1. Customizing image", "2. Category Retrieval Image", and "3. Keyword Retrieval Image" needs to be displayed (steps 217 and 218).

If the user selects "1. Customizing image" (YES at step 217), customize menu processing shown in FIG. 33 is performed.

V. Customize Menu Processing

Figure 33:
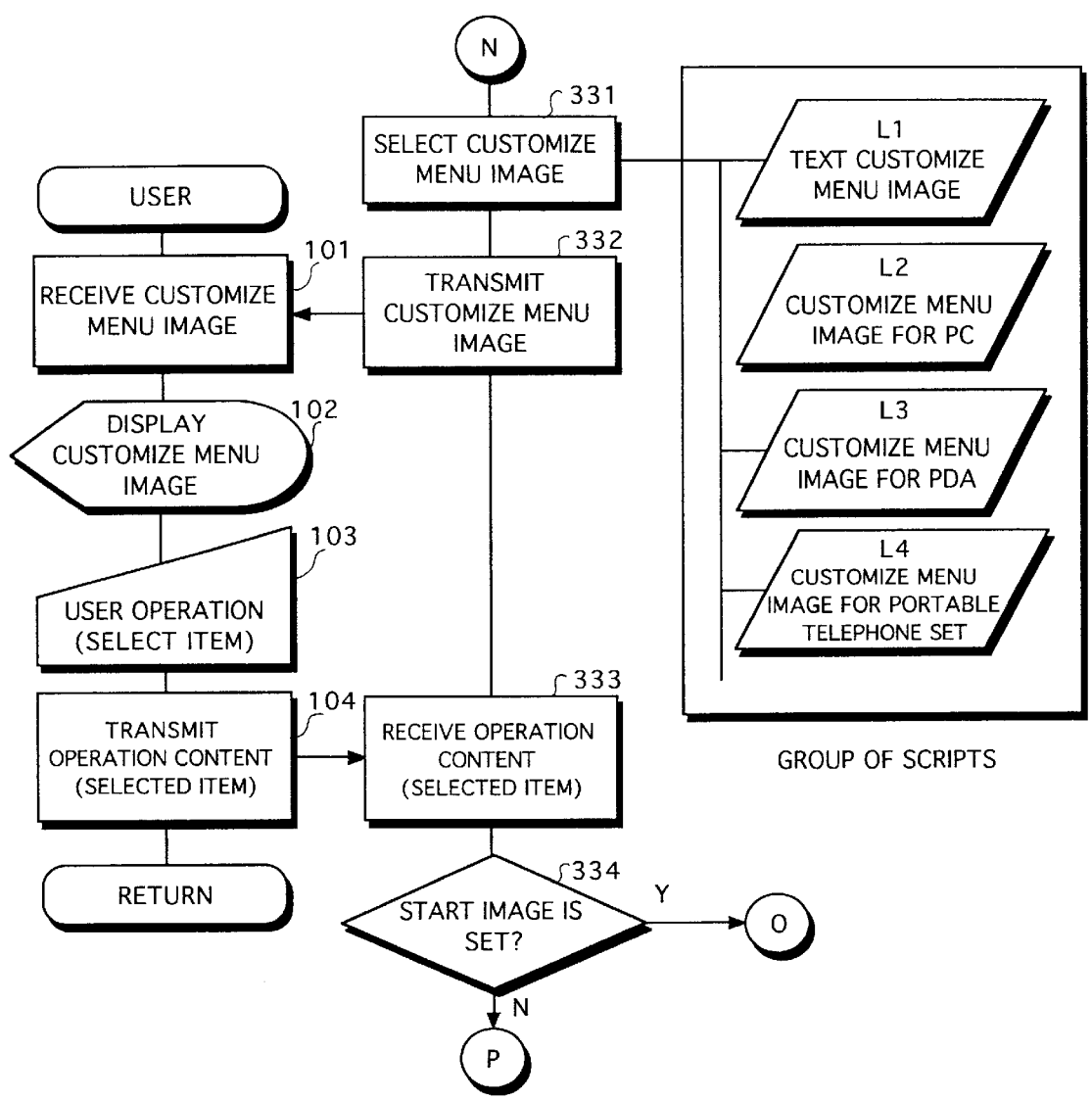
FIG. 33 is a flow chart showing customize menu processing.

Referring to FIG. 33, data representing a customize menu image which is suitable for the user device and the browser is read out of the server 1 (step 331). The data read out is transmitted to the user device from the server 1 (step 332).

Figure 50:
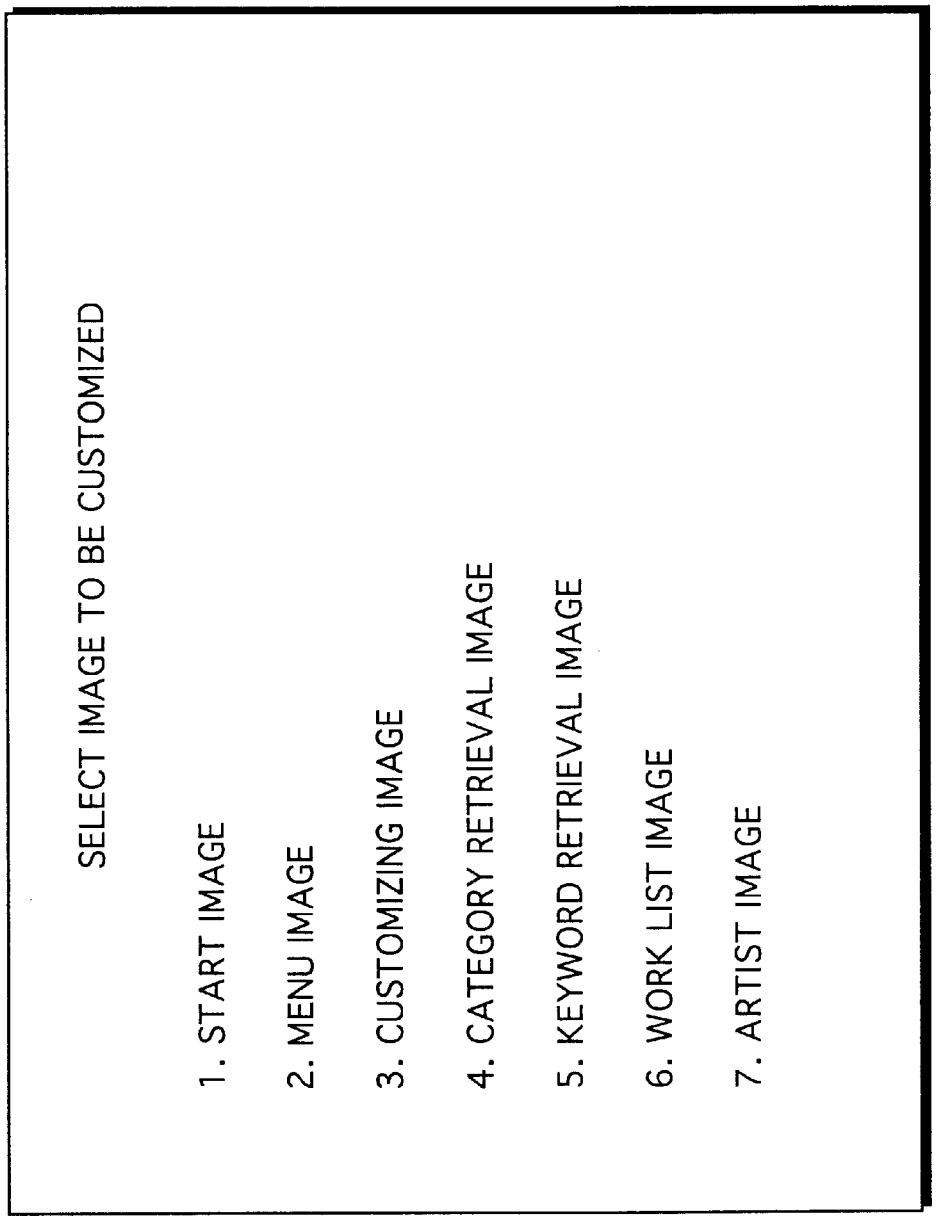
FIG. 50 illustrates a customize menu image.

When data representing the customize menu image which has been transmitted from the server 1 is received in the user device (step 101), the customize menu image is displayed, as shown in FIG. 50, on the user display device (step 102). An instruction to select an image to be customized by the user is displayed on the customize menu image. Examples of the image which can be customized include "1. Start Image (which of images is taken as a start image, that is, an image displayed subsequently to the log on image is set), "2. Menu Image", "3. Customizing Image", "4. Category Retrieval Image", "5. Keyword Retrieval Image", "6. Work List Image", and "7. Artist Image". The user selects the image to be customized out of the images (items) (step 103). Data representing the selected image (item) is transmitted to the server 1 from the user device (step 104).

When data representing the item selected by the user is received in the server 1 (step 333), it is checked whether or not the item indicates the setting of the start image (step 334).

Figure 34:
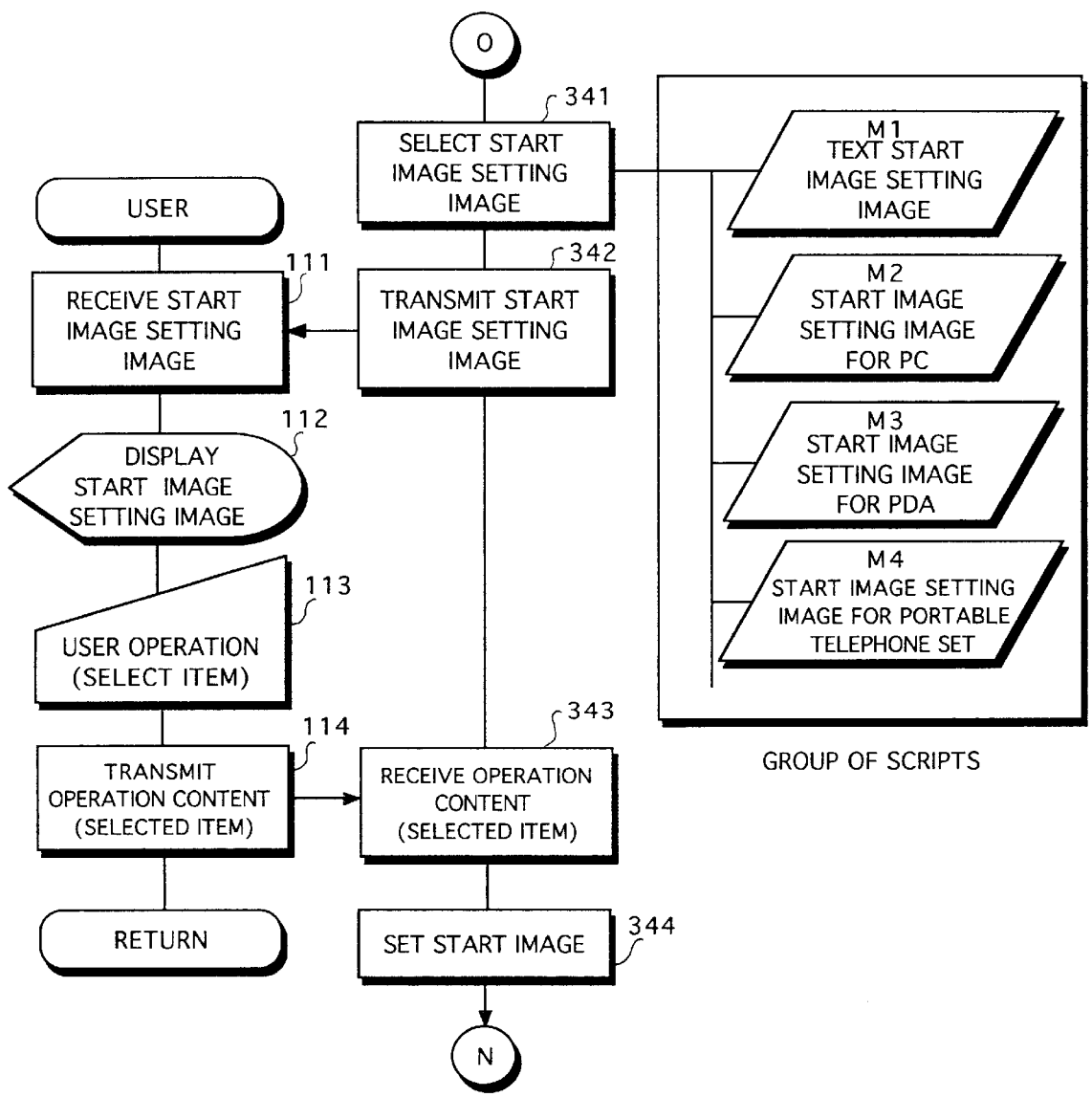
FIG. 34 is a flow chart showing start image setting processing.

If the item selected by the user indicates the setting of the start image (YES at step 334), the program proceeds to start image setting processing shown in FIG. 34.

VI. Start Image Setting Processing

Referring to FIG. 34, a start image setting image which is suitable for the user device and the browser is read out of the hard disk for the server 1 (step 341). Data representing the start image setting image read out is transmitted to the user device from the server 1 (step 342).

When the data representing the start image setting image which has been transmitted from the server 1 is received in the user device (step 111), the data representing the start image setting image is fed to the user display device. The start image setting image is displayed on the user display device (step 112).

Figure 51:
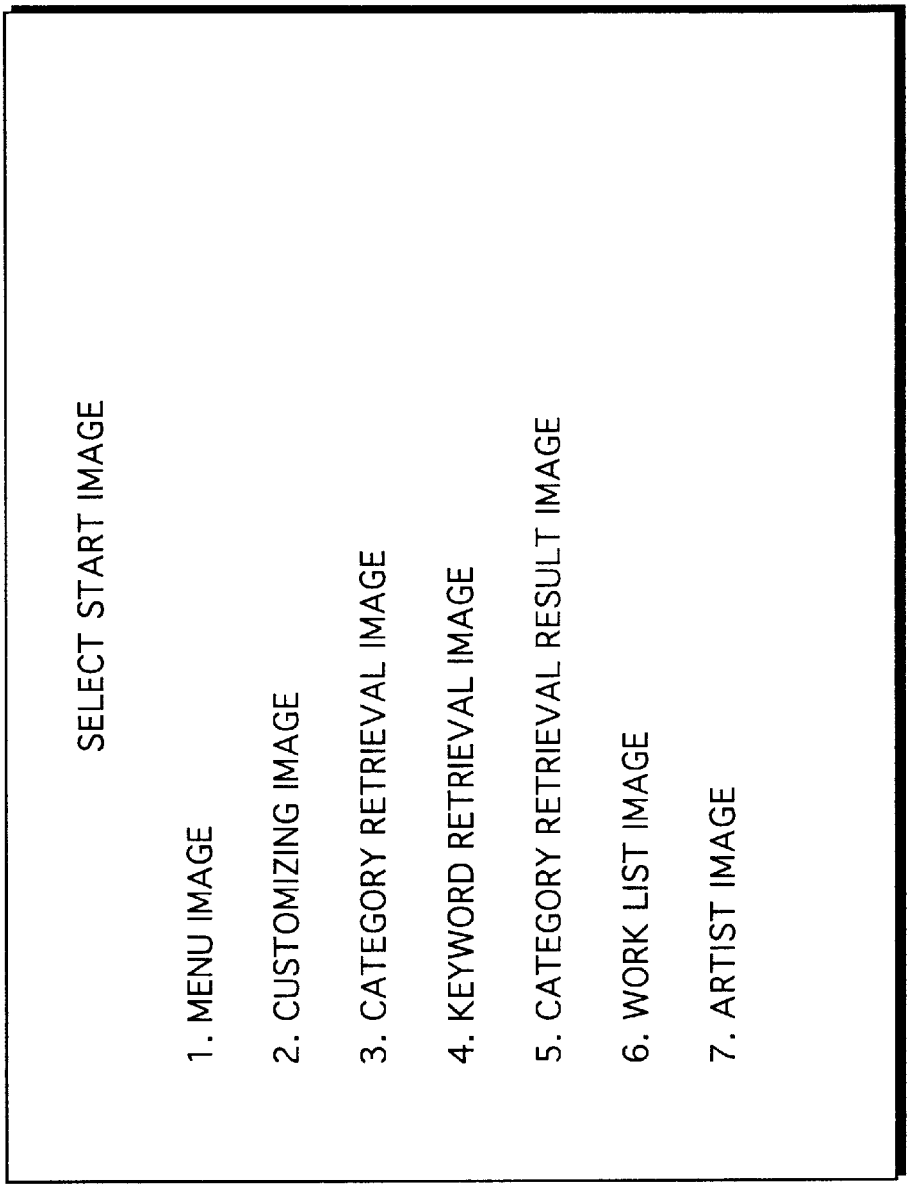
FIG. 51 illustrates a start image setting image.

FIG. 51 illustrates an example of the start image setting image displayed on the user display device.

An instruction to select a start image and items of selectable start images are displayed on the start image setting image. In the present embodiment, "1. Menu Image", "2. Customizing image", "3. Category Retrieval Image", "4. Keyword Retrieval Image", "5. Category Retrieval Result Image", "6. Work List Image", and "7. Artist Image" can be selected as the start image. The items are displayed on the start image setting image. Any one of the items is selected by the user (step 113). Data representing the selected item is transmitted to the server 1 from the user device (step 114).

In the server 1, data representing the selected item which has been transmitted from the user device is received (step 343). The start image is written into the corresponding start image item in the user information (step 344). When the user A selects "5. Category Retrieval Result Image", for example, as the start image, "Category Retrieval Result Image" is written into the start image item in the user information shown in FIG. 7. Thereafter, the program is returned to the customize menu image processing shown in FIG. 33.

Figure 35:
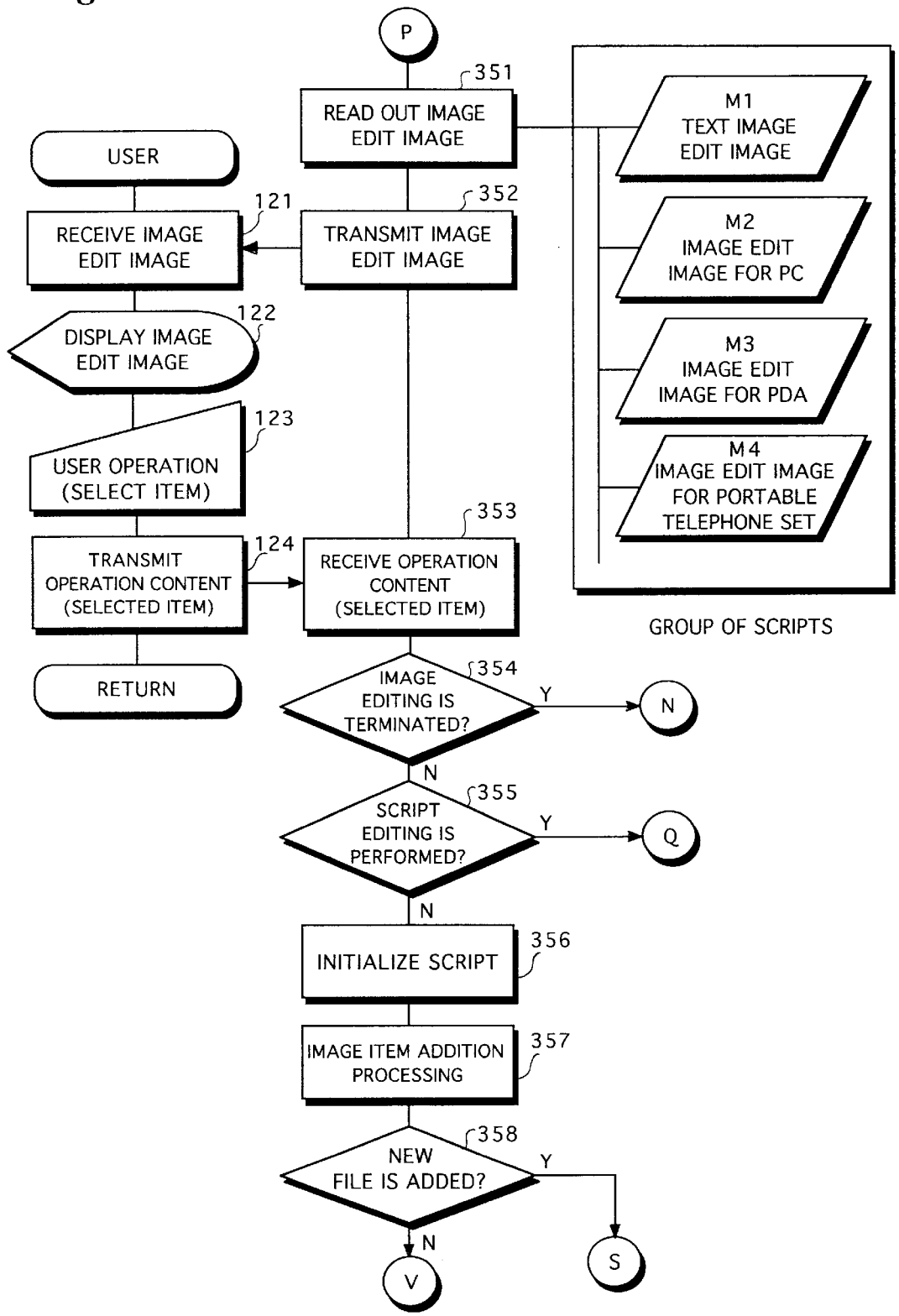
FIG. 35 is a flow chart showing image editing main processing.

In a case where a customize menu image shown in FIG. 50 is displayed on the user display device, when the item other than the customizing of the start image is selected (NO at step 334), the program proceeds to image editing main processing shown in FIG. 35. The image editing main processing is for judging whether image editing is performed by adding an item or by batch script editing.

VII. Image Editing Main Processing

In the image editing main processing, data representing an image edit image which is suitable for the user device and the browser is read out in the server 1 (step 351). Data representing the image edit image read out is transmitted to the user device from the server 1 (step 352).

When the data representing the image edit image which has been transmitted from the server 1 is received in the user device (step 121), the data representing the image edit image is fed to the user display device (step 122). The image edit image as shown in FIG. 52 is displayed on the user display device (step 123). "Do you add item or do you edit script? When you add item, enter item to be added" is displayed on the image edit image.

The user enters an instruction to perform either item addition or script editing into the user device in accordance with the display on the image edit image. If an item is to be added, the item to be added is entered (step 124). Selection data representing the addition of the item selected by the user (and the name of the item to be added) or the script editing is transmitted to the server 1 from the user device (step 124).

When the selection data which has been transmitted from the user device is received in the server 1 (step 353), it is judged whether image editing is terminated (step 354), script editing is performed (step 355), and item addition is performed.

If the image editing is terminated (the termination of the image editing can be designated by the user, although it is omitted in FIG. 52) (YES at step 354), the program proceeds to the customize menu image processing shown in FIG. 33.

Figure 36:
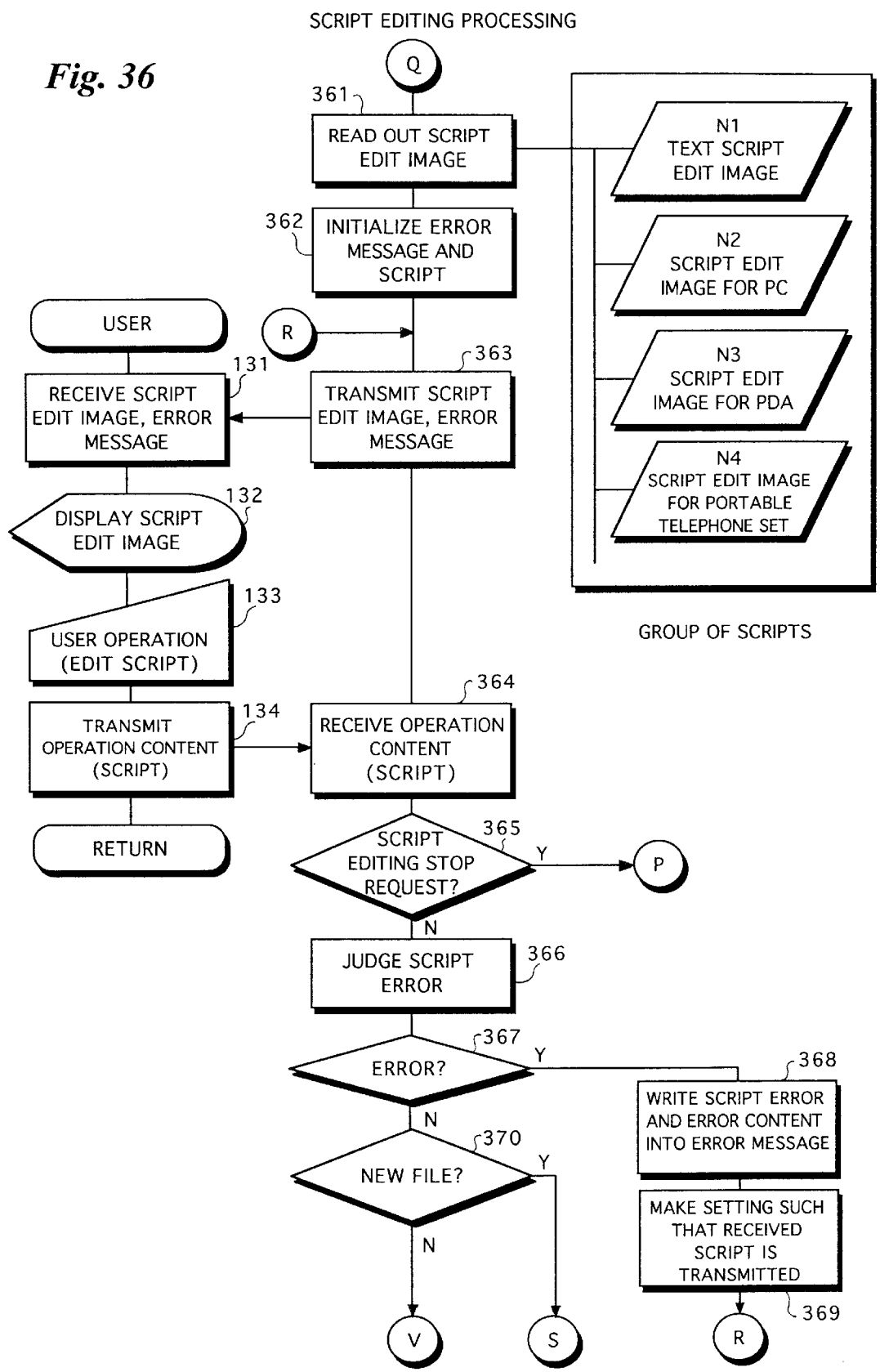
FIG. 36 is a flow chart showing script editing processing.

If the script editing is performed (YES at step 355), the program proceeds to script editing processing shown in FIG. 36.

VIII. Script Editing Processing

Referring to FIG. 36, if the script editing processing is performed, data representing a script edit image which is suitable for the user device and the browser is read out of the hard disk for the server (step 361). Further, a script for an edit image which the user attempts to customize is initialized (step 362). The data read out is transmitted to the user device from the server 1 (step 363).

When the data representing the script edit image which has been transmitted from the server is received in the user device (step 131), the data representing the script edit image is fed to the user display device. The script edit image as shown in FIG. 53 is displayed on the user device (step 132).

Characters "We will perform batch editing by script. Enter script." are displayed on the script edit image. When a script is entered by the user (step 133), the entered script is displayed on the script edit image. Data representing the script entered by the user is transmitted to the server 1 from the user device (step 134).

When the data representing the script which has been transmitted from the user device is received in the server 1 (step 364), it is judged whether or not a request to stop script editing is issued (step 365) (the stop of script editing can be also entered by the user, although it is omitted in FIG. 53).

If the script editing stop request is issued (YES at step 365), the program is returned to the image editing main processing shown in FIG. 35.

If the script editing stop request is not issued (NO at step 365), it is checked whether or not an error occurs in the transmitted data representing the script (steps 366 and 367).

If an error occurs (YES at step 367), an error message is taken as a script error, and the content thereof is written as a script into the error message (step 368). Setting is made such that the script which has been transmitted from the user is transmitted to the user (step 369). The script which has been transmitted from the user is returned to the user.

If no script error occurs (NO at step 367), it is judged whether or not a file representing an image composing an edit image defined by an edited script is a new file which is not stored in the hard disk for the server 1 (step 370).

Figure 38:
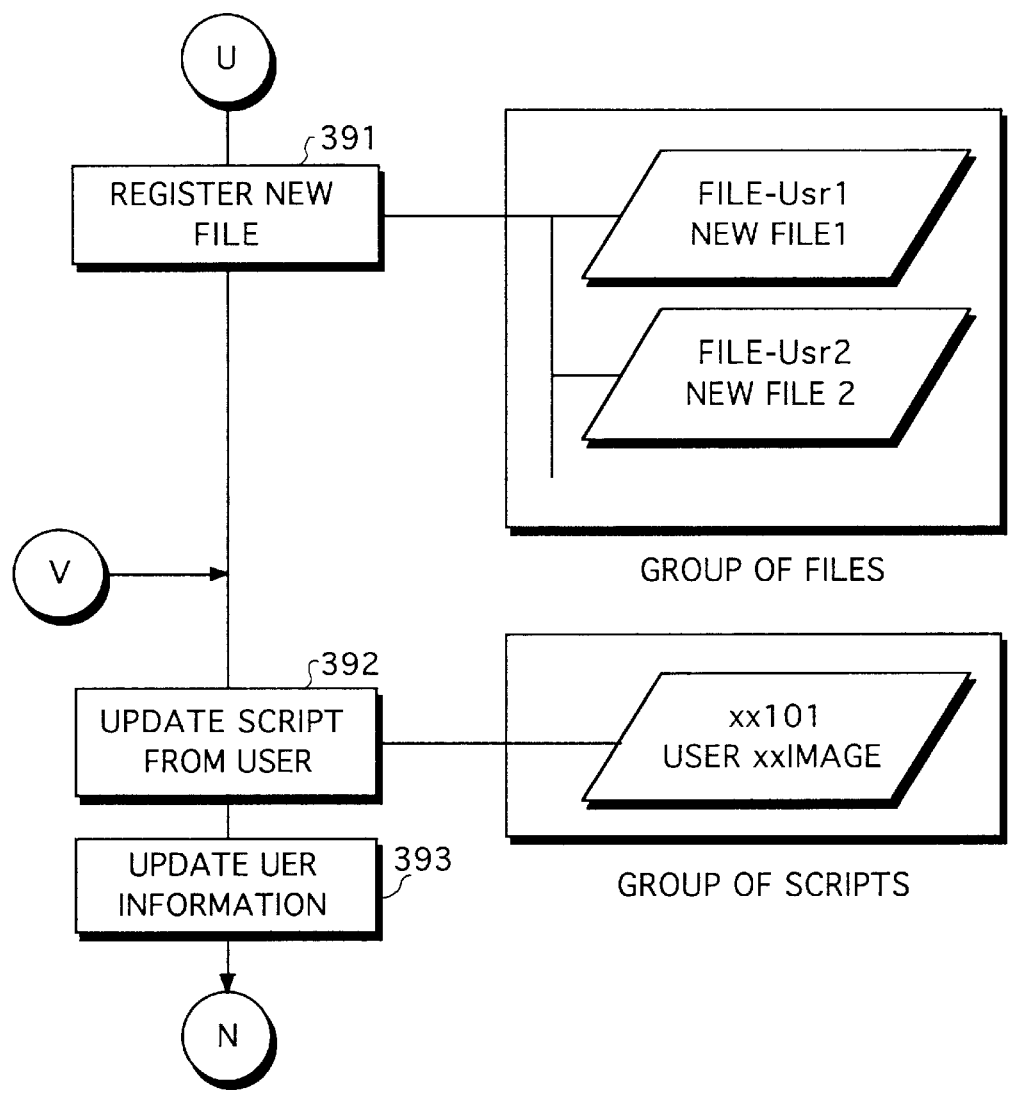
FIG. 38 is a flow chart showing customize content reflection processing.

If there is no new file (NO at step 370), the program proceeds to customize content reflection processing shown in FIG. 38.

IX. Customize Content Reflection Processing

Data representing an image selected by the user is updated in accordance with the script which has been transmitted from the user. The updated data is stored in the hard disk for the server 1 (step 392). Further, user information relating to a customized image is updated (step 393). Thereafter, the program proceeds to the customize menu processing shown in FIG. 33.

Figure 37:
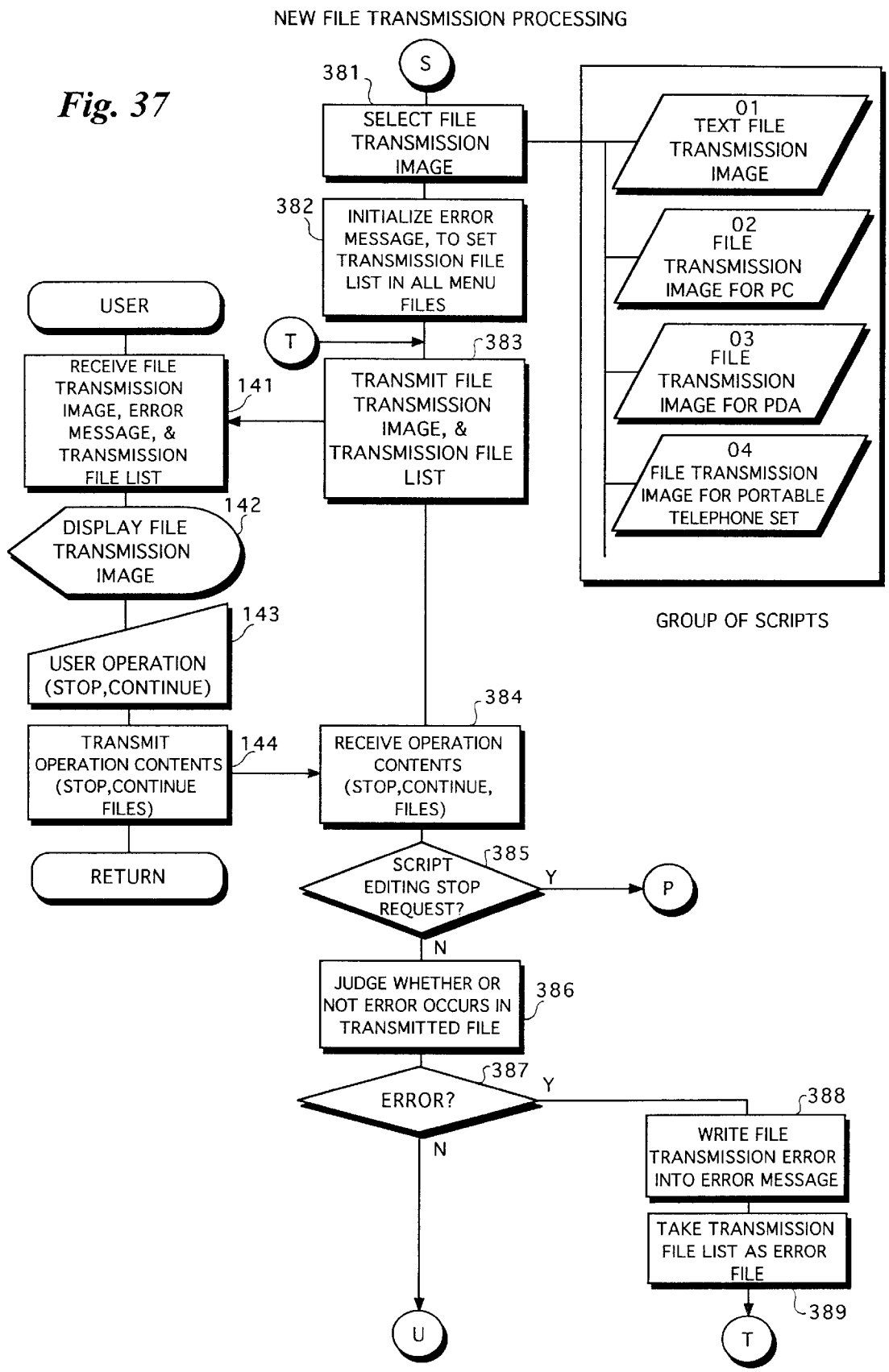
FIG. 37 is a flow chart showing new file transmission processing.

If there is a new file (YES at step 370), the program proceeds to new file transmission processing shown in FIG. 37.

X. New File Transmission Processing

In the server 1, data representing a file transmission image which is suitable for the user device and the browser is read out (step 381). An error message is initialized, and a transmission file list is set in all new files (set such that all the new files are transmitted to the server) (step 382). Data representing the file transmission image, the error message, and the transmission file list are transmitted to the user device from the server 1 (step 383).

Figure 54:
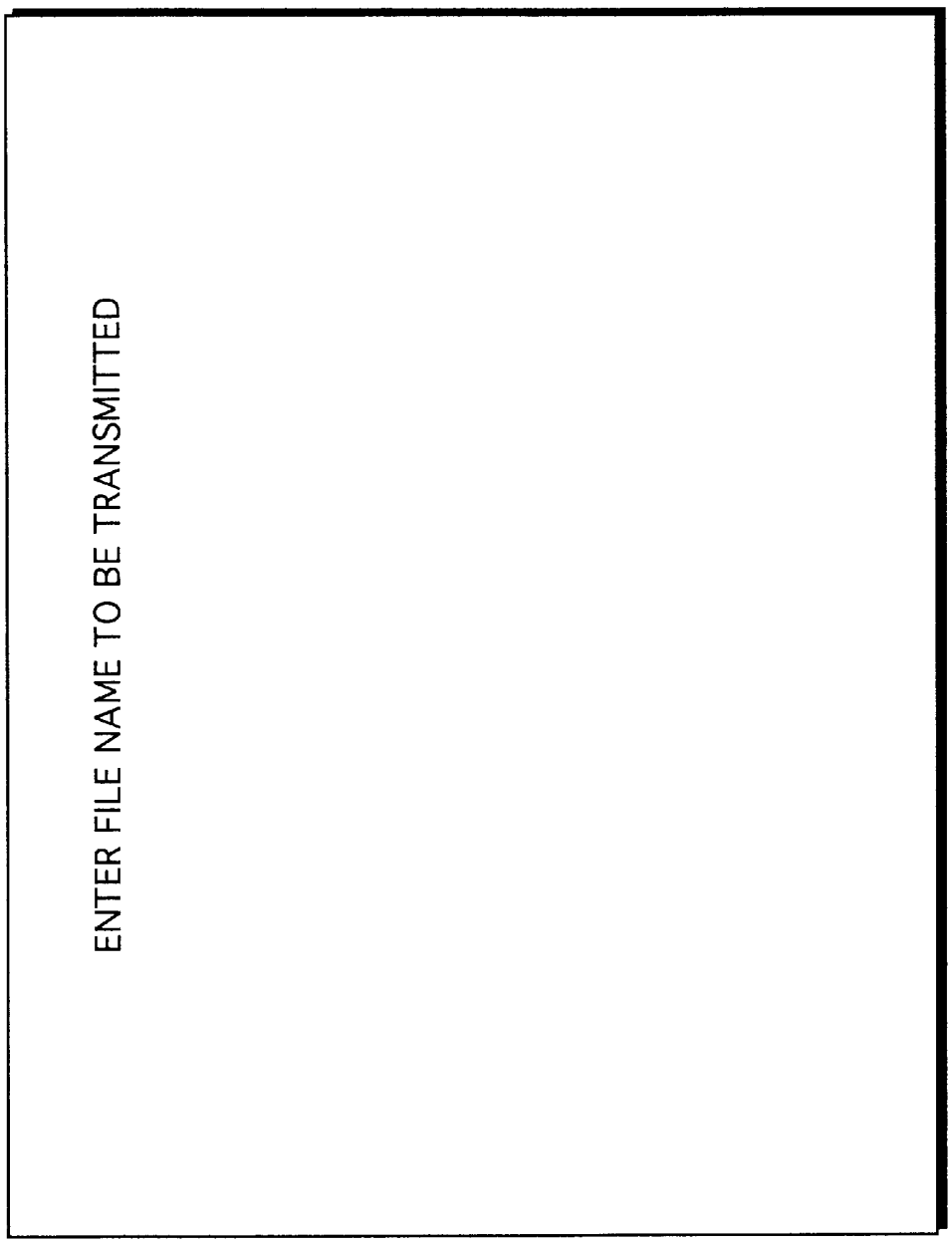
FIG. 54 illustrates a file transmission image.

When the data representing the file transmission image, the error message, and the transmission file list are received in the user device (step 141), the received data are transmitted to the user display device (step 142). The file transmission image is displayed, as shown in FIG. 54, on the user device (step 142). A file name representing a new image file is entered by the user (step 143). The entered file name is described on the file transmission image. A file specified by the entered file name is read out of the user device, and is transmitted to the server 1 (step 144).

In the server 1, the file which has been transmitted from the user device is received in the server 1 (step 384). It is checked whether or not a script editing stop request is issued from the user (step 385) (the script editing stop request can be also set by the user, although the illustration thereof is omitted in FIG. 54).

If the script editing stop request is issued (YES at step 385), the program proceeds to the image editing main processing shown in FIG. 35.

If no script editing stop request is issued (NO at step 385), it is checked whether or not an error occurs in the transmitted file (steps 386 and 387).

If an error is included (YES at step 387), a file transfer error is written into an error message (step 388), the transmission file list is taken as an error file and is so set as to transmit a new file in which an error occurred again (step 389). Thereafter, the processing at the step 383 and the subsequent steps is repeated, so that the error message is transmitted to the user device from the server 1.

If no error is included (NO at step 387), the program proceeds to the customize content reflection processing shown in FIG. 38.

In the customize content reflection processing, the new file which has been received in the server 1 is stored in the server (step 391). Thereafter, data representing an image obtained by customizing the selected image is stored in the hard disk for the server 1 (step 392). Further, the user information is updated (step 393). Thereafter, the customize menu processing shown in FIG. 33 is repeated.

Figure 26:
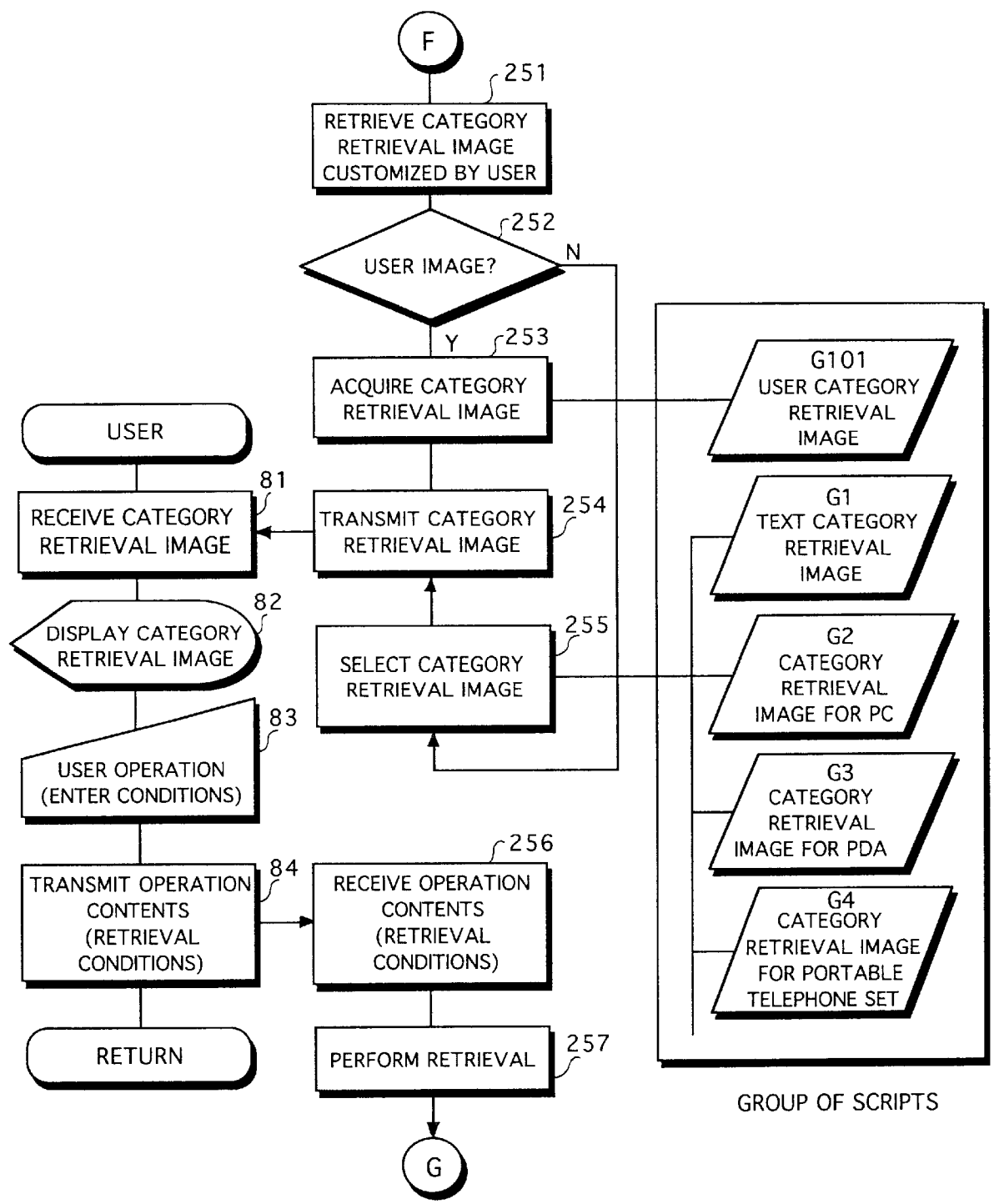
FIG. 26 is a flow chart showing category retrieval image processing.

Returning to FIG. 21, when the user sets the category retrieval image in the menu image (YES at step 218), the program proceeds to category retrieval image processing shown in FIG. 26.

XI. Category Retrieval Image Processing

It is first confirmed by referring to the user information whether or not data representing an inherent category retrieval image which has been customized by the user (a user image) is stored in the hard disk for the server 1 (step 251). When there is data representing the category retrieval image inherent in the user (YES at step 252), the data representing the category retrieval image inherent in the user is read out of the hard disk (step 253). If the data representing the category retrieval image inherent in the user is not stored in the server 1 (NO at step 252), the data representing the category retrieval image which is suitable for the user device and the browser is read out of the hard disk for the server 1 (step 255). The data representing the category retrieval image which has been read out is transmitted to the user device from the server 1 (step 254).

When the data representing the category retrieval image which has been transmitted from the server 1 is received in the user device (step 81), the received data is fed to the user display device (step 82). On the user display device, a category retrieval image shown in FIG. 45 is displayed. A category to be retrieved is displayed on the category retrieval image. In FIG. 45, examples include "1. By artist", "2. By theme", "3. By year", "4. By country", and "5. By data format". Any one of the categories is selected by the user (step 83). Data representing the selected category is transmitted to the server 1 from the user device (step 84).

On the basis of data representing the category which has been received in the server 1 (step 256), work image retrieval processing is performed (step 257). Thereafter, the program proceeds to category retrieval result processing shown in FIG. 27.

XII. Category Retrieval Result Processing

Figure 27:
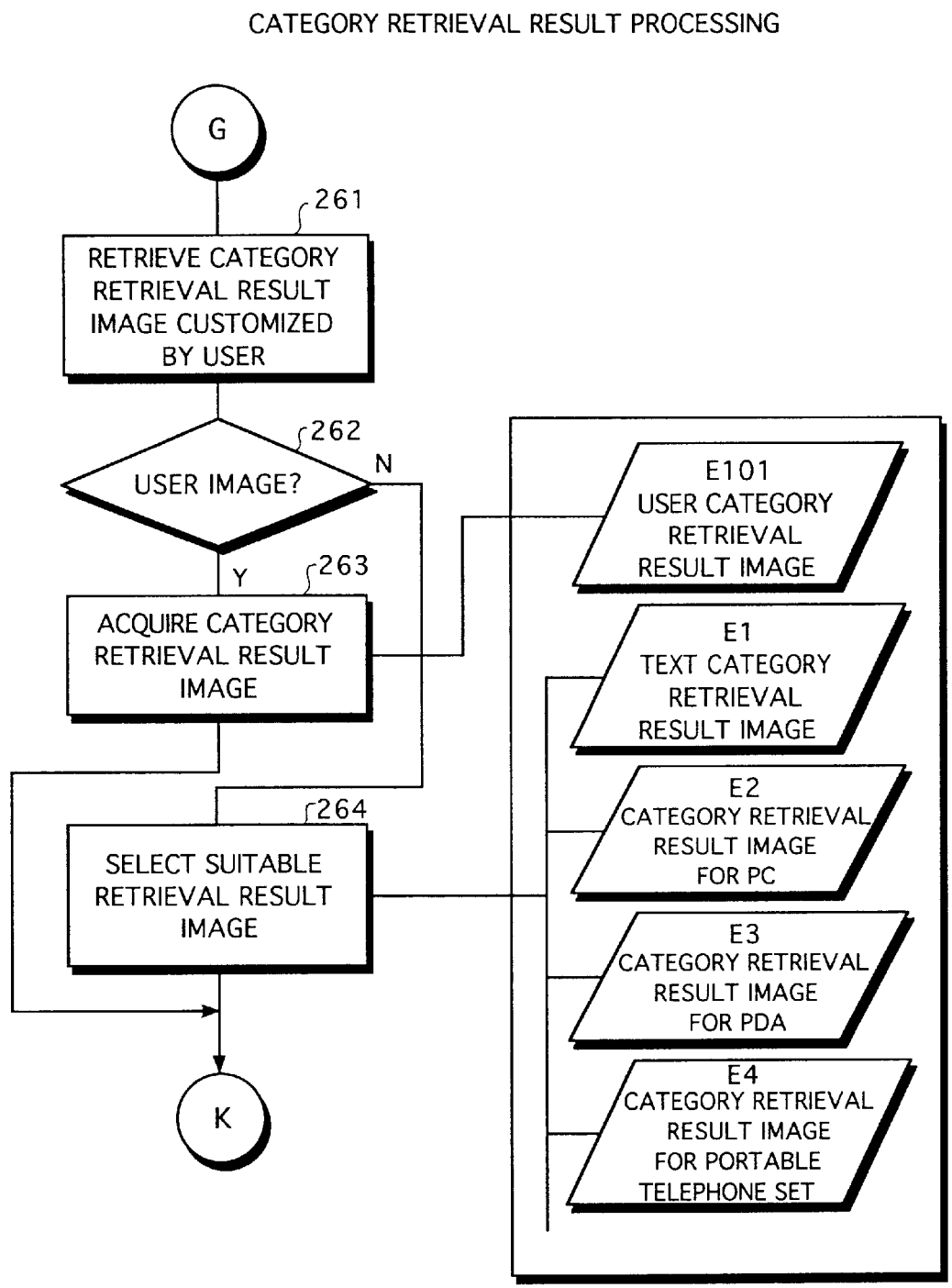
FIG. 27 is a flow chart showing category retrieval result processing.

Referring to FIG. 27, a category retrieval result image customized by the user is retrieved in the user information (step 261). If the user customizes the category retrieval result image, there is an image customized by the user (a user image). Accordingly, the category retrieval result image relating to the user is retrieved from the hard disk for the server 1 (step 263). If the user does not customize the category retrieval result image, a retrieval result image which is suitable for the user device and the browser out of default retrieval result images is read out of the hard disk for the server 1 (step 264). In either case, when the retrieval result image is read out of the hard disk for the server 1, the program proceeds to edit image production processing shown in FIG. 31.

VIII. Edit image Production Processing

Figure 31:
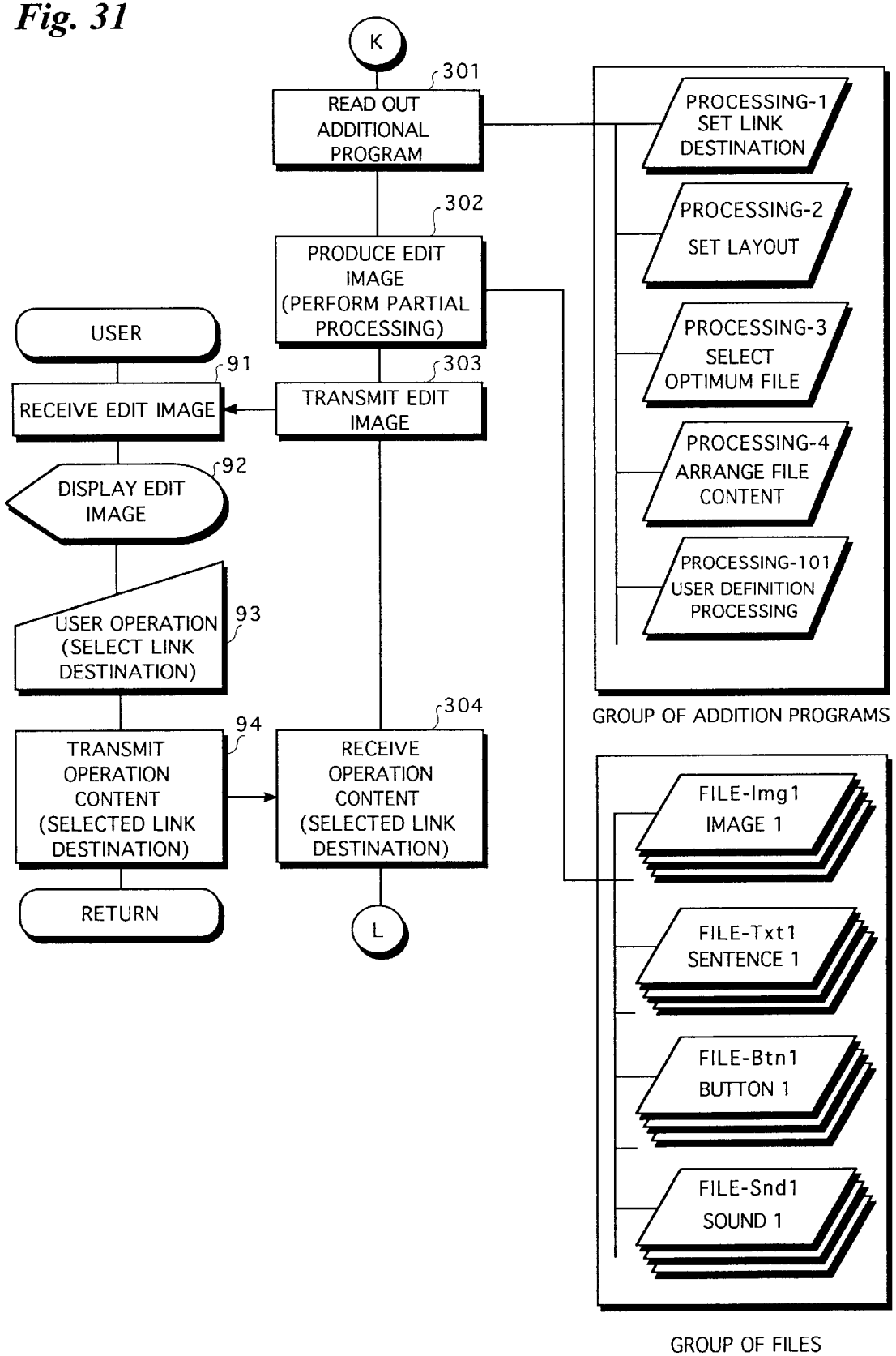
FIG. 31 is a flow chart showing edit image production processing.
Figure 32:
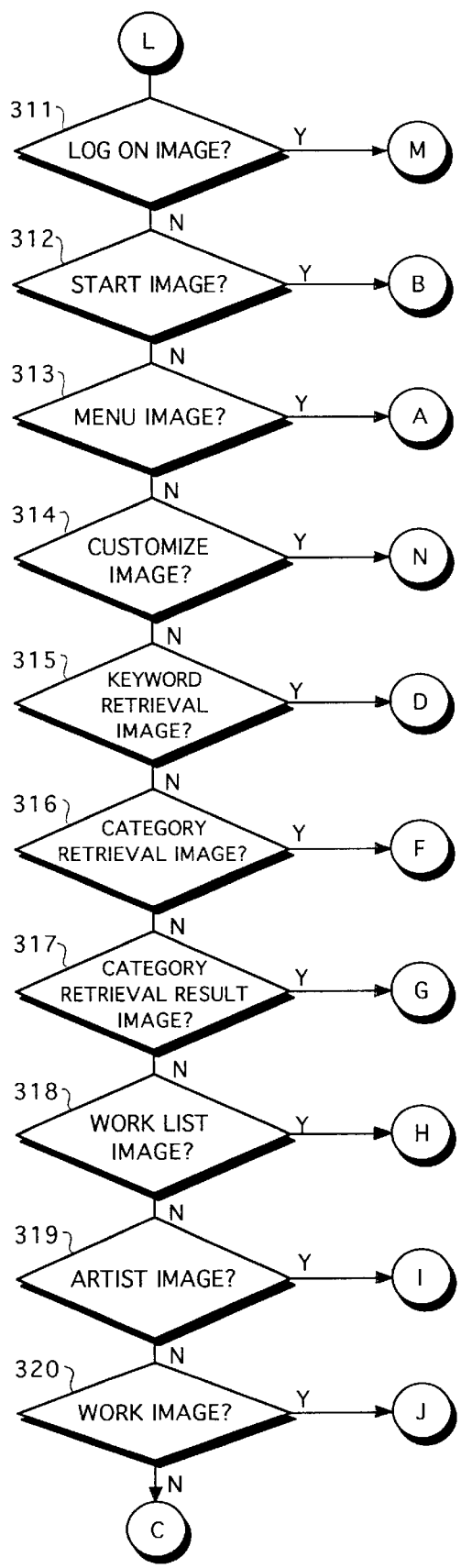
FIG. 32 is a flow chart showing link processing.

Referring to FIG. 31, an additional program suitable for an edit image to be produced is read out of the hard disk for the server 1 (step 301). In this case, an additional program suited to generate a retrieval result image (for example, a program for performing processing defined in a script by the user) is read out of the hard disk for the server 1. Files required to generate the retrieval result image (an image file, a sentence (text) file, a button file, a sound file, etc.) are read out of the hard disk for the server 1, thereby generating the result of retrieval (step 302). Data representing an edit image representing the produced result of retrieval is transmitted to the user device from the server 1 (step 303).

In the user device, the edit image data representing the result of retrieval which has been transmitted from the server 1 is received (step 91). The edit image data representing the result of retrieval is fed to the user display device, so that the edit image representing the result of retrieval is displayed on the user display device (step 92). A link destination (an image, a text, a URL name, etc.) which is displayed on the retrieval result image is designated by the user (step 93). Data representing the designated link designation is transmitted to the server 1 from the user device (step 94).

The data representing the link destination which has been transmitted from the user device is received in the server 1 (step 304). The program proceeds to the link processing shown in FIG. 32, so that data representing an image desired by the user will be transmitted to the user device from the server 1.

Returning to FIG. 21, when the user selects "3. Keyword Retrieval Image" in the menu image (see FIG. 43) displayed on the user display device, the program proceeds to keyword retrieval image processing shown in FIG. 24 (NO at step 218).

XIV. Keyword Retrieval Image Processing

Figure 24:
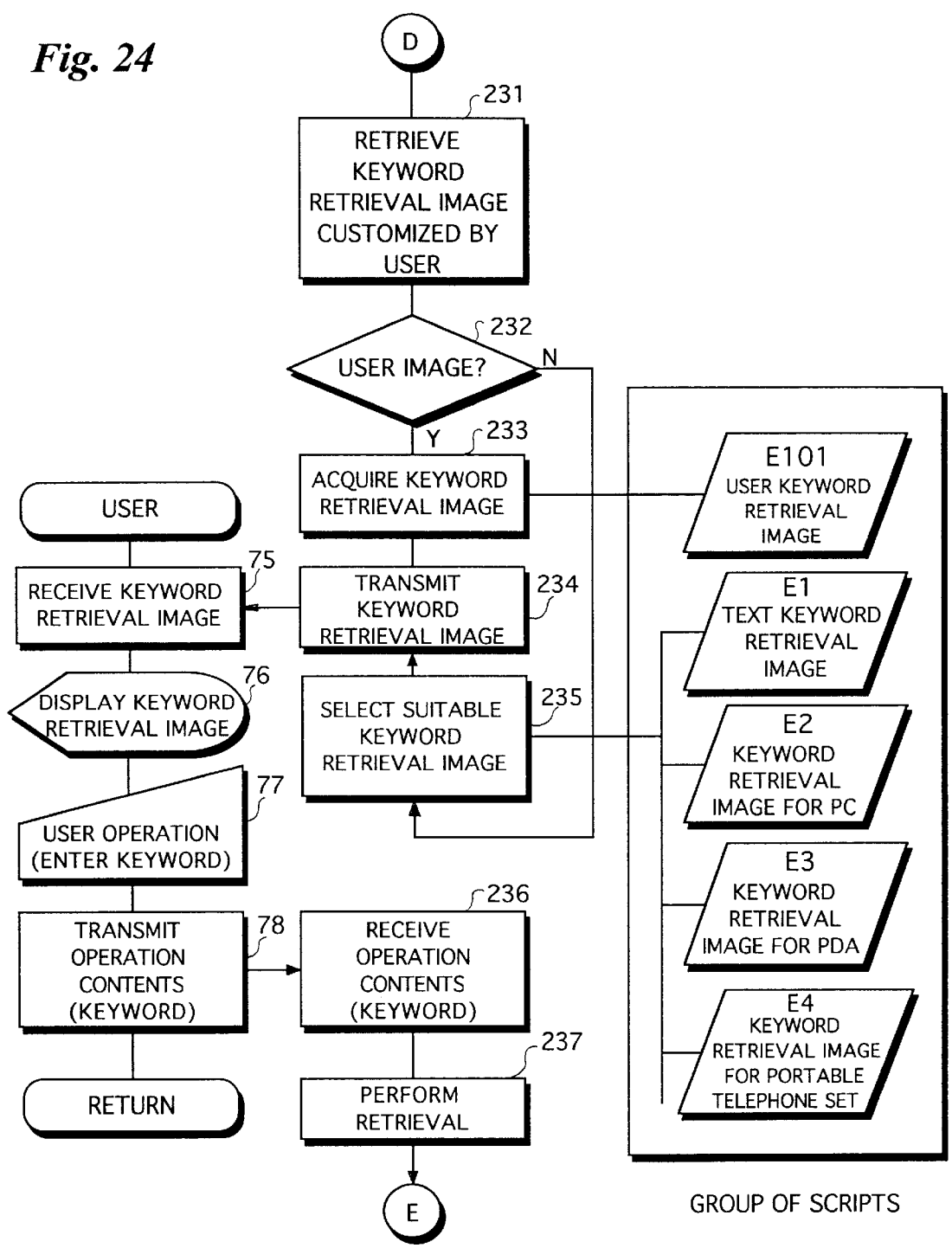
FIG. 24 is a flow chart showing keyword retrieval image processing.

Referring to FIG. 24, a keyword retrieval image customized by the user is retrieved on the basis of the user information (step 231). If there is a keyword retrieval image customized by the user (a user image) (YES at step 232), data representing the image is read out of the hard disk for the server 1 (step 233). If there is no keyword retrieval image customized by the user (NO at step 232), a default keyword retrieval image is read out of the hard disk for the server 1 (step 235). In either case, the data representing the keyword retrieval image which has been read out of the hard disk for the server 1 is transmitted to the user device from the server 1 (step 234).

Figure 44:
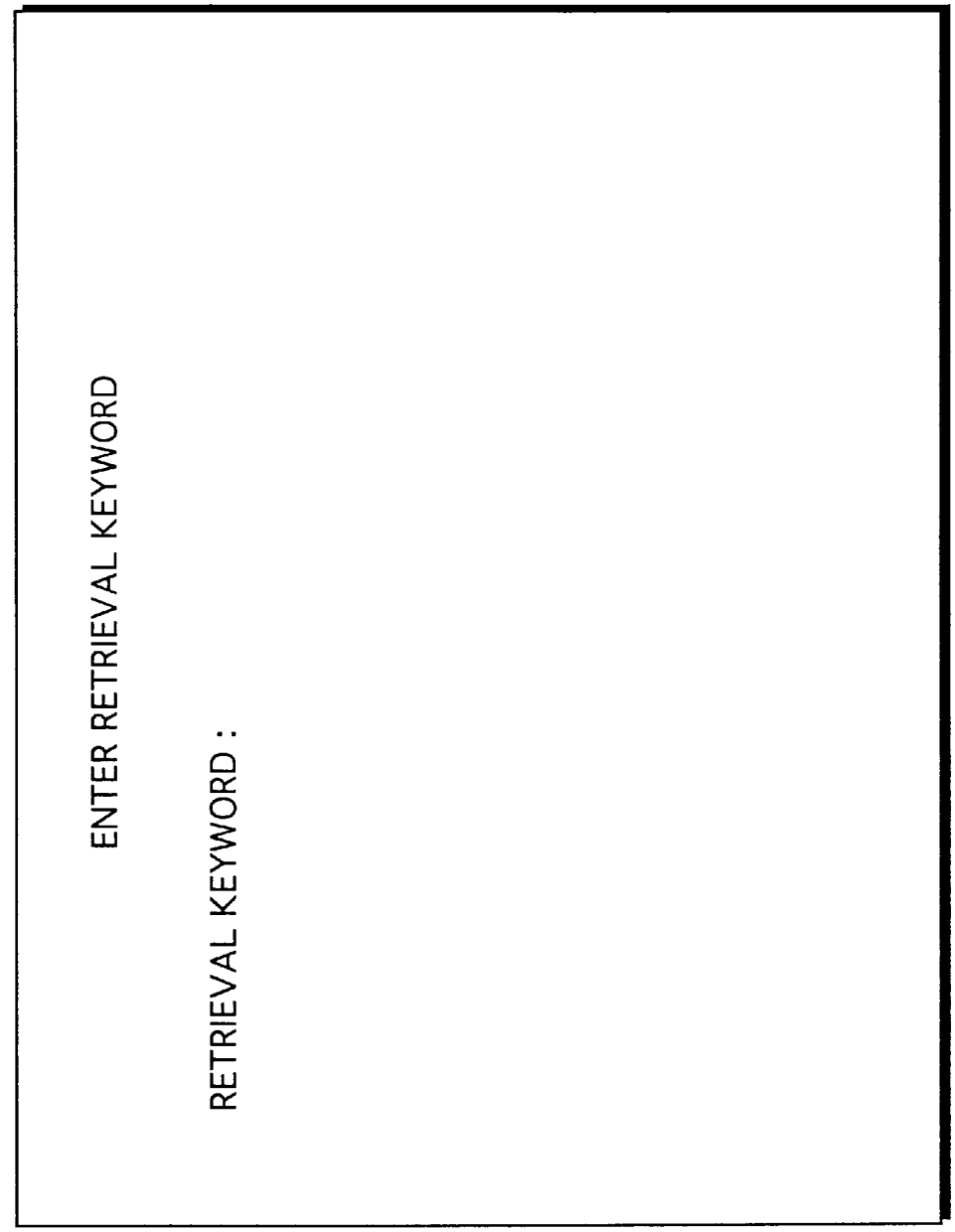
FIG. 44 illustrates a keyword retrieval image.

In the user device, the data representing the keyword retrieval image which has been transmitted from the server 1 is received (step 75). The received data representing the keyword retrieval image is fed to the user display device, where a keyword retrieval image as shown in FIG. 44 is displayed (step 76).

An instruction "Enter keyword" is displayed on the keyword retrieval image. The user enters a keyword in accordance with the instruction (step 77). The entered keyword is displayed on the user display device. The entered keyword is transmitted to the server 1 from the user device (step 78).

In the server 1, data representing the keyword which has been transmitted from the user device is received (step 236). In the server 1, retrieval processing is performed on the basis of the received keyword (step 237). Consequently, the program proceeds to retrieval result image processing shown in FIG. 25.

XV. Retrieval Result Image Processing

Figure 25:
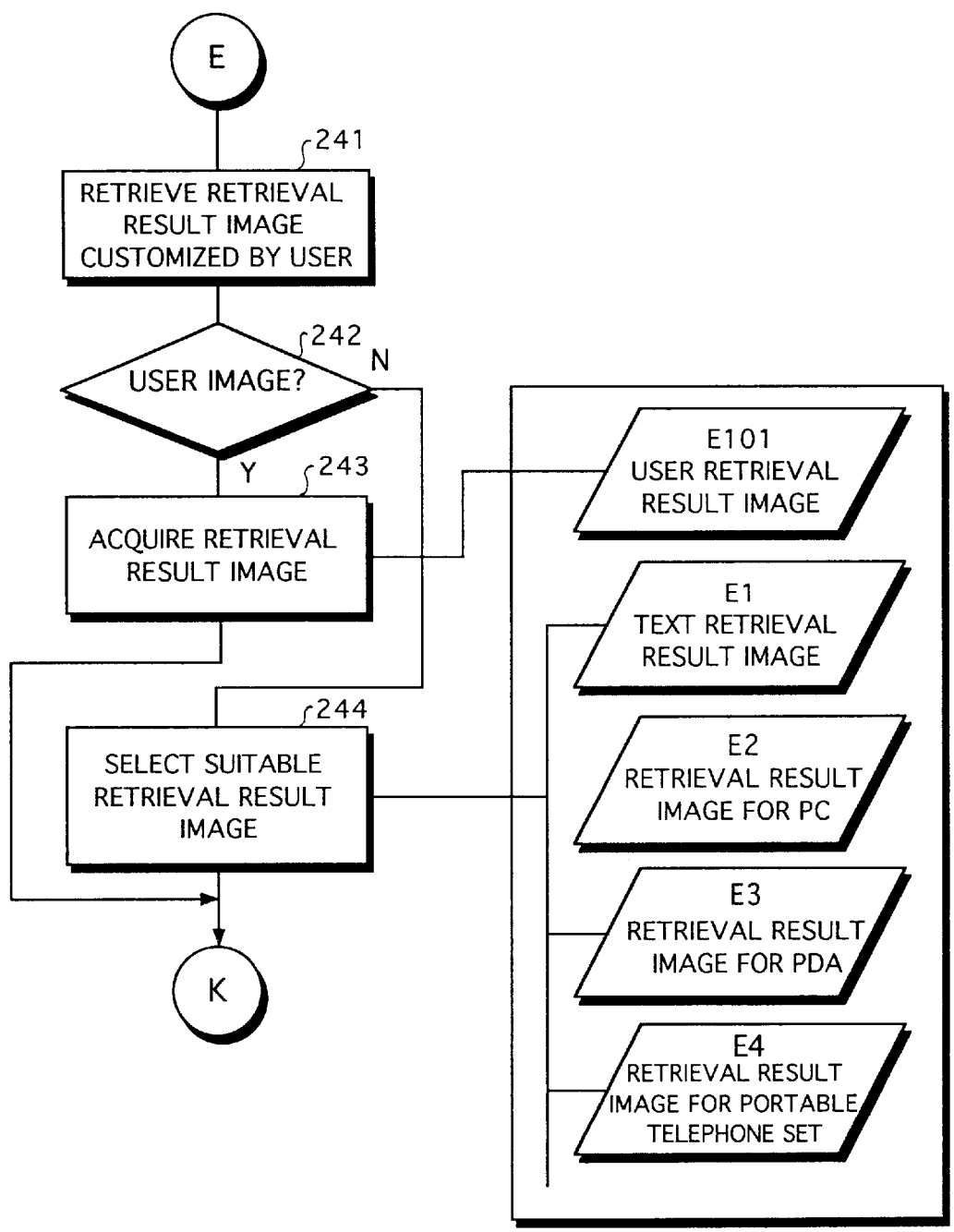
FIG. 25 is a flow chart showing retrieval result image processing.

In FIG. 25, it is judged by retrieval in the user information whether or not there is a retrieval result image customized by the user (step 241). When there is a retrieval result image customized by the user by the retrieval (YES at step 242), data representing the retrieval result image is read out of the hard disk for the server 1 (step 243). When there is no retrieval result image customized by the user (NO at step 242), data representing a predetermined retrieval result image which is suitable for the user device and the browser is read out of the hard disk for the server (step 244). Thereafter, the program proceeds to the edit image production processing shown in FIG. 31, so that a keyword retrieval result image is produced in the same manner as that in the above-mentioned category retrieval image production processing, and is transmitted to the user device.

The keyword retrieval result image is displayed on the user display device.

Figure 28:
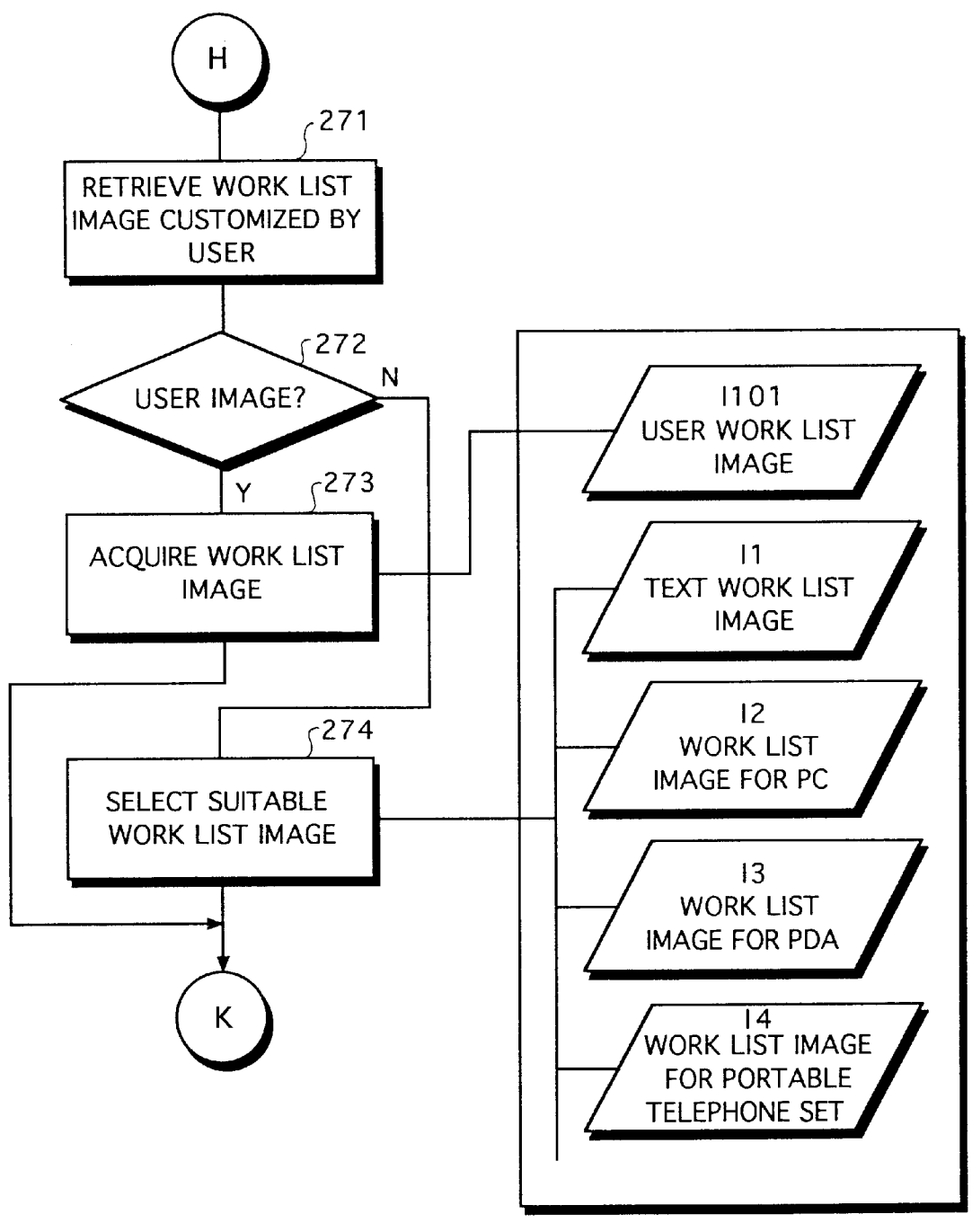
FIG. 28 is a flow chart showing work list processing.

In the link processing (see FIG. 32), when a worklist image is displayed on the user display device (YES at step 318), the program proceeds to work list processing shown in FIG. 28.

XVI. Work List Processing

Referring to FIG. 28, a work list image which has been customized by the user is retrieved in the user information (step 271). If the work list image which has been customized by the user (a user image) exists in the server 1 (YES at step 272), data representing the work list image is read out of the hard disk for the server 1 (step 273). If no work list image which has been customized by the user exists in the server 1 (NO at step 272), data representing the work list image suitable for the user device out of predetermined work list images stored in the hard disk for the server 1 is read out (step 274). Thereafter, the program proceeds to the edit image production processing shown in FIG. 31, so that the data representing the work list image is produced. The generated data representing the work list image is transmitted to the user device from the server 1. Accordingly, the work list image is displayed on the user display device.

FIGS. 46 to 49 respectively illustrate examples of the work list image.

Figures 46, 47:
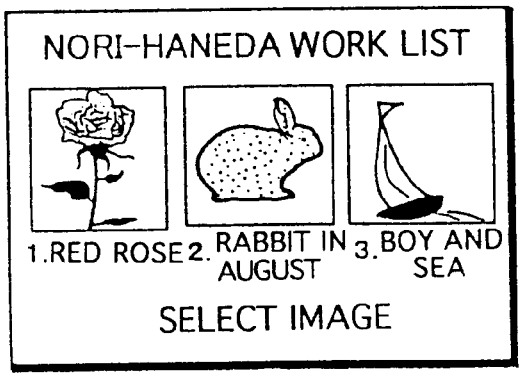
FIGS. 46 to 49 illustrate work list images.

FIG. 46 illustrates a work list image displayed when the user device is a portable telephone set (or a device capable of displaying only a text). In the portable telephone set, it is relatively difficult to display an image. Therefore, a work list image suitable for a display device in the portable telephone set is displayed.

FIG. 47 illustrates a work list image displayed when the user device is a personal digital assistant. Although the personal digital assistant can display an image, a display screen of a display device in the personal digital assistant is not so large. Therefore, a work list image which is not very large is displayed on the display device in the personal digital assistant.

Figure 48:
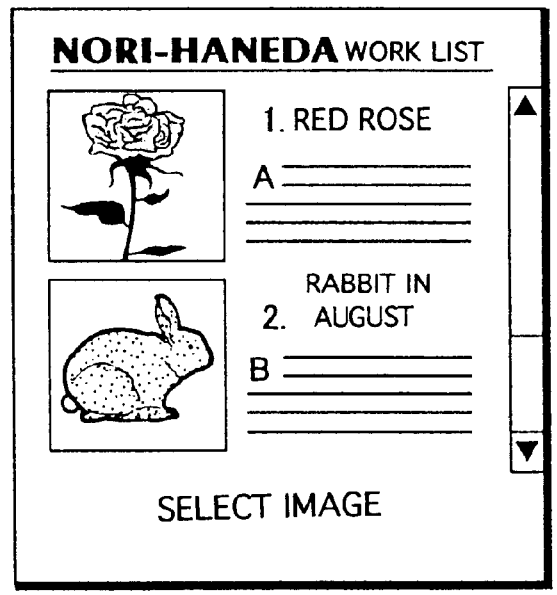

FIG. 48 illustrates a work list image displayed when the user device is a personal computer, and a small display device is connected to the personal computer. A relatively large work list image is displayed.

Figure 49:
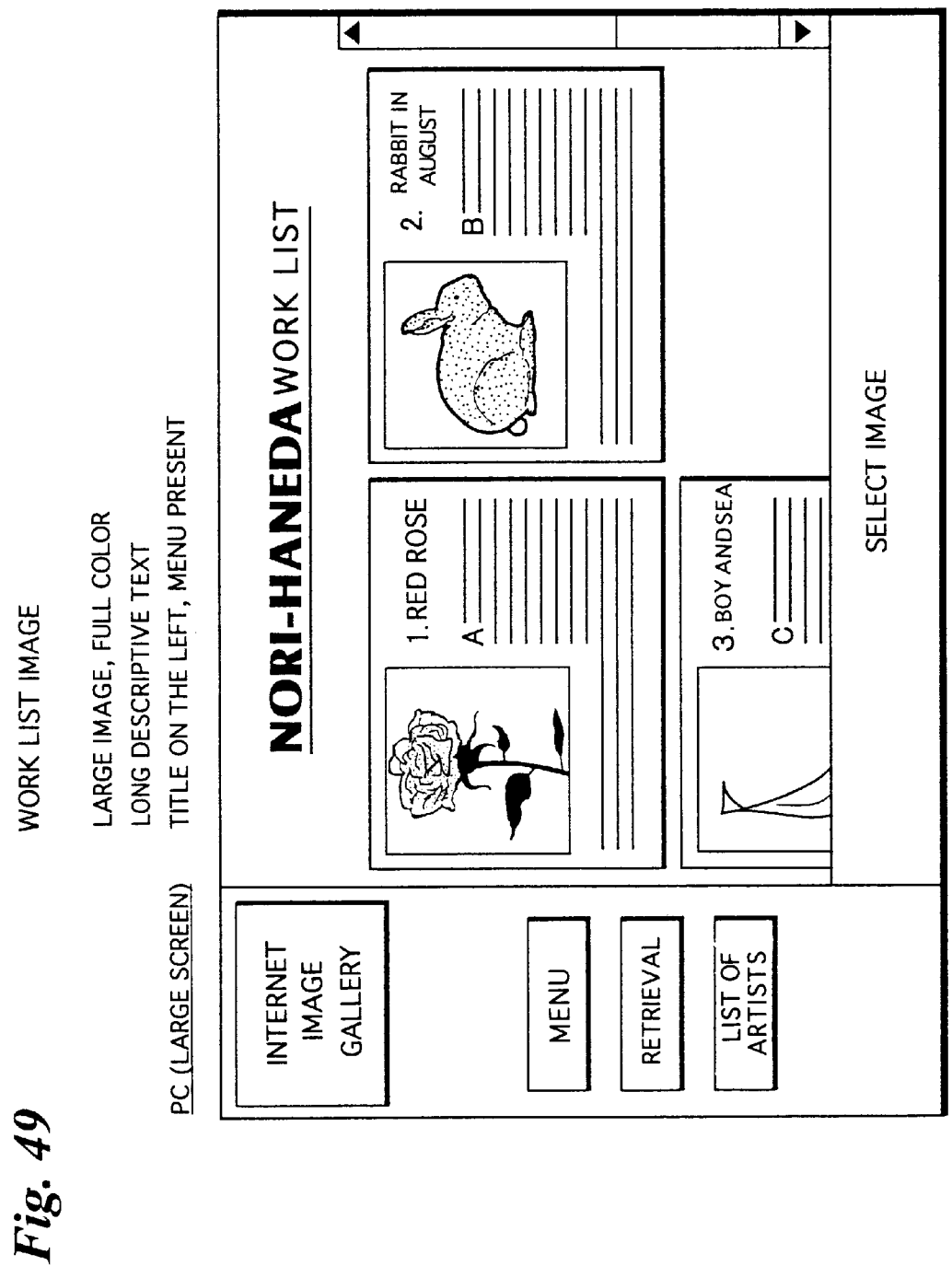

FIG. 49 illustrates a work list image displayed when the user device is a personal computer, and a display device having a large display screen is connected thereto. A work list image suited to be displayed on the large display screen is displayed.

A small image is used in the work list image shown in FIG. 47, a medium-sized image is used in the work list image shown in FIG. 48, and a large image is used in the work list image shown in FIG. 49. Data representing the work list image which is composed of an image which differs in size depending on the user device is thus transmitted to the user device from the server 1. Color reduction processing will be also performed, as required.

XVII. Artist Image Processing

Figure 29:
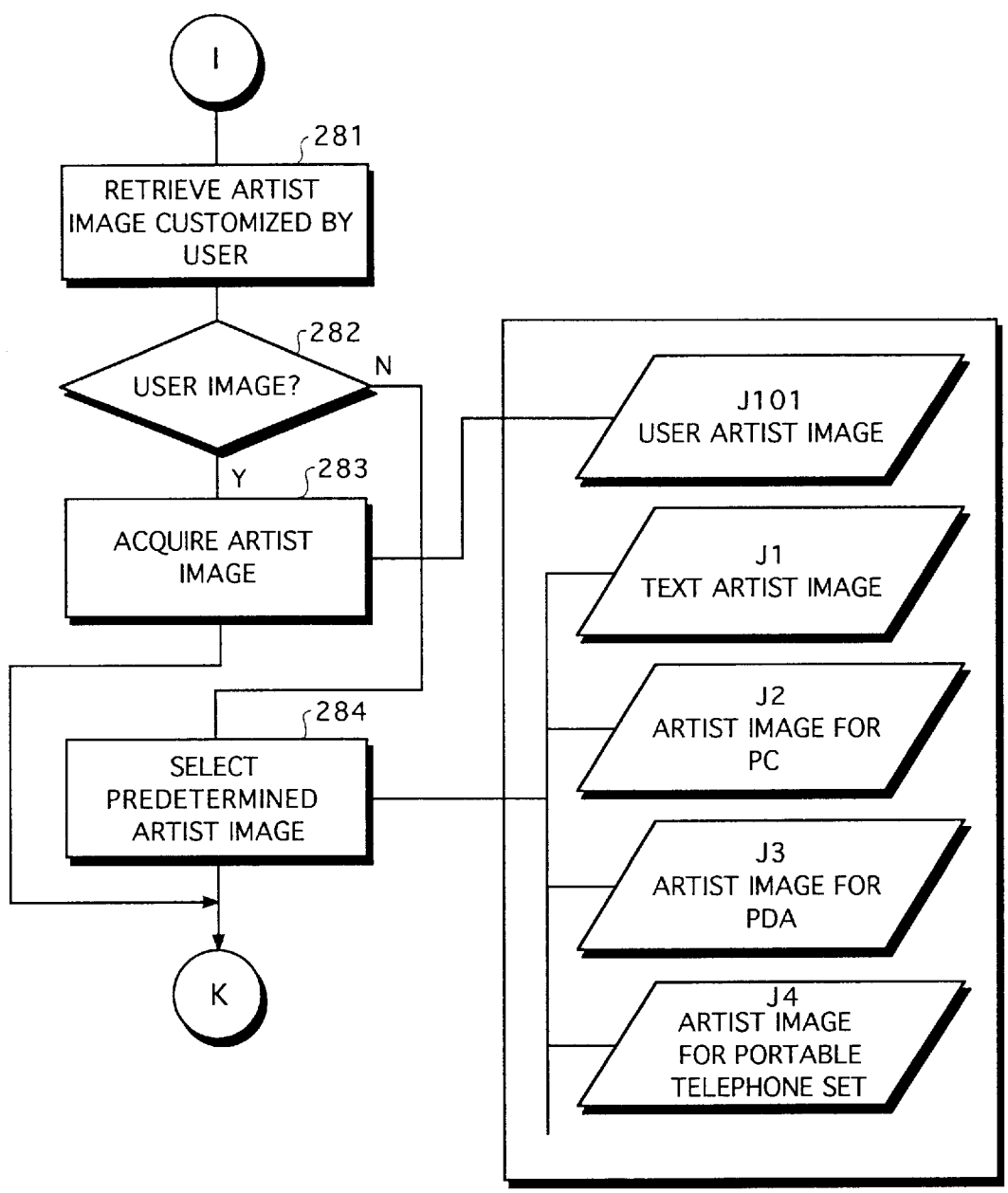
FIG. 29 is a flow chart showing artist image processing.

FIG. 29 illustrates artist image processing.

When a link with an artist image is established, an artist image which has been customized by the user is retrieved in the hard disk for the server 1 (step 281). If there is an artist image which has been customized by the user (YES at step 282), data representing the customized artist image is read out of the hard disk for the server 1 (step 283). If there is no artist image which has been customized by the user (NO at step 282), data representing the artist image which is suitable for the user device and the browser is read out of the hard disk for the server 1 (step 284). The data representing the artist image is generated from the data read out in the edit image production processing shown in FIG. 31. The generated data representing the artist image is transmitted to the user device, so that the artist image which is suitable for the user device and the browser or the artist image which has been customized by the user is displayed on the user display device.

XVIII. Work Image Processing

Figure 30:
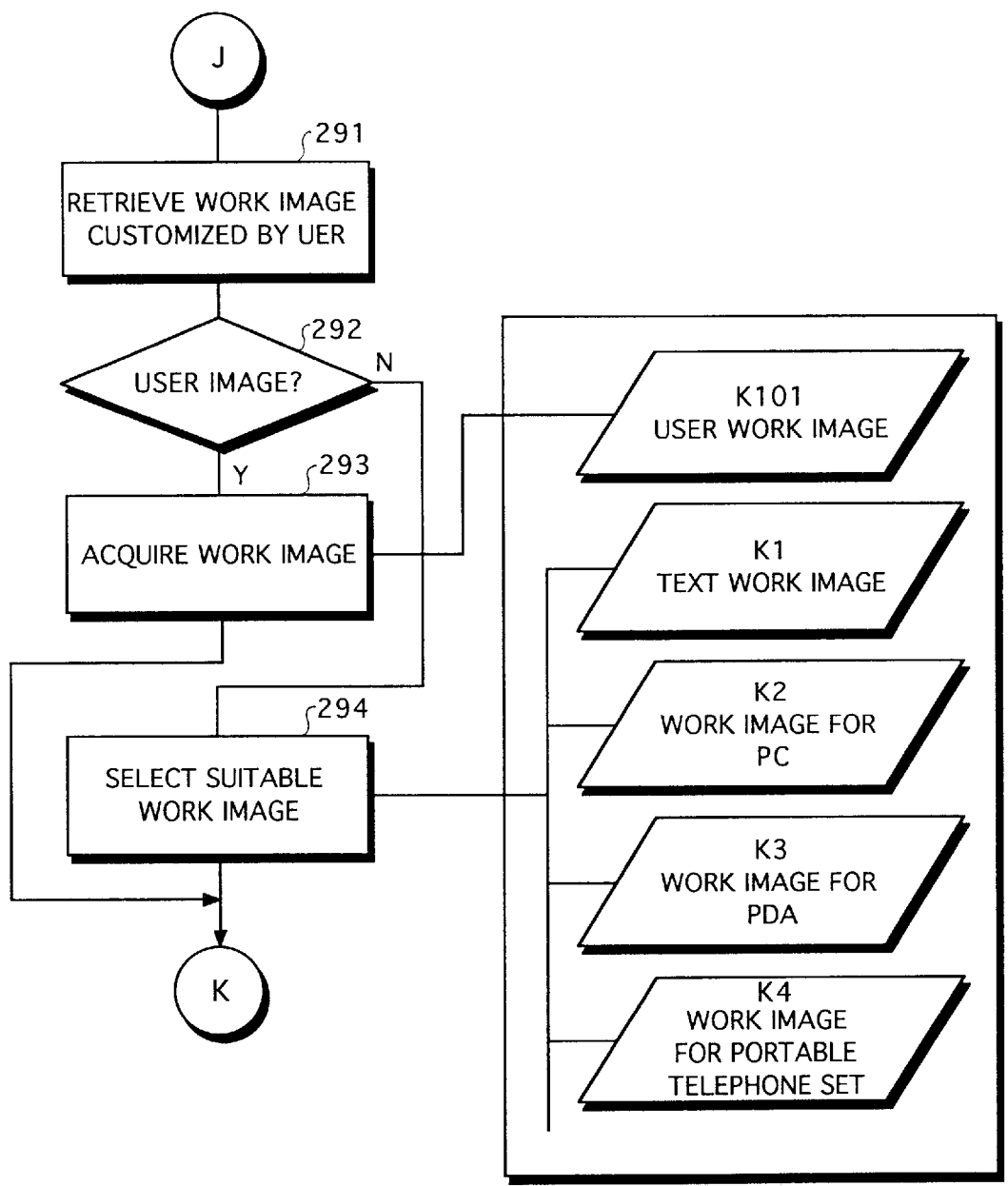
FIG. 30 is a flow chart showing work image processing.

FIG. 30 shows work image processing.

When a link with a work image is established, a work image which has been customized by the user is retrieved in the hard disk for the server 1 (step 291). If there is a work image which has been customized by the user (a user image) (YES at step 292), data representing the customized work image is read out of the hard disk for the server 1 (step 293). If there is no work image which has been customized by the user (NO at step 292), a work image which is suitable for the user device and the browser out of default work images is read out of the hard disk for the server 1 (step 294). In either case, data representing the work image is generated on the basis of processing relating to the work image which has been read out of the hard disk for the server 1, and is transmitted to the user device. The work image which has been customized by the user or the work image which is suitable for the user device and the browser is displayed on the user display device.

It goes without saying that when a work image, an artist image, or the like is displayed, a group of files is searched, as shown in FIGS. 8A to 10A and 10B, as described above, so that a corresponding file is used.

Returning to FIG. 35, if script editing is not performed, an image item is added, thereby customizing an image (NO at step 355).

A script is first initialized (step 356). Thereafter, the program proceeds to image item addition processing (step 357). The image item addition processing will be next described. When the image item addition processing is terminated, it is checked whether or not a new file is added in the image item addition processing (step 358). If the new file is added (YES at step 358), the program proceeds to the new file transmission processing shown in FIG. 37. Unless the new file is added (NO at step 358), the program proceeds to the customize content reflection processing shown in FIG. 38. In either case, the user information is updated by adding a display item by customization, as described above.

XIX. Image Item Addition Processing

Figure 39:
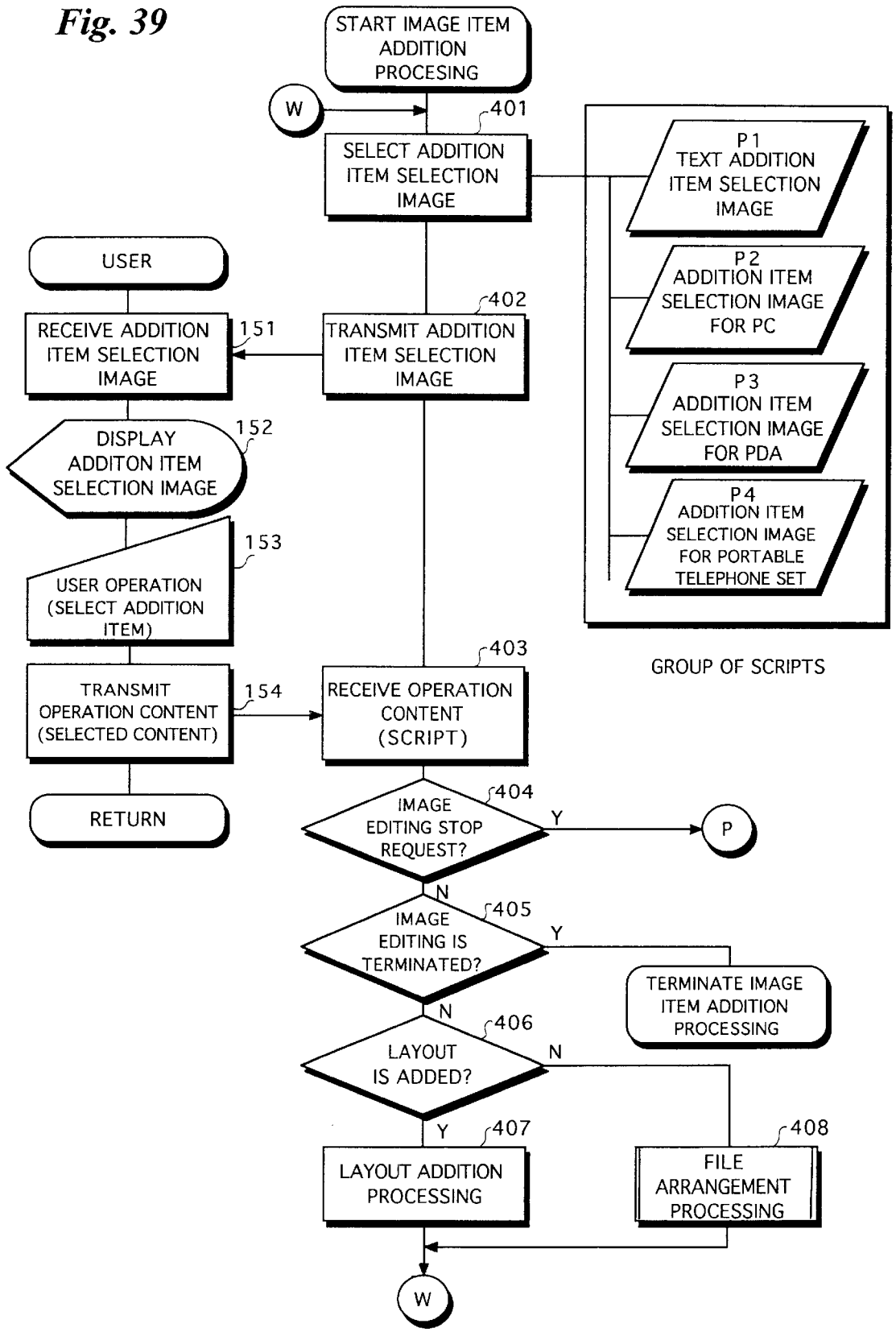
FIG. 39 is a flow chart showing image item addition processing.

FIG. 39 is a flow chart showing image item addition processing.

Data representing an addition item selection image which is suitable for the user device and the browser is read out of the hard disk for the server 1 (step 401). The data representing the addition item selection image which has been read out is transmitted to the user device from the server 1 (step 402).

Figure 55:
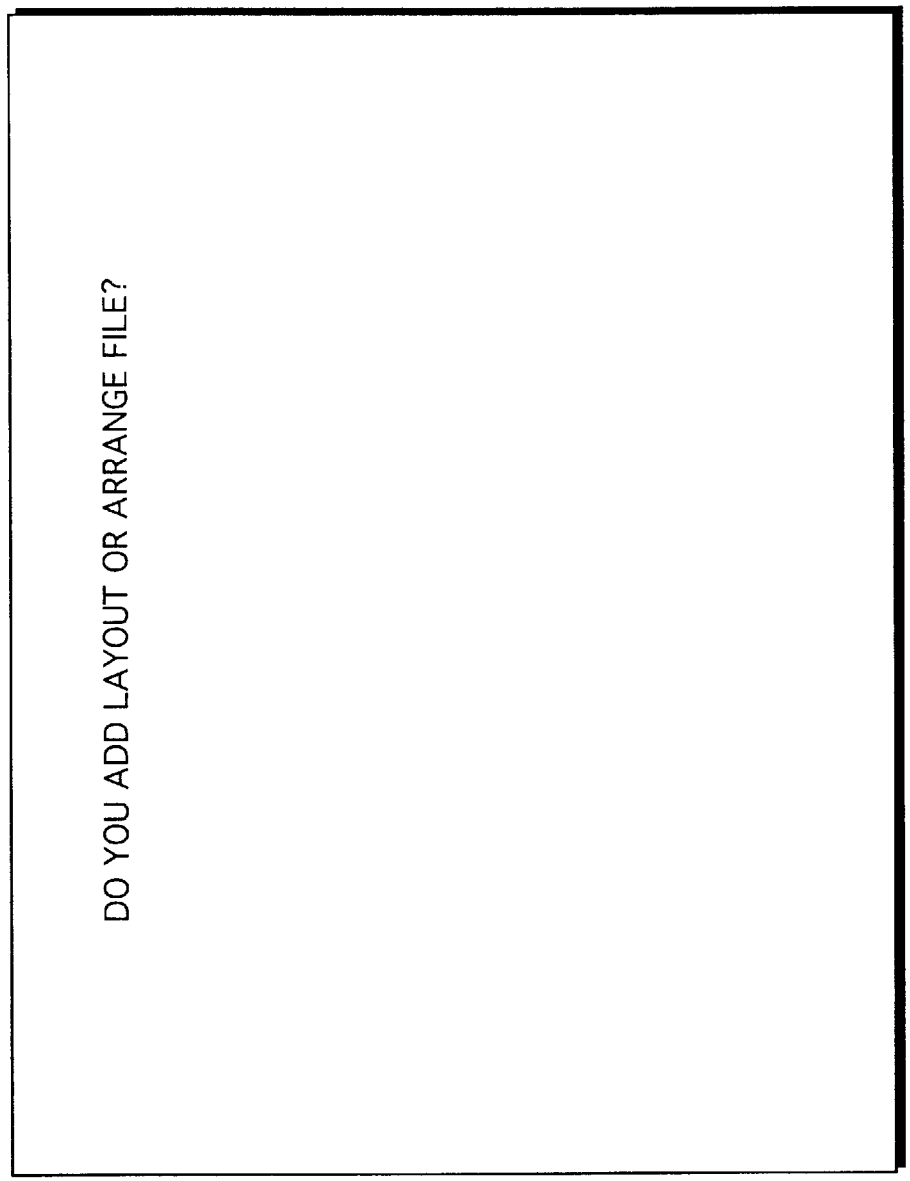
FIG. 55 illustrates an addition item selection image.

In the user device, the data representing the addition item selection image is received (step 151), and is fed to the user display device (step 152). An addition item selection image as shown in FIG. 55 is displayed on the user display device (step 152).

A question text "Do you add layout or do you arrange file?" is displayed on the addition item selection image. The user selects desired processing out of "layout addition" and "file arrangement" depending on the text (step 153). Data representing the selected content is transmitted to the server 1 from the user device (step 154).

The data representing the selected content which has been transmitted from the user device is received in the server 1 (step 403). If the received content is a request to stop image editing (YES at step 404) (the stop of image editing and the termination of image editing, described later, can be set by the user, although the illustration thereof is omitted in FIG. 55), the program proceeds to the image editing main processing shown in FIG. 35, so that image editing processing is performed again, as required. If the received content is a request to terminate image editing (YES at step 405), the image item addition processing is terminated. If the received content is layout addition processing (YES at step 406), the program proceeds to layout addition processing shown in FIG. 40 (step 407). If the received content is file arrangement processing (No at step 406), the program proceeds to file arrangement processing shown in FIG. 41 (NO at step 408).

XX. Layout Addition Processing

Figure 40:
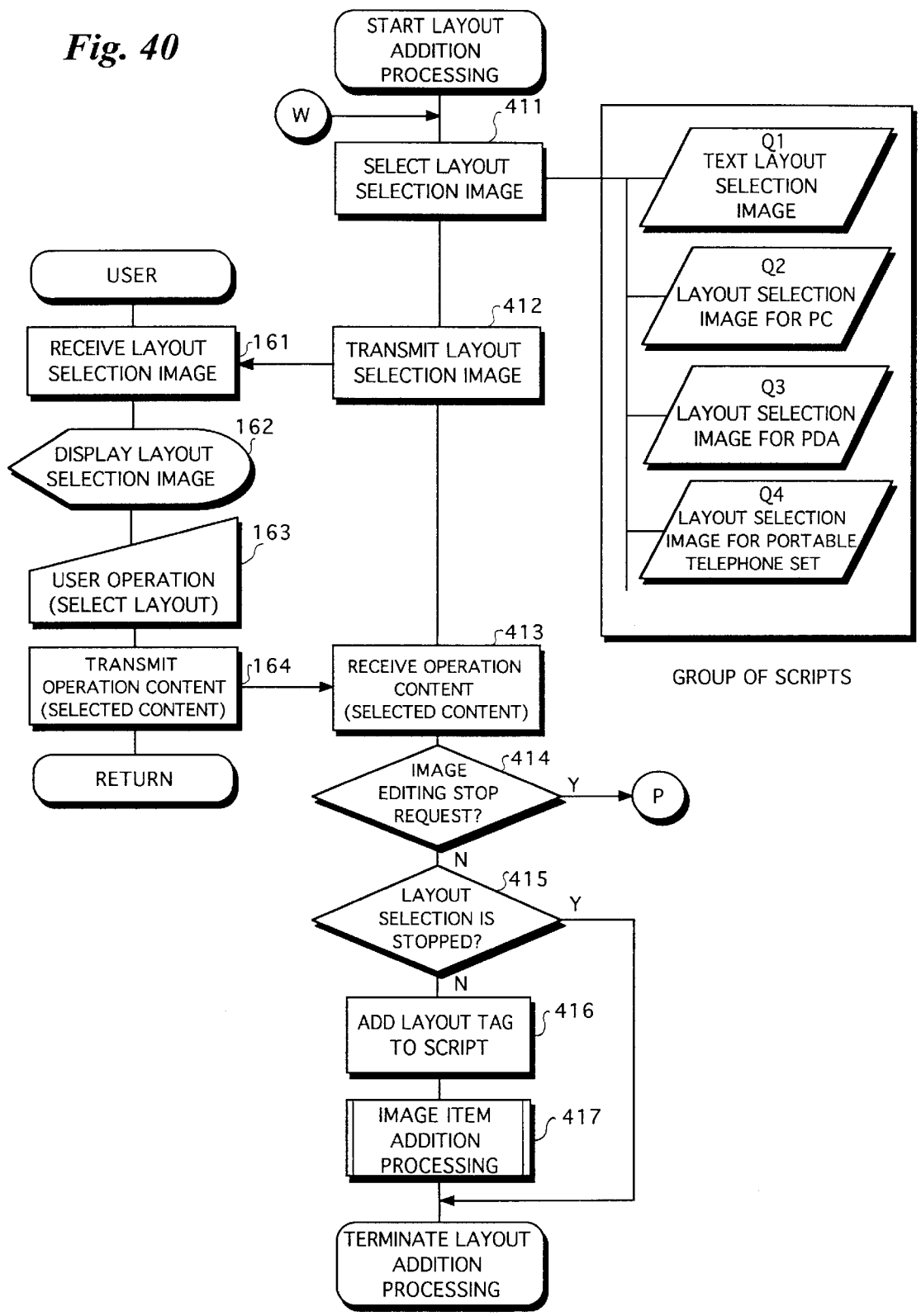
FIG. 40 is a flow chart showing layout addition processing.

Referring to FIG. 40, description is made of the layout addition processing.

Data representing a layout selection image which is suitable for the user device and the browser is read out of the hard disk for the server 1 (step 411). The data read out is transmitted to the user device from the server 1 (step 412).

Figure 56:
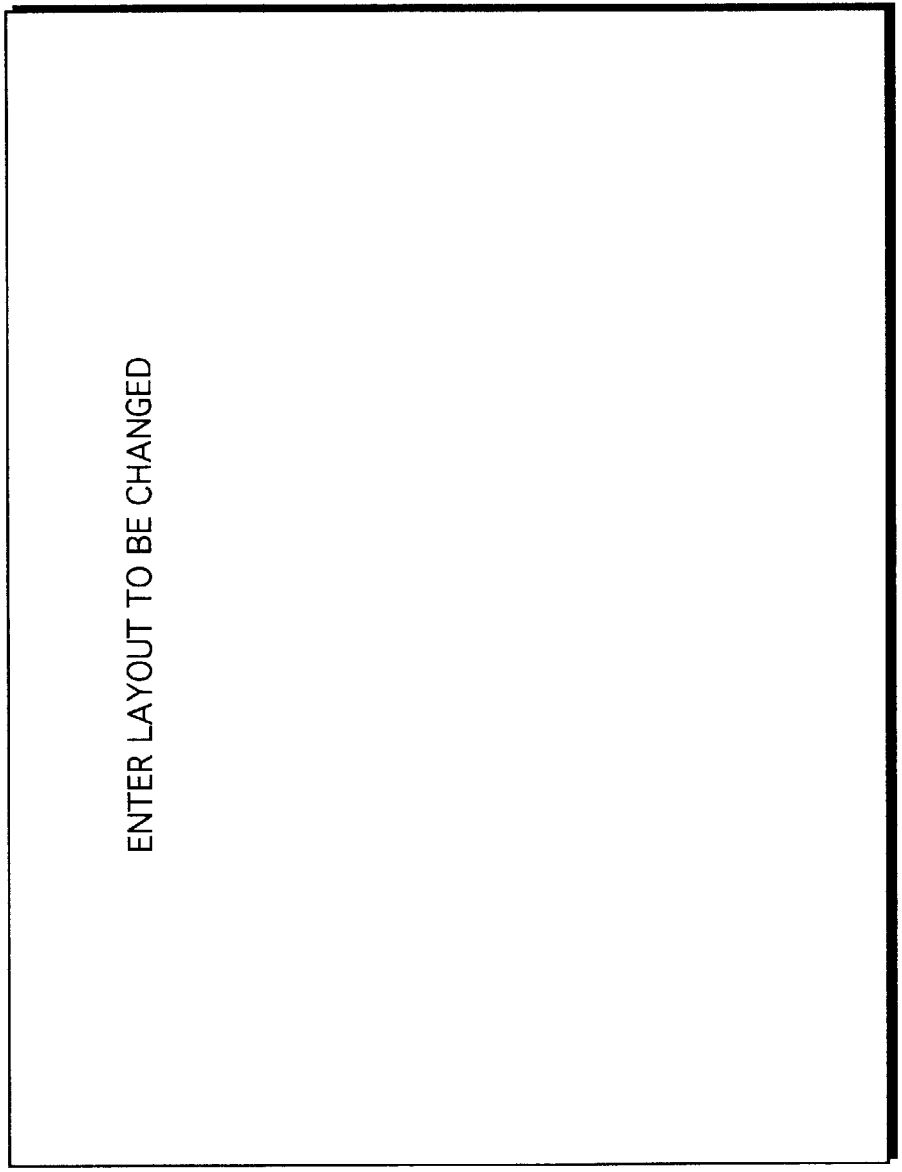
FIG. 56 illustrates a layout selection image.

The data representing the layout selection image which has been transmitted from the server 1 is received in the user device (step 161). The data representing the layout selection image is fed to the user display device, so that a layout selection image as shown in FIG. 56 is displayed (step 162). An instruction "Enter layout to be changed" is displayed on the layout selection image. The user enters a layout to be changed, for example, right justification, left justification, centering, and multiple column of a text in accordance with the instruction (step 163). The entered layout instruction is transmitted to the server 1 from the user device (step 164).

The layout instruction which has been transmitted from the user device is received in the server 1 (step 413). If the received instruction is a request to stop image editing, the program proceeds to the image editing main processing shown in FIG. 35 (YES at step 414). The received instruction is a request to stop layout selection (YES at step 415), the layout addition processing is terminated (the stop of image editing or the stop of layout selection can be set by the user, although the instruction thereof is omitted in FIG. 56). Unless layout selection stop processing is performed (NO at step 415), a layout tag indicated by the user is added to a script for an image which is an object of the layout addition processing (step 416). Thereafter, in the above-mentioned image item addition processing, elements (an image, a text, a button, etc.) the layout of which is designated by the added tag are added to the script (step 417).

XXI. File Arrangement Processing

Figure 41:
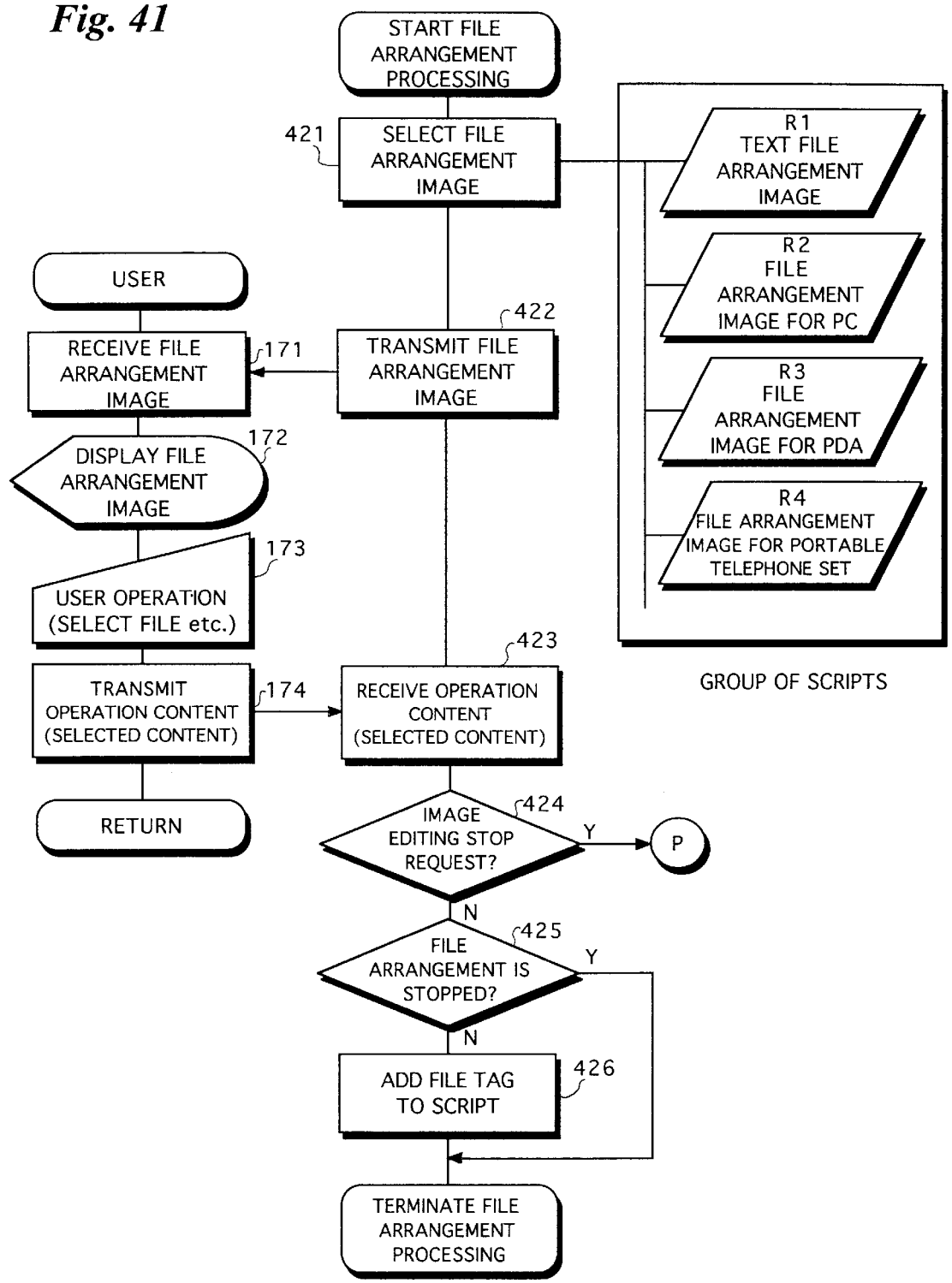
FIG. 41 is a flow chart showing file arrangement processing.

FIG. 41 is a flow chart showing file arrangement processing.

Data representing a file arrangement image which is suitable for the user device and the browser is read out of the hard disk for the server 1 (step 421). The data read out is transmitted to the user device from the server 1 (step 422).

Figure 57:
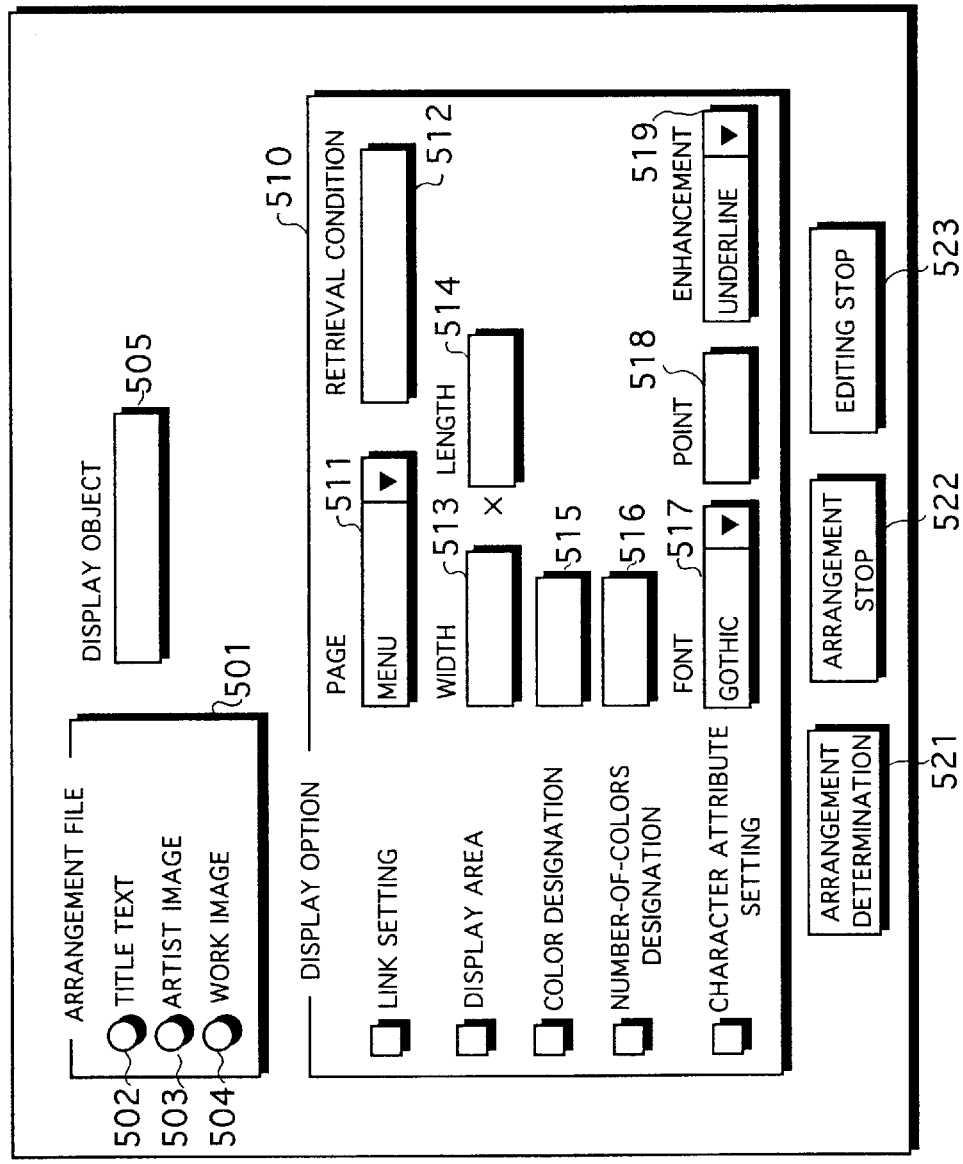
FIG. 57 illustrates a file arrangement image.

In the user device, data representing the file arrangement image which has been transmitted from the server 1 is received (step 171). A file arrangement image as shown in FIG. 57 is displayed on the user display device.

The file arrangement image includes the following areas:

Arrangement file area 501;

A arrangement file area 501 includes an area 502 checked by the user when a title text file is arranged, an area 503 checked by the user when an artist image file is arranged, and an area 504 checked by the user when a work image file is arranged. The areas 502, 503, and 504 corresponding to a file which should be arranged by the user are checked by the user.

Display object area 505;

A display object area 505 is for designating an object (for example, an image, an artist name, a title, etc.) to be displayed in the file (management file) selected in the arrangement file area 501.

Display option area 510;

A display option area 510 further includes the following areas:

Link setting area 511;

It is an area for setting a link destination.

Retrieval condition area 512;

It is for designating a retrieval object (condition) to be hit by retrieval. For example, when only works issued after a certain year are taken as retrieval objects, the year is entered by the user.

Display areas 513 and 514;

They are for designating an area where an image, a text, or a button is to be displayed. The width is entered in the area 513, and the length is entered in the area 514.

Color designation area 515;

It is an area for entering a color number for specifying a color to be displayed.

Number-of-colors designation area 516;

It is an area for designating the number of colors to be displayed. For example, 256 colors, 16,000,000 colors, or the like is entered.

Font designation area 517;

It is an area for designating a font to be displayed. A Gothic type or a Mincho type, for example, is entered.

Point designation area 518;

It is an area for designating the size of characters.

Enhancement designation area 519;

It is an area used when characters are enhanced. For example, an underline, reverse characters, hollow characters, or the like is entered.

In addition thereto, the file arrangement image includes an area 521 clicked by the user when arrangement is determined, an arrangement stop area 522 clicked by the user when arrangement processing is stopped, and an editing stop area 523 clicked by the user when editing is stopped.

Predetermined selection processing is performed using the file selection image by the user (step 173). Data representing the selected content is transmitted to the server 1 from the user device (step 174).

The data representing the selected content which has been transmitted from the user is received in the server 1 (step 423). If the received content is a request to stop image editing (YES at step 424), the program proceeds to the image editing main processing shown in FIG. 35. If file arrangement stop processing is performed (YES at step 425), the file arrangement processing is terminated. Unless the file arrangement stop processing is performed, a file tag is added to a script for an image to be an editing object depending on processing selected by the user (step 426). Consequently, a file is arranged at a position selected by the user.

The user can customize an image displayed on the user display device relatively freely. Moreover, when the image is not customized, an image which is suitable for the user device and the browser is displayed on the user display device.

Although the present invention has been described and illustrated in detail, it is clearly understood that the same is by way of illustration and example only and is not to be taken by way of limitation, the spirit and scope of the present invention being limited only by the terms of the appended claims.

What is claimed:

1. An image communication system comprising an image transmitting apparatus and an image receiving apparatus which can establish data communication with each other, wherein said image receiving apparatus comprises
a device information transmission device for transmitting to said image transmitting apparatus information relating to said image receiving apparatus, and
said image transmitting apparatus comprises
a device information receiving device for receiving information relating to said image receiving apparatus which has been transmitted from said device information transmission device in said image receiving apparatus, and
an image data transmission device for transmitting to said image receiving apparatus image data representing an image having a display format suitable for said image receiving apparatus on the basis of the information relating to the image receiving apparatus which has been received by said device information receiving device,
wherein said received information comprises information about a type of browser installed in said image receiving apparatus and at least one of a number of colors displayable on a display of said image receiving apparatus, and a size of a displayable image.

2. The image a communication system according to claim 1, wherein
said device information transmission device in said image receiving apparatus transmits to said image transmitting apparatus at least one of the type of said image receiving apparatus, information relating to display on the display device, and information relating to software for the display of an image which is installed in said image receiving apparatus.

3. The image communication system according to claim 2, wherein said type comprises at least one of a portable telephone, a portable information terminal, a notebook computer, and a personal computer, and
wherein said information relating to display on the display device comprises at least one of a size of a display screen and a number of colors which can be displayed.

4. The image communication system according to claim 1, wherein
said image transmitting apparatus further comprises a storage device for storing image data having a plurality of different display formats, and
said image data transmission device transmits to said image receiving apparatus image data representing the image having the display format suitable for said image receiving apparatus from said storage device on the basis of the information relating to the image receiving apparatus which has been received by said device information receiving device.

5. The image communication system according to claim 1, wherein
said image data transmission device in said image transmitting apparatus transmits to said image receiving apparatus edit image data representing an edit image having a plurality of display items including an image and a sentence.

6. The image communication system according to claim 5, wherein
said image receiving apparatus further comprises
a setting device for setting at least one of the layout and said display items of said edit image, and
a set information transmission device for transmitting to said image transmitting apparatus information set by said setting device, and said image transmitting apparatus comprises
set information receiving device for receiving the set information which has been transmitted from said set information transmission device in said image receiving apparatus, and
a determination device for determining at least one of the layout and the display items of the edit image represented by said edit image data on the basis of the set information which has been received by said set information receiving device.

7. The image communication system according to claim 6, wherein
said setting device in said image receiving apparatus is at least one of means for performing the setting so as to collectively edit the whole of said edit image and means for performing the setting so as to edit a part of said edit image.

8. The image communication system according to claim 6, wherein
the image data representing images corresponding to a plurality of frames are transmitted to said image receiving apparatus from said image transmitting apparatus, said image receiving apparatus further comprises an edit image designation device for designating said edit image having the layout and said display items at least one of which should be set by said setting device, and
said setting device sets at least one of said layout and said display items of the edit image designated by said edit image designation device.

9. The image communication system according to claim 5, wherein said image transmitting apparatus further comprises:
plural image data storage devices storing a plurality of image data representing images composing said edit image in different data amounts, and
a production device for producing said edit image using the image represented by any one of the image data stored in said plural image data storage devices.

10. The image communication system according to claim 1, wherein
said image receiving apparatus further comprises
a selection device for selecting the image first displayed when said image receiving apparatus and said image transmitting apparatus are formally connected to each other, and
a selected image transmission device for transmitting to said image transmitting apparatus selected image data representing the image selected by said selection device,
said image transmitting apparatus further comprises
a selected image receiving device for receiving the selected image data which has been transmitted from said selected image transmission device in said image receiving apparatus, and
said image data transmission device transmits image data representing the image represented by the selected image data which has been received by said selected image receiving device to said image receiving apparatus when the image receiving apparatus and the image transmitting apparatus are formally connected to each other.

11. The image communication system according to claim 10, wherein
said image receiving apparatus further comprises
a link image setting device for setting said image to be linked, and a link information transmission device for transmitting link information set by said link image settings device to said image transmitting apparatus, said image transmitting apparatus further comprises a link information receiving device for receiving the link information which has been transmitted from said link information transmission device in said image receiving apparatus, and said image data transmission device transmits to said receiving apparatus image data representing the subsequent image to be linked on the basis of the link information which has been received by said link information receiving device.

12. The image communication system according to claim 1, wherein said image receiving apparatus further comprises an update command transmission device for transmitting an image update command to said image transmitting apparatus, said image transmitting apparatus further comprises an update command receiving device for receiving said image update command which has been transmitted form said update command transmission device, and said image data transmission device transmits to said image receiving apparatus image data representing the subsequent image which is linked to an image represented by image data which corresponds to the update command received by said update command receiving device and information relating to said image receiving apparatus and has been transmitted to said image receiving apparatus by said image data transmission device.

13. The image communication system according to claim 1, wherein said image received by said image receiving apparatus is edited by a user.

14. The image communication system according to claim 1, wherein said image receiving apparatus displays one of said image and an image customized by a user.

15. The image communication system according to claim 1, wherein said image transmitting apparatus stores user preferences for a display format suitable for said image receiving apparatus.

16. The image communication system according to claim 1, wherein said image transmitting apparatus stores user information, said user information including at least one of a user name and password, a script for a start image, retrieval conditions, a script for a menu image, a script for a category retrieval image, a script for a work list image, a script for an artist image, and a script for a work image.

17. The image communication system according to claim 1, wherein an initial image to be displayed is selected by a user of said image receiving device and information related to the user selection is stored by said image transmitting device.

18. An image transmitting apparatus which can establish data communication with an image receiving apparatus, comprising:

a device information receiving device for receiving information relating to the image receiving apparatus which has been transmitted from said image receiving apparatus; and an image data transmission device for transmitting to said image receiving apparatus image data representing an image having a display format suitable for said image receiving apparatus on the basis of the information relating to the image receiving apparatus which has been received by said device information receiving device, wherein said received information comprises information about a type of browser installed in said image receiving apparatus and at least one of a number of colors displayable on a display of said image receiving apparatus, and a size of a displayable image.

19. In an image transmitting apparatus which can establish data communication with an image receiving apparatus, an image data transmitting method comprising:

receiving information relating to the image receiving apparatus which has been transmitted from said image receiving apparatus; and transmitting to said image receiving apparatus image data representing an image having a display format suitable for said image receiving apparatus on the basis of said received information relating to the image receiving apparatus, wherein said received information comprises information about a type of browser installed in said image receiving apparatus and at least one of a number of colors displayable on a display of said image receiving apparatus, and a size of a displayable image.

20. A computer readable recording medium storing a program for controlling a computer in an image transmitting apparatus which can establish data communication with an image receiving apparatus so as to:

receive information relating to the image receiving apparatus which has been transmitted from said image receiving apparatus, and transmit to said image receiving apparatus image data representing an image having a display format suitable for said image receiving apparatus on the basis of the received information relating to the image receiving apparatus, wherein said received information comprises information about a type of browser installed in said image receiving apparatus and at least one of a number of colors displayable on a display of said image receiving apparatus, and a size of a displayable image.

21. An image communication system comprising an image transmitting device and an image receiving device which can establish data communication with each other, wherein said image receiving device comprises device information transmission means for transmitting to said image transmitting device information relating to said image receiving device, and said image transmitting device comprises device information receiving means for receiving information related to said image receiving device which has been transmitted from said device information transmission means in said image receiving device, and image data transmission means for transmitting to said image receiving device image data representing an image having a display format suitable for said image receiving device on the basis of the information relating to the image receiving device which has been received by said device information receiving means, wherein said received information comprises information about a type of browser installed in said image receiving means and at least one of a number of colors displayable on a display of said image receiving means and a size of a displayable image.

22. An image transmitting device which can establish data communication with an image receiving device, comprising:

device information receiving means for receiving information relating to the image receiving device which has been transmitting from said image receiving device; and image data transmission means for transmitting to said image receiving device image data representing an image having a display format suitable for said image receiving device on the basis of the information relating to the image receiving device which has been received by said device information receiving means, wherein said received information comprises information about a type of browser installed in said image receiving means and at least one of a number of colors displayable on a display of said image receiving means, and a size of a displayable image.

23. An image communication system comprising:

an image transmitting apparatus; and an image receiving apparatus which can establish data communication with each other, wherein said image receiving apparatus comprises:
a device information transmission device for transmitting to said image transmitting apparatus information relating to said image receiving apparatus, and wherein said image transmitting apparatus comprises:
a device information receiving device for receiving information relating to said image receiving apparatus which has been transmitted from said device information transmission device in said image receiving apparatus; and an image data transmission device for transmitting to said image receiving apparatus image data representing an image having a display format suitable for said image receiving apparatus on the basis of the information relating to the image receiving apparatus which has been received by said device information receiving device, wherein said image transmitting device stores a plurality of initial images to be displayed, said plurality of initial images being selected by a plurality of users.

24. The image communication system according to claim 23, wherein each one of said plurality of initial images selected by said plurality of users comprises a unique image.

25. The image communication system according to claim 23, wherein said image transmitting apparatus comprises a server, and
wherein said image receiving apparatus comprises at least one of a portable telephone, a portable information terminal, a notebook computer, and a personal computer.

26. The image communication system according to claim 25, wherein the image received by said at least one of a portable telephone, a portable information terminal, a notebook computer, and a personal computer is editable by a user.

27. The image communication system according to claim 23, wherein said image transmitting device stores a link destination of an image edited by a user.

28. The image communication system according to claim 27, wherein the link destination of an image selected by a user is transmitted from the image receiving device to the image transmitting device.

29. The image communication system according to claim 27, wherein the link destination of an image selected by each user of a plurality of users is unique.

30. An image communication system comprising:

an image transmitting apparatus; and an image receiving apparatus which can establish data communication with each other, wherein said image receiving apparatus comprises:
a device information transmission device for transmitting to said image transmitting apparatus information relating to said image receiving apparatus, and wherein said image transmitting apparatus comprises:
a device information receiving device for receiving information relating to said image receiving apparatus which has been transmitted from said device information transmission device in said image receiving apparatus; and an image data transmission device for transmitting to said image receiving apparatus image data representing an image having a display format suitable for said image receiving apparatus on the basis of the information relating to the image receiving apparatus which has been received by said device information receiving device, wherein said image transmitting apparatus comprises a server, and wherein said image receiving apparatus comprises at least one of a portable telephone, a portable information terminal, a notebook computer, and a personal computer.

31. An image communication system comprising:

an image transmitting apparatus; and an image receiving apparatus which can establish data communication with each other, wherein said image receiving apparatus comprises:
a device information transmission device for transmitting to said image transmitting apparatus information relating to said image receiving apparatus, and wherein said image transmitting apparatus comprises:
a device information receiving device for receiving information relating to said image receiving apparatus which has been transmitted from said device information transmission device in said image receiving apparatus, and an image data transmission device for transmitting to said image receiving apparatus image data representing an image having a display format suitable for said image receiving apparatus on the basis of the information relating to the image receiving apparatus which has been received by said device information receiving device, wherein said image transmitting device stores a plurality of initial images to be displayed, said plurality of initial images selected by a plurality of users, wherein a link destination for each of said plurality of initial images is transmitted from the image receiving device to the image transmitting device, and wherein said image transmitting device stores said link destination for each of said plurality of initial images to be displayed.

* * * * *